(12) United States Patent
Kawai et al.

(10) Patent No.: US 6,742,349 B1
(45) Date of Patent: Jun. 1, 2004

(54) EQUIPMENT SENSING SYSTEM AND EQUIPMENT CONTROL DEVICE

(75) Inventors: Sigekazu Kawai, Gumma (JP); Kazuya Imamura, Gumma (JP); Yutaka Ishii, Gumma (JP); Katsumi Maekawa, Gumma (JP); Tsutomu Ishikura, Gumma (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 10/276,410

(22) PCT Filed: May 16, 2000

(86) PCT No.: PCT/JP00/03142

§ 371 (c)(1),
(2), (4) Date: Nov. 15, 2002

(87) PCT Pub. No.: WO01/88651

PCT Pub. Date: Nov. 22, 2001

(51) Int. Cl.$^7$ .......................... G05D 23/00; G01M 1/38
(52) U.S. Cl. .................... 62/207; 236/51; 165/207; 700/278; 702/130
(58) Field of Search .................. 62/207, 175; 165/207, 165/205; 236/51; 700/278; 702/130; 340/517

(56) References Cited

U.S. PATENT DOCUMENTS 5,311,451 A * 5/1994 Barrett .................. 236/49.3 X
5,751,572 A * 5/1998 Maciulewicz .......... 395/200.38
6,502,409 B1 * 1/2003 Gatling et al. ............ 236/51 X
6,604,023 B1 * 8/2003 Brown et al. ................ 700/278

FOREIGN PATENT DOCUMENTS

| EP | 0 838 788 A1 | 4/1998 | ............ G07C/3/00 |
| JP | 4-112304 | 4/1992 | ............ G05B/19/05 |
| JP | 6-26999 | 2/1994 | ............ G01M/17/00 |
| JP | 8-247600 | 9/1996 | ............ F25D/11/00 |
| JP | 11-86178 | 3/1999 | ............ G08C/23/04 |

* cited by examiner

Primary Examiner—William Wayner
(74) Attorney, Agent, or Firm—McGinn & Gibb, PLLC

(57) ABSTRACT

Data is transmitted to a main control device via sensing means such as temperature sensors, each having a memory means in which the ID code is stored, and via transmitting/receiving means such as switching elements. There is a stand-by period in the operation of the main control device after the main control device issues a command to start a sensing operation until the main control device issues a command to perform a read operation. The main control device receives power through a signal line the voltage of which is kept at a high level during the stand-by period. Thus, an equipment sensing system and an equipment control device which enable reliable and quick sensing, cost reduction, smooth control, and simplified wiring are provided.

24 Claims, 36 Drawing Sheets

FIG. 17
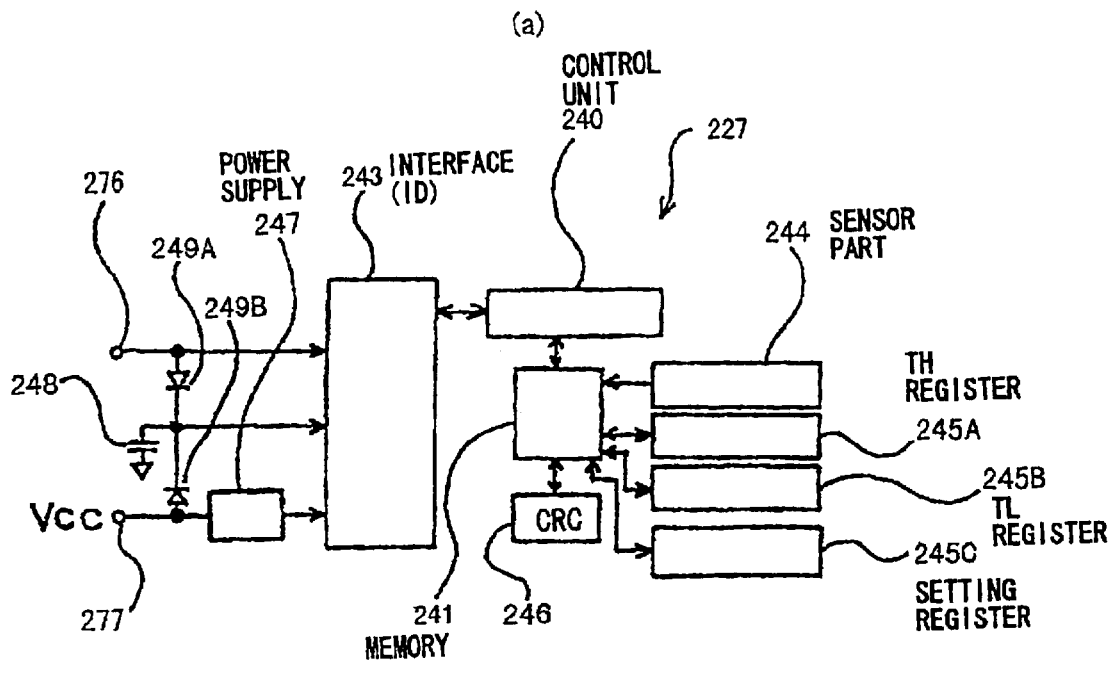
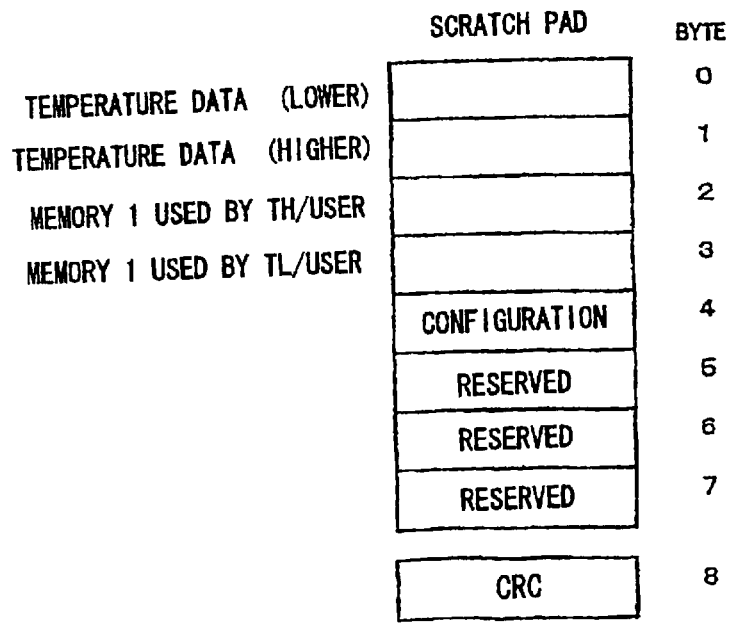

FIG. 27
(a)
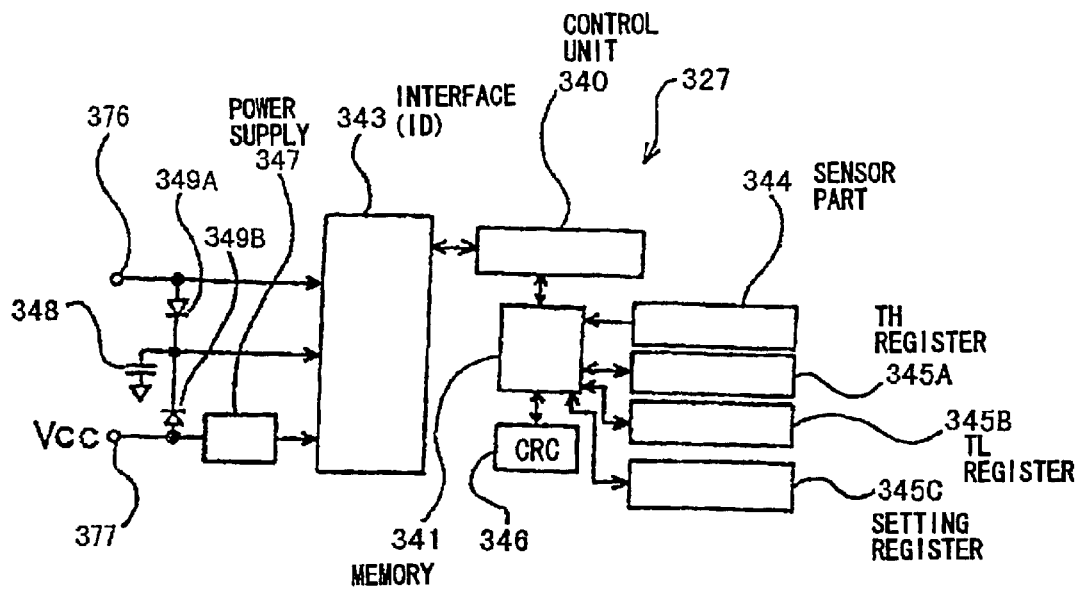
(b)
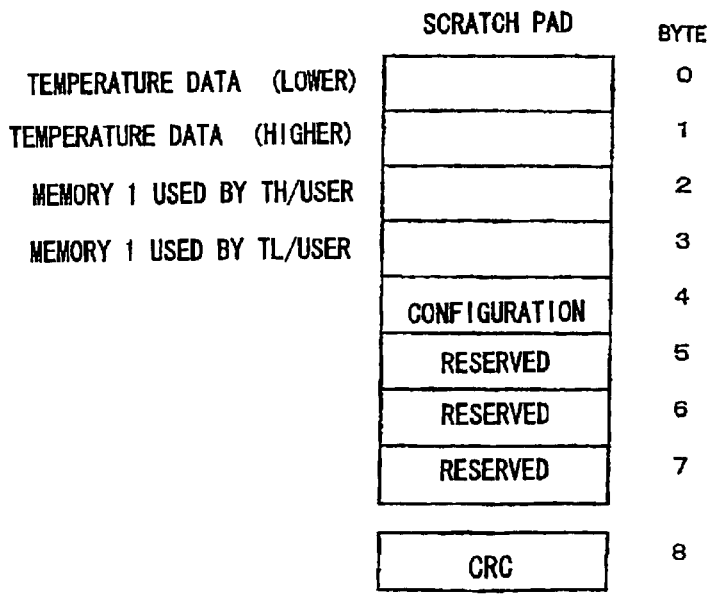

FIG. 32

| DATE | PERSON IN CHARGE | COMPONENT |
|---|---|---|
| YEAR, MONTH, DAY | ○ ○ | SENSOR ID 0000 |
| . | × × | SWITCHING DEVICE ID 0101 |
| . | △ △ | COMPONENT △ △ |
| | . | . |
| | . | . |
| | . | . |

FIG. 36
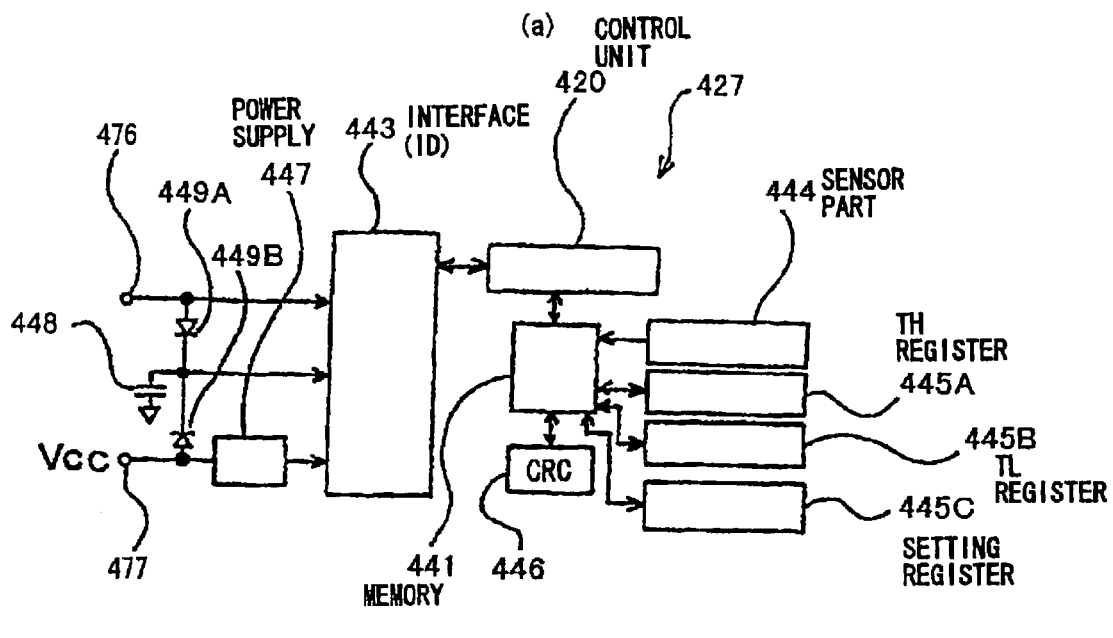
(a)
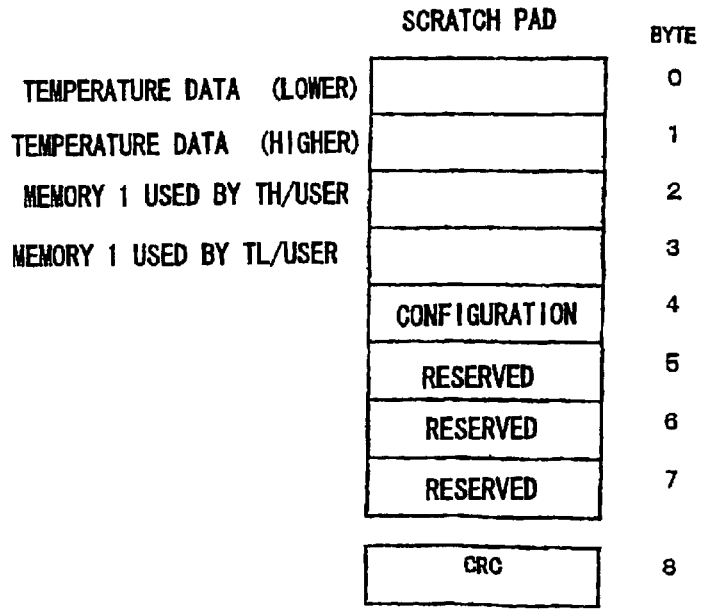
(b)

EQUIPMENT SENSING SYSTEM AND EQUIPMENT CONTROL DEVICE

TECHNICAL FIELD OF THE INVENTION

The invention relates to an equipment detection system for detecting, for example, the state of the temperature of equipment, for example, cooling storerooms, such as refrigerators for commercial use or domestic use, low-temperature showcases, prefabricated refrigerators, and vending machines, or air conditioners, and an equipment control device.

BACKGROUND OF THE INVENTION

For example, in conventional refrigerators for commercial use, a compressor, a condenser, a cooler and the like, which constitute a cooling device, are built in the refrigerators, or alternatively the compressor and the condenser are separately provided. In these conventional refrigerators, a coolant discharged from the compressor is condensed in the condenser, is depressurized in a pressure reducing device and is then supplied to the cooler to attain cooling effect, and air cooled in the cooler is circulated through an internal fan into the refrigerator to cool the inside of the refrigerator to a predetermined low temperature.

Frost grown in the cooler by the cooling operation is heat thawed by a defroster (a defrost heater), and, further, dew condensed and deposited by cooling action is removed by heating with an antidewing heater. On the other hand, a fan for the condenser is provided around the compressor and the condenser, and the condenser and the compressor are air cooled by the fan for the condenser.

In order to perform such various operation controls, the refrigerator is loaded with a controller comprising a microcomputer. Further, various sensors for detecting the temperature of the inside of the refrigerator, the cooler, and the condenser are mounted, and, in addition, switches for controlling the operation of mounted parts such as the compressor, the defroster, the antidewing heater, and the internal fan are also provided. The controller receives data sent from the sensors and controls the operation of mounted parts by the individual switches.

In this refrigerator, however, temperature sensors according to various applications, such as the control of the internal temperature or the protection of the compressor and the condenser, are mounted, and the number of the temperature sensors varies depending upon the type of the equipment. Further, for example, the number of fans and the number of antidewing heaters for preventing dew formation vary depending upon the type of the equipment. Therefore, wiring of electric systems including switches for controlling them and the construction of control devices for controlling the electrical systems vary depending upon the type of the equipment. This has resulted in significantly lowered productivity particularly, for example, in equipment for commercial use which is produced in various types on a small lot production manner, and a reduction in this drawback has been desired.

In the above equipment, various mounted parts are deteriorated by operation and motion for a long period of time and, as a result, a malfunction of the equipment occurs. For this reason, maintenance/inspection is carried out either at the time of the occurrence of the malfunction or periodically (in the case of equipment for commercial use), and, at that time, the failed portion is repaired. In this case, at the time of inspection, the contents of maintenance in the past can be learned, subsequent measures can be easily taken.

Specifically, for example, when specific parts have been frequently replaced, it is learned that some measure or modification is necessary for the parts per se. A conventional method similar to this is that a check label or the like is put on the equipment and inspection date and the like are written on the label or the like. In this method, however, the contents of maintenance in the past are not written. Writing the contents of the maintenance on the label leads to a possibility that the user has an idle fear.

In recent years, also in this type of refrigerators for commercial use, a system has been searched and developed wherein a plurality of refrigerators are connected to each other or one another through a signal line and these refrigerators are controlled by a single controller in a centralized manner. In this centralized control, the controller performs data communication for giving an instruction to each control terminal, that is, parts mounted on each refrigerator. When the number of refrigerators or the number of parts mounted on the refrigerators is large, a long time is necessary until all the mounted parts complete communication with the controller.

The prolongation of the time of communication with the controller cannot disadvantageously cope with, for example, the necessity of an immediate change of setting or operation of a specific refrigerator and results in delayed change of setting or operation.

SUMMARY OF THE INVENTION

Accordingly, it is a first object of the invention to provide an equipment detection system which can realize reliable and rapid detection operation while enjoying a significant improvement in productivity and a significant reduction in cost through common use of parts and simplification of wiring.

It is a second object of the invention to provide an equipment control device which can significantly improve the productivity and significantly reduce the cost through common use of parts and simplification of wiring, can easily grasp the history of maintenance, which has been done in the past for the equipment, and can realize smooth control even in the case of control of a large number of sensors or switching devices by single main control means through transmission and receipt of data.

The first object of the invention can be attained by an equipment detection system comprising a main control device, sensors, and a signal line, the main control device and the sensors being connected to the signal line, characterized in that each of the sensors comprises: detection means; storage means having its own ID code; send/receive means for sending data to and receiving data from the main control device through the signal line; and terminal-side control means which, upon the receipt of an instruction from the main control device through the send/receive means for the start of detection operation, allows the detection means to perform detection operation, and, upon the receipt of an instruction from the main control device for reading, sends data detected by the detection means to the main control device through the send/receive means, and that the main control device gives an instruction for the start of operation of the detection to all the sensors from which data are to be collected, then provides a predetermined standby period, and, after the elapse of the standby period, gives an instruction for reading to the sensors while specifying the ID codes.

The first object of the invention can also be attained by an equipment detection system comprising a main control device, a plurality of sensors, and a signal line, the main control device and the sensors being connected to the signal line, characterized in that each of the sensors comprises: detection means; storage means having its own ID code; send/receive means for sending data to and receiving data from the main control device through the signal line; and terminal-side control means which, upon the receipt of an instruction from the main control device through the send/receive means for the start of detection operation, allows the detection means to perform detection operation, and, upon the receipt of an instruction from the main control device for reading, sends data detected by the detection means to the main control device through the send/receive means, and that the main control device gives an instruction for the start of operation of the detection to the plurality of sensors connected to the signal line, then provides a predetermined standby period, and, after the elapse of the standby period, gives an instruction for reading to the individual sensors while specifying the ID codes.

The second object of the invention can be attained by a control device for equipment, comprising a signal line distributed to said equipment, main control means connected to the signal line, and a sensor connected to the signal line, characterized in that the sensor comprises: a detection device; storage means having its own ID code; send/receive means for sending data to and receiving data from the main control means through the signal line; and sensor-side control means which receives data detected by the detection device, writes the received data in the storage means, and sends data stored in the storage means to the main control means through the send/receive means.

The second object of the invention can also be attained by a control device for equipment, comprising a signal line distributed to said equipment, main control means connected to the signal line, and a switching device which is connected to the signal line and functions to control the operation of mounted parts, characterized in that the switching device comprises switching means, storage means having its own ID code, send/receive means for sending data to and receiving data from the main control means through the signal line, and switching device-side control means for controlling the switching means based on the data from the send/receive means.

The second object of the invention can also be attained by a control device for equipment, comprising a signal line distributed to said equipment, main control means connected to the signal line, a sensor connected to the signal line, and a switching device which is connected to the signal line and functions to control the operation of mounted parts, characterized in that the sensor comprises: a detection device; storage means having its own ID code; send/receive means for sending data to and receiving data from the main control means through the signal line; and sensor-side control means which receives data detected by the detection device, writes the received data in the storage means, and sends data stored in the storage means to the main control means through the send/receive means, and that the switching device comprises switching means, storage means having its own ID code, send/receive means for sending data to and receiving data from the main control means through the signal line, and switching device-side control means for controlling the switching means based on the data from the send/receive means.

The second object of the invention can also be attained by a control device for equipment, comprising a signal line distributed to a cooling storeroom, main control means connected to the signal line, and a temperature detection sensor connected to the signal line, characterized in that the sensor comprises: a temperature detection device; storage means having its own ID code; send/receive means for sending data to and receiving data from the main control means through the signal line; and sensor-side control means which receives temperature data detected by the temperature detection device, writes the received data in the storage means, and sends data stored in the storage means to the main control means through the send/receive means.

The second object of the invention can also be attained by a control device for equipment, comprising a signal line distributed to a cooling storeroom, main control means connected to the signal line, and a switching device which is connected to the signal line and functions to control the operation of mounted parts including a compressor and a fan, characterized in that the switching device comprises switching means, storage means having its own ID code, send/receive means for sending data to and receiving data from the main control means through the signal line, and switching device-side control means for controlling the switching means based on the data from the send/receive means.

The second object of the invention can also be attained by a control device for equipment, comprising a signal line distributed to a cooling storeroom, main control means connected to the signal line, a temperature detection sensor connected to the signal line, and a switching device which is connected to the signal line and functions to control the operation of mounted parts including a compressor and a fan, characterized in that the sensor comprises: a temperature detection device; storage means having its own ID code; send/receive means for sending data to and receiving data from the main control means through the signal line; and sensor-side control means which receives temperature data detected by the temperature detection device, writes the received data in the storage means, and sends data stored in the storage means to the main control means through the send/receive means, and that the switching device comprises switching means, storage means having its own ID code, send/receive means for sending data to and receiving data from the main control means through the signal line, and switching device-side control means for controlling the switching means based on the data from the send/receive means.

The sensor and/or the switching device preferably comprise an accumulation device which is charged during a high potential period of the signal line while, during a low potential period of the signal line, electricity is discharged from the accumulation device to supply each means with electric power.

The sensor or the switching device may be built in a part mounted on equipment such as a cooling storeroom.

The second object of the invention can also be attained by a control device for equipment, comprising: a signal line distributed to said equipment; main control means provided on the equipment; a sensor or a switching device connected to the signal line, for sending data to and receiving data from the main control means; storage unit connected to the signal line; and changeover means for enabling an external control device to be connected to the signal line, characterized in that the storage unit stores a maintenance history data file containing maintenance history of the equipment and, in the state of the connection of the external control device to the signal line, permits data contained in the maintenance history data file to be read by the external control device and data to be written in the maintenance history data file.

When the sensor or the switching device has been replaced, preferably, the main control means searches out the new sensor or switching device and writes this data in the maintenance history data file within the storage unit.

The storage unit preferably comprises: storage means containing data; send/receive means for sending data to and receiving data from the main control means and the external control device through the signal line; storage unit-side control means for controlling, based on the data from the send/receive means, writing of data in or reading of data from the storage means; and an accumulation device which is charged during a high potential period of the signal line while, during a low potential period of the signal line, electricity is discharged from the accumulation device to supply each means with electric power.

The sensor preferably comprises: a detection device; storage means having its own ID code; send/receive means for sending data to and receiving data from the main control means through the signal line; and sensor-side control means which receives data detected by the detection device, writes the received data in the storage means, and sends data stored in the storage means to the main control means through the send/receive means.

The switching device preferably comprises switching means, storage means having its own ID code, send/receive means for sending data to and receiving data from the main control means through the signal line, and switching device-side control means for controlling the switching means based on the data from the send/receive means.

The second object of the invention can also be attained by a control device for equipment, comprising: main control means provided on the equipment; and a sensor or a switching device for sending data to and receiving data from the main control means through a signal line, characterized in that the sensor or the switching device is divided into a plurality of systems, a changeover device is provided in a signal line between each of the systems and the main control means, and the changeover device opens/closes the signal system upon the receipt of data from the main control means through the signal line.

The changeover device preferably comprises: opening/closing means for opening/closing the signal system; storage means having its own ID code; send/receive means for sending data to and receiving data from the main control means through the signal line; and changeover device-side control means for controlling the opening/closing means based on the data sent from the send/receive means.

The sensor preferably comprises: a detection device; storage means having its own ID code; send/receive means for sending data to and receiving data from the main control means through the signal line; and sensor-side control means which receives data detected by the detection device, writes the received data in the storage means, and sends data stored in the storage means to the main control means through the send/receive means.

The switching device preferably comprises switching means, storage means having its own ID code, send/receive means for sending data to and receiving data from the main control means through the signal line, and switching device-side control means for controlling the switching means based on the data sent from the send/receive means.

BRIEF DESCRIPTION OF THE DRAWINGS

FIG. 17 is a block diagram of an electrical circuit in a temperature sensor;

FIG. 27 is a block diagram of an electrical circuit in a temperature sensor;

FIG. 32 is a diagram illustrating the state of a screen of a display in a personal computer;

FIG. 36 is a block diagram of an electrical circuit in a temperature sensor;

PREFERRED EMBODIMENTS

Figure 1:
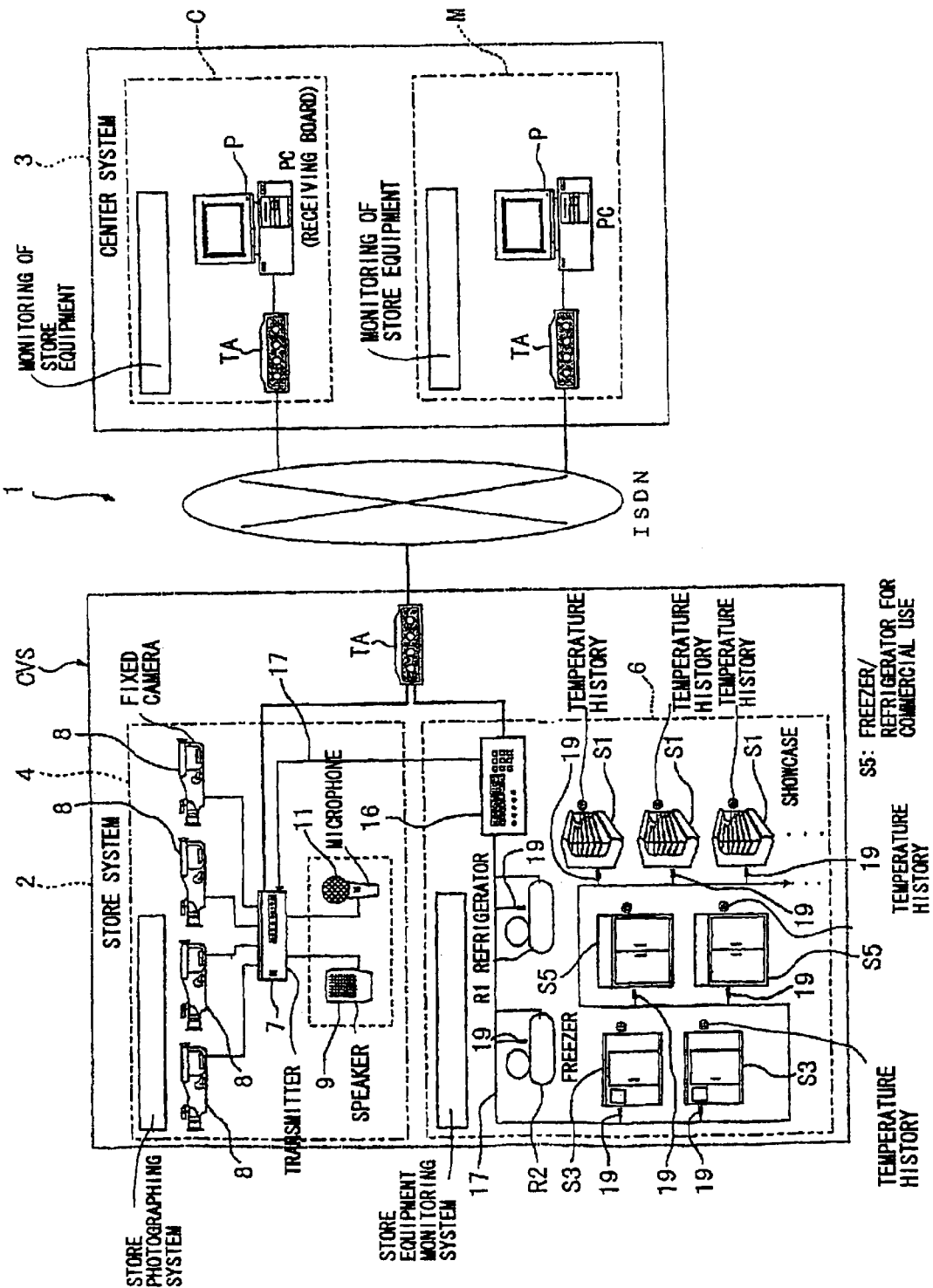
FIG. 1 is an explanatory view of a store management system of a convenience store in a first preferred embodiment of the invention.
Figure 2:
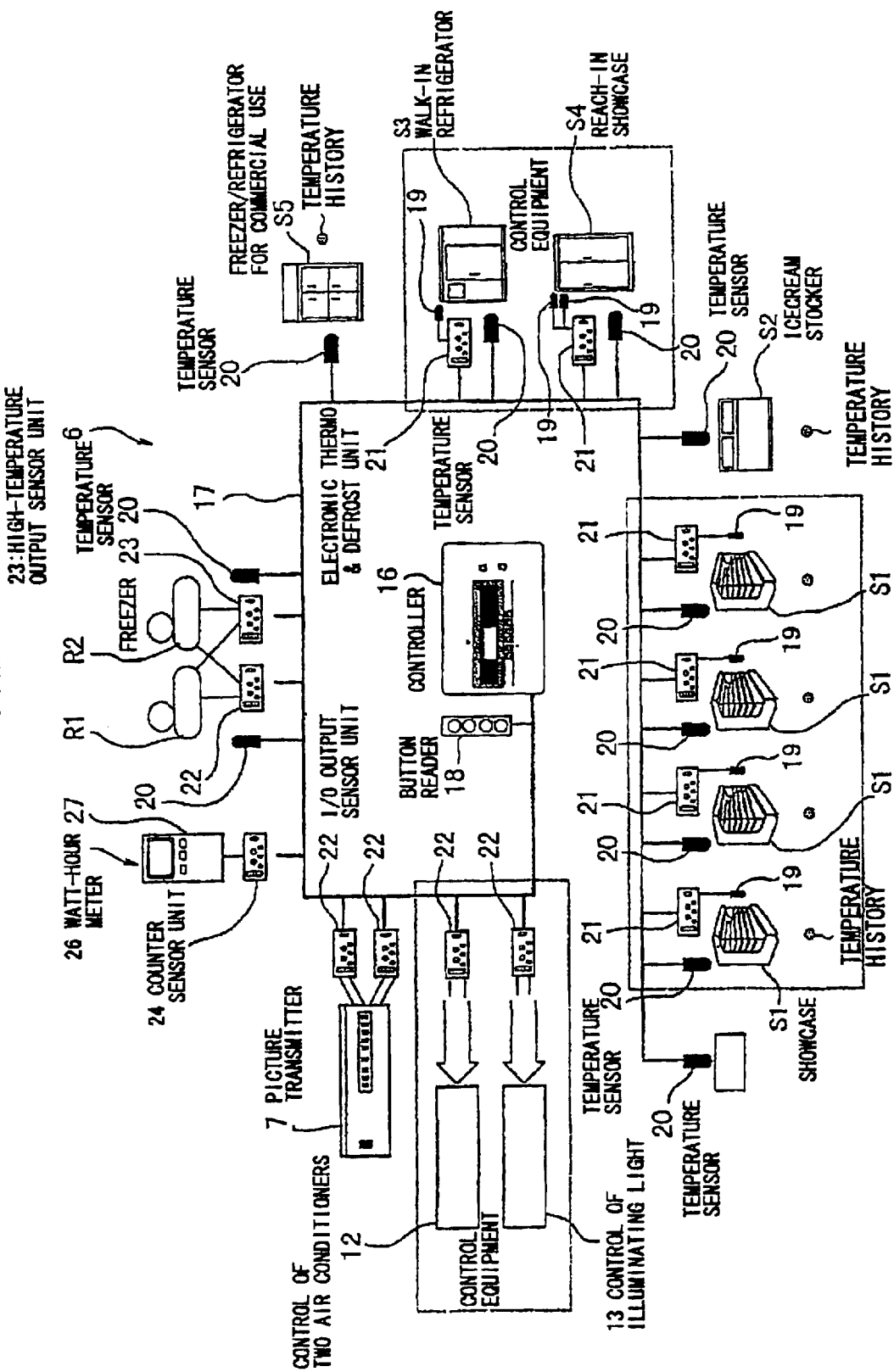
FIG. 2 is an explanatory view of a store equipment monitoring system in a store management system.

Preferred embodiments of the invention will be explained in conjunction with the accompanying drawings. FIG. 1 is a diagram showing the construction of a store management system 1 of a convenience store CVS in a first preferred embodiment of the invention, and FIG. 2 is a diagram showing the construction of a store equipment monitoring system 6 in the store management system 1.

The store management system 1 in this preferred embodiment comprises: a store system 2 installed on the convenience store CVS side; and a center system 3 comprising, for example, a head office C of chains belonging to the convenience store CVS and a maintenance commissioned company M responsible for maintenance. The store system 2 is connected to the center system 3 through terminal adaptors TA . . . and a public circuit ISDN.

The head office C and the maintenance commissioned company M monitor the store equipment. To this end, for each of the head office C and the maintenance commissioned company M, a personal computer P is installed and is connected to a terminal adaptor TA.

On the other hand, the store system 2 comprises: a store photographing system 4 for photographing, for example, the inside and back door of the store; and a store equipment monitoring system 6 for monitoring the operation of electrical machineries and apparatuses, such as showcases and lightings which will be described later, installed in the store. Among them, the store photographing system 4 comprises: a transmitter 7; and, connected to the transmitter 7, a plurality of fixed cameras 8 . . . , a speaker 9, a microphone 11 and the like. The fixed cameras 8 . . . are installed, for example, in the ceiling face in the store so that various places in the store and the doorway, such as back door, of the store can be photographed.

The fixed camera 8 can photograph moving images (time-varying images) using a CCD image pickup device, and moving video image data photographed by the fixed cameras 8 . . . are sent to the transmitter 7. The transmitter 7 delivers the video image data sent from the fixed cameras 8 . . . to the personal computer P of the head office C and the personal computer P of the maintenance commissioned company M through the respective terminal adaptors TA and the ISDN line. The delivered video image data are displayed on a display of each personal computed P.

Control data are sent from the personal computer P of the head office C and the personal computer P of the maintenance commissioned company M to the transmitter 7, and the transmitter 7 performs the control of direction of the fixed cameras 8 . . . and the control of zooming of the fixed cameras 8 . . . By virtue of this construction, the head office C and the maintenance commissioned company M can monitor, through the personal computers P, for example, the occurrence of theft in the convenience store CVS and can perform remote security service.

On the other hand, a plurality of open showcases S1 . . . , an ice cream stocker S2, a single or two walk-in refrigerators (prefabricated refrigerators) S3, a closed type reach-in showcase S4, and a single or two freezers/refrigerators for commercial use S5 are installed within the convenience store CVS. Air conditioners 12 (two air conditioners in this preferred embodiment) and lighting 13 comprising fluorescent lamps, a dimmer and the like are mounted on the ceiling portion of the store.

Among them, the open showcases S1 . . . , the walk-in refrigerator S3, and the reach-in showcase S4 are connected through piping to condensing units R1, R2 installed in a machinery room of the convenience store CVS or outdoors and receive a coolant from these condensing units to exhibit cooling capacity. The ice cream stocker S2 and the freezer/refrigerator S5 for commercial use each have a built-in cooling device and are loaded with respective their own temperature controllers.

The store monitoring system 6 comprises: a controller 16 as a main control device; a series of signal lines 17 connected to the controller 16 and distributed into the store; a button reader 18 (to which a button-type temperature recording chip is connected) connected through a coupler to the signal lines 17; a plurality of temperature sensors 19 . . . for control purposes (the temperature sensor 19 being connected to the signal line 17 through a changeover device 42 which will be described later); a plurality of temperature sensors 20 . . . for monitoring; a plurality of electronic thermo units 21 . . . (serving as a main control device); a plurality of I/O sensor units 22 . . . ; a high-temperature sensor unit 23; a counter sensor unit 24; a watt-hour meter 27 which, together with the counter sensor unit 24, constitutes an electric energy detector 26; and the like.

Figure 3:
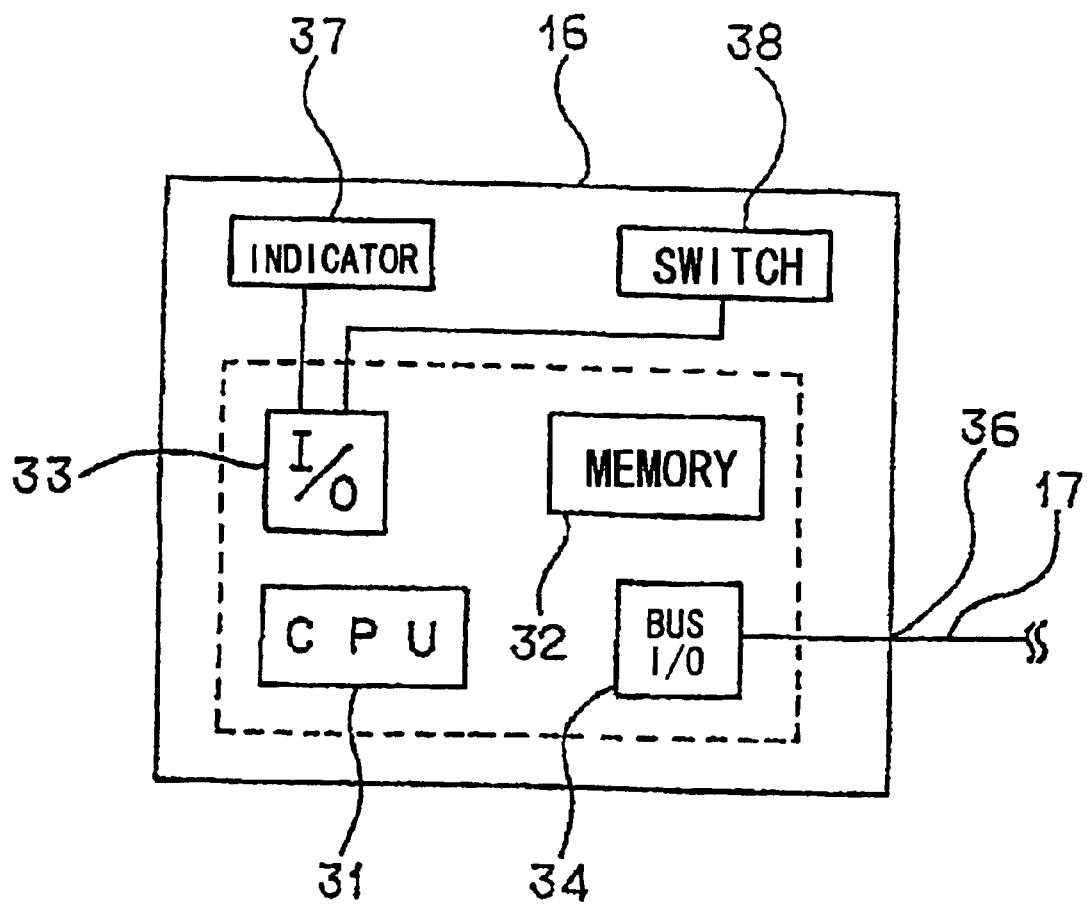
FIG. 3 is a block diagram of an electrical circuit in a controller.

FIG. 3 shows the construction of the controller 16. The controller 16 is installed, for example, in an office of the convenience store CVS and comprises, for example, CPU (microcomputer) 31, a memory 32 as storage means comprising a flash memory or the like, an I/O interface 33, and a bus I/O interface 34 as send/receive means. Further, an indicator 37 comprising LCD or the like, a switch 38 as input means and the like are provided in the controller 16.

The bus I/O interface 34 is connected to the signal line 17 through a port 36 in the controller 16 and sends data to or receives data from the button reader 18, the temperature sensor 19 . . . (through a changeover device 42 which will be described later), the temperature sensor 20 . . . , the electronic thermo unit 21 . . . , the I/O sensor unit 22 . . . , the high-temperature sensor unit 23, and the counter sensor unit 24 through the port 36 and the signal line 17.

A predetermined communication protocol for data communication with the button reader 18, the temperature sensor 19 . . . , the temperature sensor 20 . . . , the electronic thermo unit 21 . . . , the I/O sensor unit 22 . . . , the high-temperature sensor unit 23, and the counter sensor unit 24, and a software for the identification of and a control program for the operation control of the button reader 18, the temperature sensor 19 the temperature sensor 20 . . . , the electronic thermo unit 21 the I/O sensor unit 22 . . . , the high-temperature sensor unit 23, and the counter sensor unit 24 are set in the memory 32 of the controller 16.

Further, the I/O interface 33 in the controller 16 is connected to the terminal adaptor TA on the store side through an RS-232C cable, and the bus I/O interface 34 is passed through the same signal line 17 and is also connected to the transmitter 7 in the store picture system 4.

Figure 4:
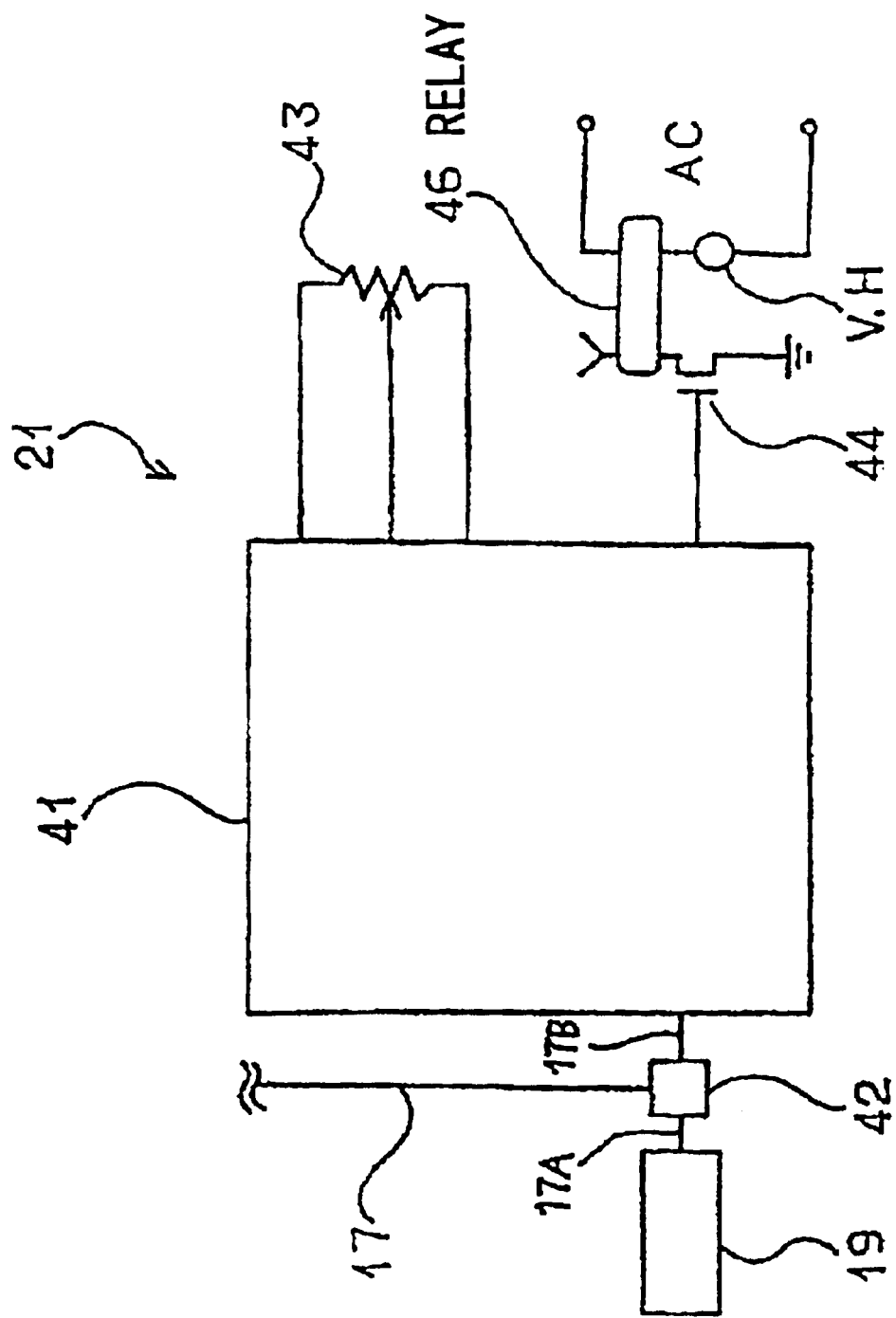
FIG. 4 is a block diagram of an electronic thermo unit.

On the other hand, the electronic thermo unit 21 is provided in each of the open showcases S1 . . . , the walk-in refrigerator S3, and the reach-in showcase S4. As shown in FIG. 4, the electronic thermo unit 21 comprises a thermostat chip 41, and the temperature sensor 19 for control provided within the showcase is connected to this thermostat chip 41 through the changeover device 42 and the signal lines 17A, 17B. The changeover device 42 is further connected to the signal line 17.

For example, a volume 43, a switching device 44 comprising a transistor, a thyrister and the like, and a relay 46 comprising a photocoupler are distributed and connected to the thermostat chip 41.

Figure 5:
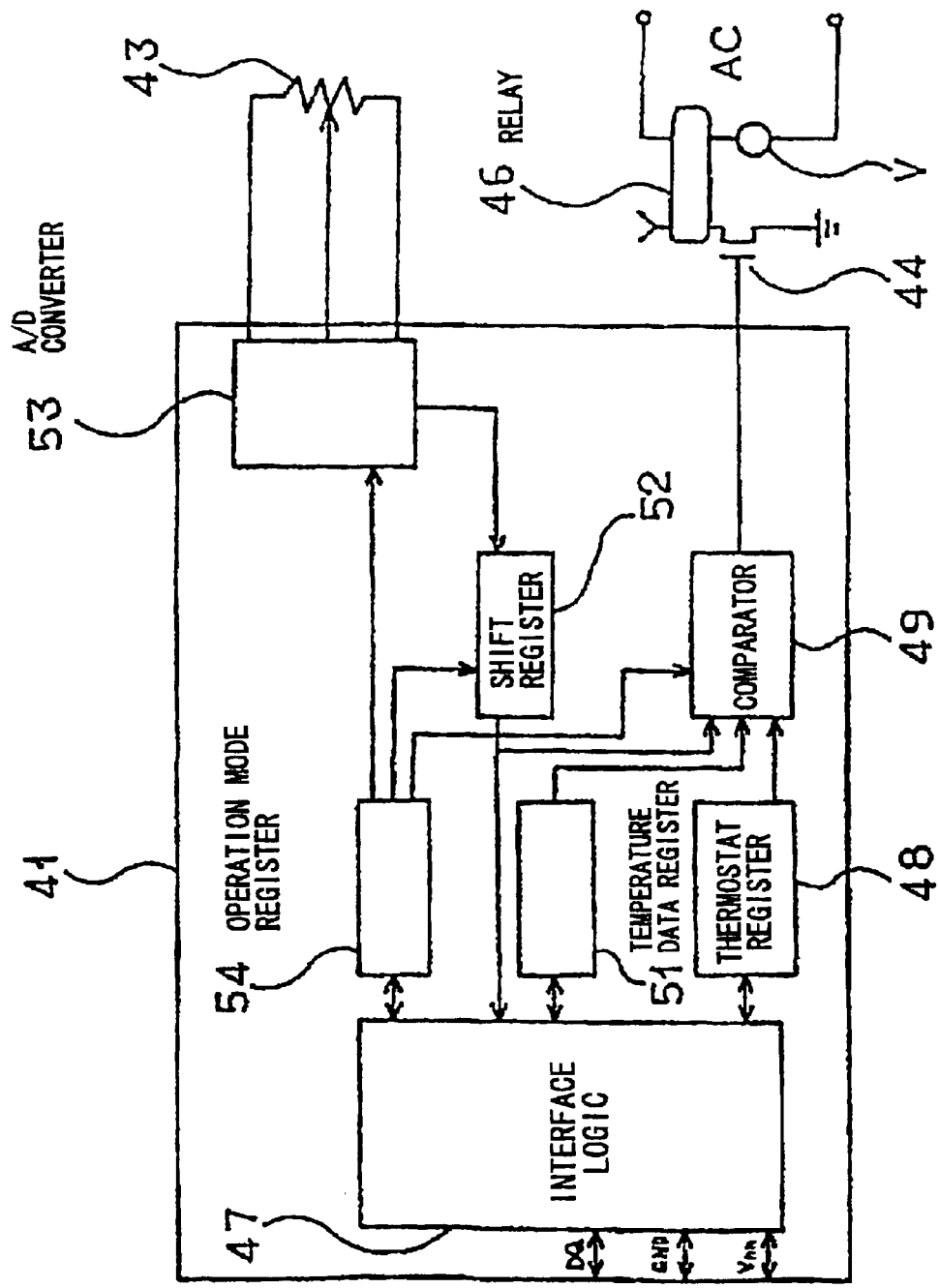
FIG. 5 is a block diagram of an electrical circuit in a thermostat chip.

As shown in detail in FIG. 5, the thermostat chip 41 comprises: an interface logic 47 comprising a logic circuit; a thermostat register (storage means) 48; a comparator (comparison means) 49; a temperature data register 51; a shift register 52; an A/D converter 53 (setting means); and an operation mode (configuration) register (storage means) 54, and they are constituted by a single chip.

The interface logic 47 has a serial communication function for sending data to and receiving data from the temperature sensor 19 through the signal lines 17A, 17B and the changeover device 42 and further has a resister, a protocol and the like. Therefore, the connection of the interface logic 47 to the temperature sensor 19 through the signal lines 17A, 17B by the changeover device 42 permits data to be received from and to be sent to the temperature sensor 19. Further, as described later, the upper limit temperature TH and the lower limit temperature TL fetched from the temperature sensor 19 are written in the thermostat register 48.

As described later, data on the inner temperature TP received by the interface logic 47 from the temperature sensor 19 are written in the temperature data register 51. Further, the volume 43 is externally mounted on the A/D converter 53. The resistance value of this volume 43 is converted by the A/D converter 53 to a temperature shift value TC (64 position digital register). The values of 64° C., 32° C., 16° C., 8° C. and 4° C. as the alteration width of the temperature shift value TC can be set in the A/D converter 53 by register bit shift, and setting to any value is made by the operation mode register 54. The number of digits of the temperature shift value used is set in the shift register 52.

The data on the temperature TP within the temperature data resister 51 are sent to the comparator 49. The upper limit temperature TH and the lower limit temperature TL within the thermostat register 48 are also sent to the comparator 49. Further, the temperature shift value TC is sent to the comparator 49 through the shift register 52.

The output of the comparator 49 is connected to the gate of the switching device 44. This switching device 44 controls the relay 46 which controls the energization of a solenoid valve V for controlling a coolant in the showcases S1, S3, S4 and also for controlling an electric heater for defroster.

The operation mode of each of the above functions is determined by the operation mode register 54. The operation mode set by the operation mode register 54 is set at the time of the production. In particular, any one of 64° C., 32° C., 16° C., 8° C., and 4° C. is selected, by the operation mode register 54, as the alteration width of the temperature shift value TC in the A/D converter 53.

Figure 6:
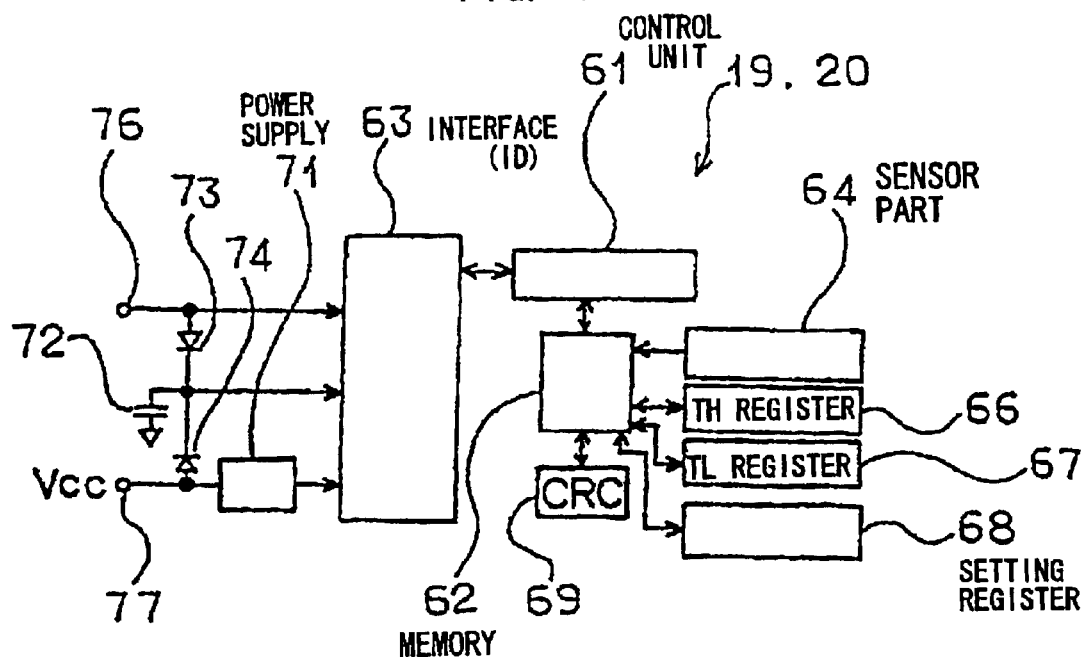
FIG. 6 is a block diagram of an electrical circuit in a temperature sensor.

On the other hand, as shown in detail in FIG. 6, the temperature sensor 19 (as well as the temperature sensor 20) comprises: a control unit 61 as terminal side control means; a memory 62 as storage means; an I/O interface 63 as send/receive means and storage means; a sensor part 64 as detection means, a TH register 66; a TL register 67, a setting register 68 for determining the status; a CRC generator 69 for matching of communication; a power supply detector 71 for detecting Vcc power supply which will be described later; a capacitor 72 and diodes 73, 74 which constitute accumulation and the like.

In this case, the capacitor 72 is connected to the output side of the diode 73, and an input terminal 76 is connected to diode 73 and the I/O interface 63. The input terminal 76 is connected by the changeover device 42 through the signal lines 17A, 17B to the thermostat chip 41 or the signal line 17. The capacitor 72 is also connected to the I/O interface 63. Data are prepared from pulse signals made up of, for example, a potential of +5 V (high potential) and a potential of 0 V (low potential) and are sent to the output of the signal line 17 or the output of the thermostat chip 41.

Upon the connection of the temperature sensor 19 to the signal line 17 or the thermostat chip 41 (signal line 17B), during a high potential period of the pulse signals, constituting the data, made up of high potential and low potential, power is supplied to each device and, in addition, the capacitor 72 is also charged. On the other hand, during a low potential period of the pulse signals, electricity is discharged from the capacitor 72 to supply each device with electric power.

The temperature sensor 19 is also provided with a Vcc (DC +5 V) power supply terminal 77 connected to a diode 74 and is constructed so that, upon the connection of the Vcc power supply terminal 77 to the power supply line, each device can also be operated by the supply of power from the power supply line (power source supply mode). That is, in this power source supply mode, each device is operated without charge of the capacitor 72. Therefore, this can improve convenience in the case where rapid operation of the temperature sensor 19 is desired, for example, at the time of inspection.

Upon the receipt of an instruction from the thermostat chip 41 (controller 16 in the case of the temperature sensor 20) through the I/O interface 63 as described later, the control unit 61 performs control in such a manner that the inner temperature (the surrounding temperature in the case of the temperature sensor 20) is detected by the sensor part 64 and the temperature data are taken in and are once written in the memory 62. On the other hand, upon polling through the I/O interface 63 by the thermostat chip 41 (the controller 16 in the case of the temperature sensor 20) as described later, the control unit 61 performs control in such a manner that the temperature data written in the memory 62 are sent through the I/O interface 63 to the thermostat chip 41 (the controller 16 in the case of the temperature sensor 20).

Here an ID code of the temperature sensor 19 per se and an identification data for identifying that the temperature sensor 19 is a sensor are written in the I/O interface 63, the upper limit temperature TH of the showcase is written in the TH register 66, and the lower limit temperature TL is written in the TL register 67. The data on these upper limit temperature TH and lower limit temperature TL are sent from the controller 16 through the signal line 17, the changeover device 42, and the signal line 17A. For example, a communication protocol for data communication with the thermostat chip 91 and the controller 16 is stored in the memory 62.

Upon a failure of the temperature sensor 19, data on the failure is also written in the memory 62 and is sent to the thermostat chip 41 and the controller 16. Further, the temperature sensor 19 has a self-holding function such that, when communication with the thermostat chip 41 or the like has been broken, the current state is held.

Figure 7:
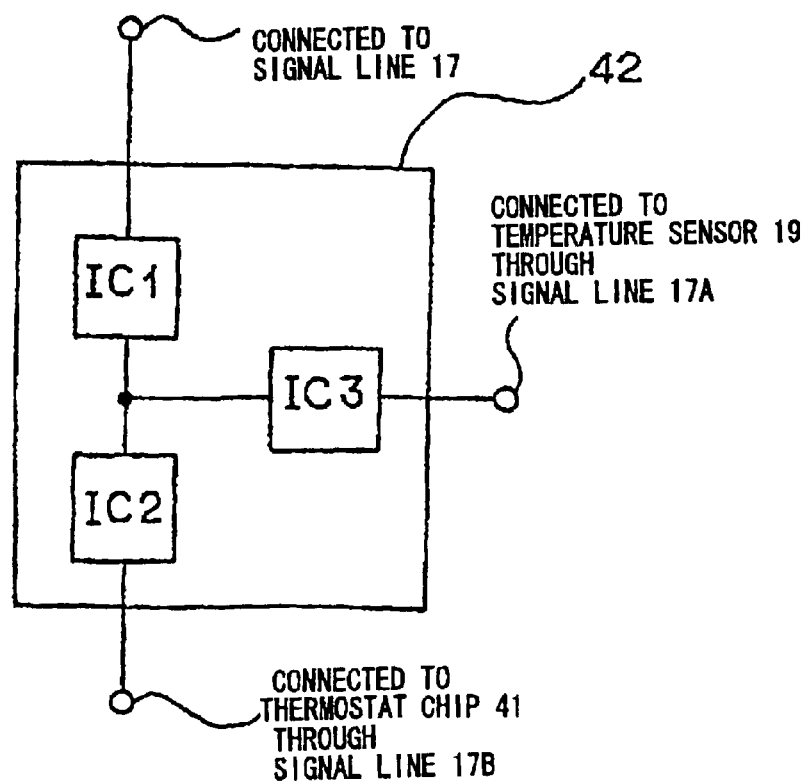
FIG. 7 is a block diagram of an electrical circuit in a changeover device.

FIG. 7 is a block diagram showing the internal construction of the changeover device 42. The changeover device 42 is composed of three ICs, IC1, IC2, and IC3, which are connected to one another through a data line. IC1 is connected to the signal line 17, the thermostat chip 41 is connected to IC2 through the signal line 17B, and the input terminal 76 of the temperature sensor 19 is connected to IC3 through the signal line 17A.

The line between the thermostat chip 41 (interface logic 47) and the temperature sensor 19 is always in a connected state. Upon the transmission of data (an instruction on connection) from the controller 16, however, the line between the thermostat chip 41 and the temperature sensor 19 is broken, and the line between the signal line 17 and the temperature sensor 19 is preferentially connected.

The construction of the temperature sensor 20 for monitoring is the same as the temperature sensor 19. The temperature sensor 20 is connected directly to the signal line 17 and, at the same time, is provided within the store, within or on the periphery of the showcases and the like (S1, S2, S3, S4, S5), and on the periphery of condensing units R1, R2 (for example, within a machinery room).

Figure 8:
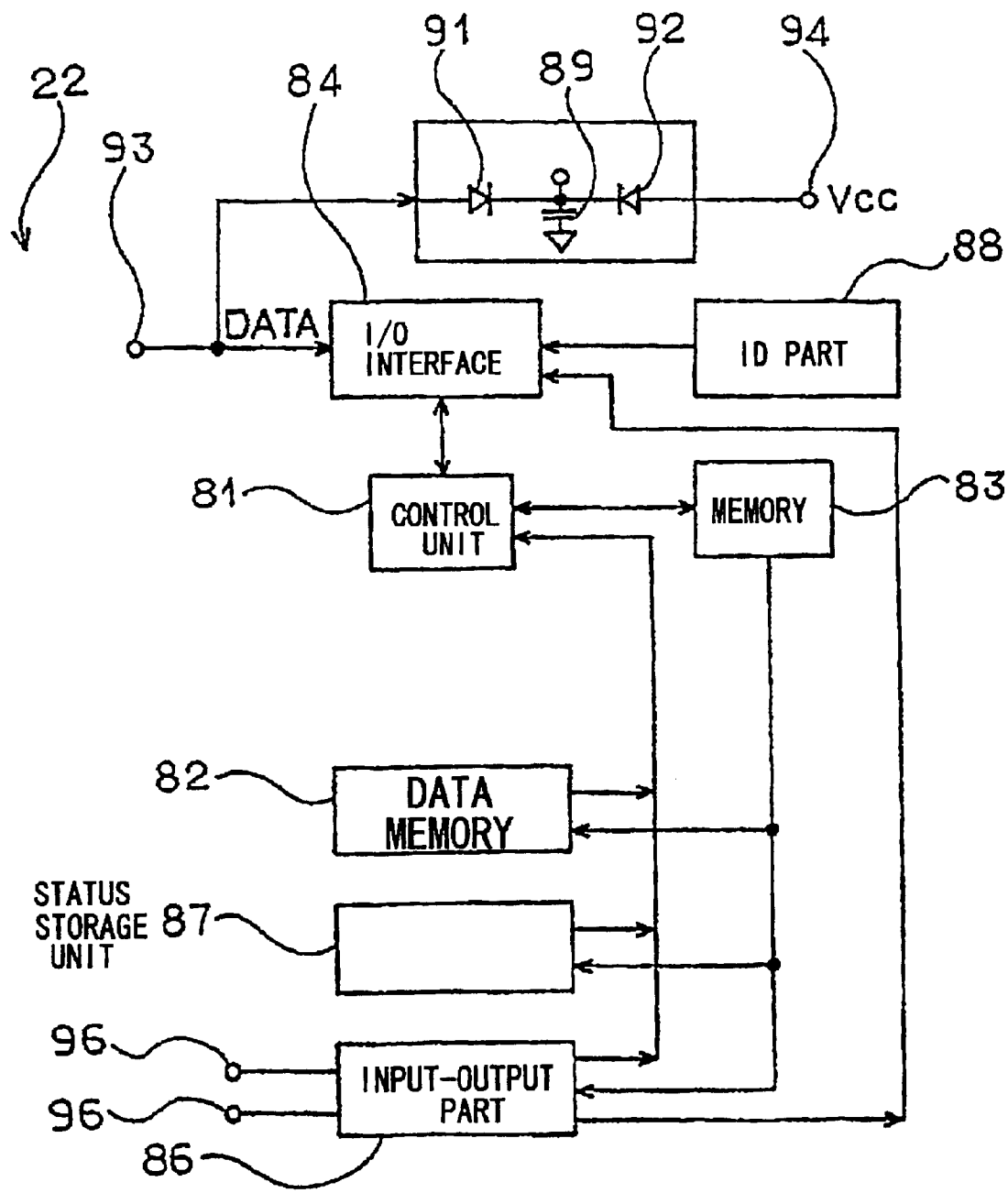
FIG. 8 is a block diagram of an electrical circuit in an I/O sensor unit.

On the other hand, FIG. 8 shows the construction of the I/O sensor unit 22. The I/O sensor unit 22 comprises: a control unit 81 as terminal side control means; memories 82, 83; an I/O interface 84; an input-output part 86; a status storage unit 87 for storing whether the input-output part 86 is in the state of input or output; an ID part 88 for storing its own ID code; a capacitor 89; diodes 91, 92; and the like.

In this case, the capacitor 89 is connected to the output side of the diodes 91, 92, and, when the input terminal 93 of the I/O sensor unit 22, to which each device is connected, is connected through the signal line 17 to the terminal of the capacitor 89, as described above, during a high potential period of the pulse signals, constituting the data, made up of high potential and low potential, power is supplied to each device and, in addition, the capacitor 89 is also charged. On the other hand, during a low potential period of the pulse signals, electricity is discharged from the capacitor 89 to supply each device with electric power.

The I/O sensor unit 22 is also provided with a Vcc (DC +5 V) power supply terminal 94 connected to the input side of the diode 92, and, upon the connection of the Vcc power supply terminal 94 to the power supply line, each device in the I/O sensor unit 22 can also be operated by the supply of power from the power supply line. That is, in this case, each device is operated without charge of the capacitor 89. Therefore, this can improve convenience in the case where rapid operation of the I/O sensor unit 22 is desired, for example, at the time of inspection.

Upon the transmission of ON/OFF data from the controller 16 through the signal line 17 and the I/O interface 84 to the control unit 81, the control unit 81 performs control in such a manner that, based on the ON/OFF data, the input-output part 86 performs ON/OFF of two input-output terminals 96, 96 (output mode).

Here, as described above, an ID code of the I/O sensor unit 22 per se and an identification data for identifying that the I/O sensor unit 22 is an I/O sensor unit are stored in the ID part 88. For example, various data and a communication protocol for data communication with the controller 16 are stored in the memory 82. Upon a failure of the I/O sensor unit 22, data on the failure is also written in the memory 82 and is sent to the controller 16. The I/O sensor unit 22 also has a self-holding function such that, when communication with the controller 16 has been broken, the current state is held.

Figure 9:
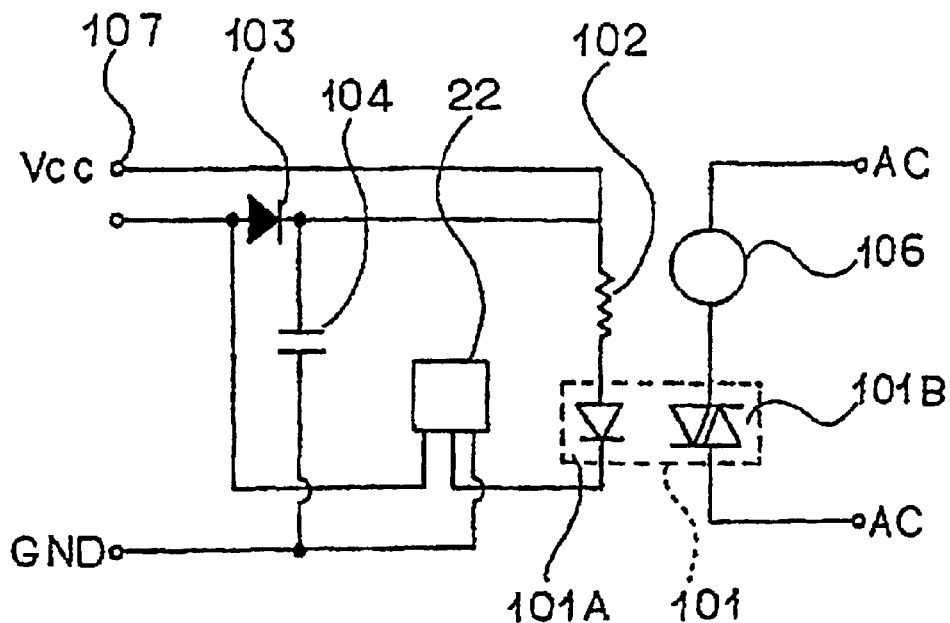
FIG. 9 is an electrical circuit diagram of an I/O sensor unit and a peripheral circuit.

Wiring of the I/O sensor unit 22 (the input-output part 86 being in output mode) is carried out on a substrate as shown in FIG. 9. Specifically, numeral 101 designates a photocoupler comprising a photodiode 101A and a phototriac 101B, numeral 102 a resistor, numeral 103 a diode as a rectification device, and numeral 104 a capacitor as an accumulation device.

In this case, the capacitor 104 is connected to the output side of the diode 103. The resistor 102 and the photodiode 101A are connected in series between the point of connection of the diode 103 with the capacitor 104 and the input-output terminal 96 in the I/O sensor unit 22. The Vcc power supply terminal 94 in the I/O sensor unit 22 is connected to a portion before the diode 103. The phototriac 101B is connected between a power supply AC and an AC control device (for example, a thyristor) 106. This AC control device 106 controls the operation of the air conditioner 12, dims lighting 13, and further sends control output to the transmitter 7.

Here, upon the connection of the diode 103 to the signal line 17, during a high potential period of the pulse signals, constituting the data, made up of high potential and low potential, power is supplied to the photodiode 101A through the resistor 102 and, in addition, the capacitor 104 is also charged. On the other hand, during a low potential period of the pulse signals, electricity is discharged from the capacitor 104 to supply the photodiode 101A with power source.

Likewise, when a Vcc power supply terminal 107 is connected to the point of connection between the diode 103 and the capacitor 104 and is connected to the power supply line, the photodiode 101A can also be operated by supplying power through the power supply line. That is, in this case, each device is operated without charging the capacitor 104. Therefore, this can improve convenience in the case where rapid operation is desired, for example, at the time of inspection.

The input-output part 86 in the I/O sensor unit 22 mounted on the condensing units R1, R2 is brought to an input mode, detects the state of operation of the condensing units R1, R2, and sends data to the controller 16. Further, the high-temperature sensor unit 23 detects abnormal high temperature of the condensing units R1, R2 and sends data to the controller 16.

Figure 10:
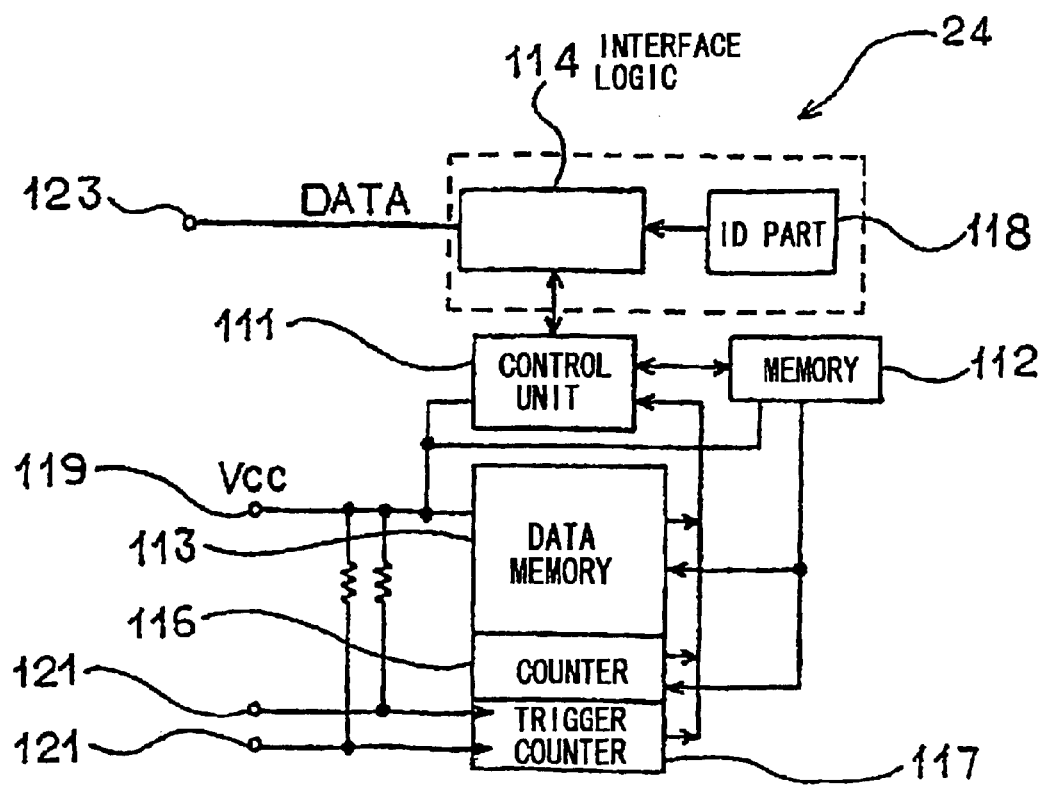
FIG. 10 is a block diagram of an electrical circuit in a counter sensor unit.

FIG. 10 shows the construction of the counter sensor unit 24. The counter sensor unit 24 comprises: a control unit 111 as terminal side control means; memories 112, 113 as storage means; an interface logic 114 as send/receive means connected to the signal line 17 through the terminal 123; a counter 116; a trigger counter 117; an ID part 118 as storage means for storing its own ID code; and accumulation means not shown in the drawing, such as a capacitor and a diode.

Also in this case, as described above, a construction is adopted wherein, during a high potential period of the pulse signals, constituting the data, made up of high potential and low potential, power is supplied to each device and, in addition, the capacitor is also charged. On the other hand, during a low potential period of the pulse signals, electricity is discharged from the capacitor to supply each device with electric power.

The counter sensor unit 24 is also provided with a Vcc (DC +5 V) power supply terminal 119. Upon the connection of the Vcc power supply terminal 119 to the power supply line, each device in the counter sensor unit 24 can also be operated by the supply of power from the power supply line. That is, in this case, each device is operated without charge of the capacitor. Therefore, this can improve convenience in the case where rapid operation of the counter sensor unit 24 is desired, for example, at the time of inspection.

The watt-hour meter 27 detects power consumed in the convenience store CVS and generates pulse output. When the power consumption at that time is small, the pulse intervals are long, while when the power consumption is large, the pulse intervals are short.

The pulse output is input into input terminals 121, 121 (two terminals) in the counter sensor unit 24. Upon a rise of the pulse, the trigger counter 117 detects pulse output of the watt-hour meter 27, and the counter 116 counts (cumulates) pulse output detected by the trigger counter 117.

Upon polling by the controller 16, the control unit 111 receives count data counted by the counter 116, and the interface logic 114 sends the count data through the signal line 17 to the controller 16.

Here the ID code of the counter sensor unit 24 per se and an identification data for identifying that the counter sensor unit 24 is a counter sensor unit, are written in the ID part 118. For example, a communication protocol for data communication with the controller 16 is stored in the memory 113. Upon a failure of the counter sensor unit 24, data on the failure is also written in the memory 113 and is sent to the controller 16. Further, the counter sensor unit 24 has a self-holding function such that, when communication with the controller 16 has been broken, the current state is held.

Next, the operation in the above construction will be explained. It will be assumed that the changeover device 42 connects the line between the temperature sensor 19 (signal line 17A) to the signal line 17. CPU 31 in the controller 16 first scans the status of the connection of each of the devices (the temperature sensors 19, 20, the I/O sensor unit 22, the high temperature sensor unit 23, the counter sensor unit 24, etc.) to the signal line 17.

Figure 11:
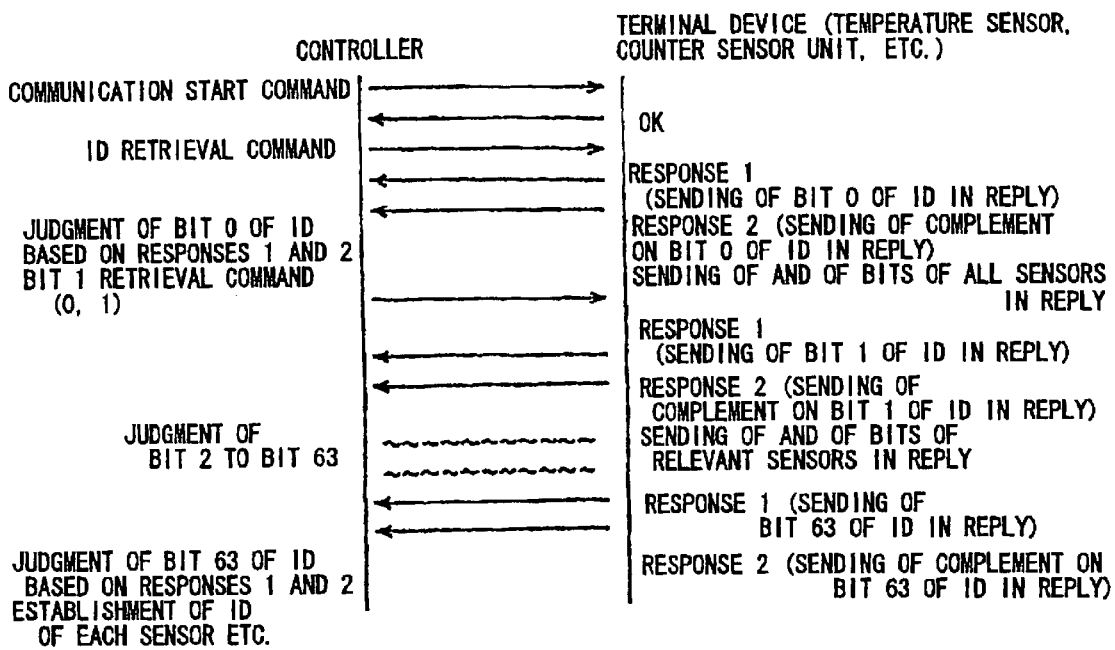
FIG. 11 is a diagram illustrating a procedure for reading ID codes of terminal devices, such as each temperature sensor and a counter sensor unit, by a controller.

This scanning is carried out by reading ID codes of each of the temperature sensors 19, 20, the I/O sensor unit 22, the high temperature sensor unit 23, and the counter sensor unit 24 in a procedure shown in FIG. 11. Hereinafter, all of these devices are referred to as "terminal devices," and it will be assumed that the ID codes of the four terminal devices are, for example, the following 64-bit ID codes.

| Bit | 012345678 ............ 63 |
|---|---|
| 1st terminal device | 001100000 ............ 0 |
| 2nd terminal device | 101100000 ............ 0 |
| 3rd terminal device | 110000000 ............ 0 |
| 4th terminal device | 001000000 ............ 0 |

The controller 16 (CPU 31) first sends a communication command (instruction) to each terminal device, and each of the terminal devices sends an OK command in reply. Next, as soon as the controller 16 sends an ID retrieval command, the terminal devices send the number in the 0th bit of their own ID codes in reply 1 and send the complement on the number in the 0th bit in reply 2 as follows. In fact, when the number in the 0th bit is 0, the connection terminal of the signal line 17 is brought to the low potential (hereinafter referred to as "L"), while, when the number in the 0th bit is 1, the connection terminal of the signal line 17 is brought to the high potential (hereinafter referred to as "H").

| Bit 0 | Response 1 | Response 2 |
|---|---|---|
| 1st terminal device | 0 | 1 |
| 2nd terminal device | 1 | 0 |
| 3rd terminal device | 1 | 0 |
| 4th terminal device | 0 | 1 |
| Logical product | 0 | 0 |

The controller 16 makes a judgment based on the logical product and finds out that 0 and 1 are present in the 0th bit in each terminal device. In fact, when there is even one "L" in the connection terminal in the terminal devices connected to the signal line 17, the signal line 17 is brought to "L," when all the connection terminals are "H," the signal line 17 is brought to "H." Since the controller 16 judges the potential of the signal line 17, the controller 16 detects information on the logical product.

Accordingly, the controller 16 sends retrieval commands 0, 1 in the 1st bit. At that time, according to the construction, when 0 has been sent, only the terminal device, in which the number in the 0th bit is 0, sends the number in the 1st bit in reply, while, when 1 has been sent, only the terminal device, in which the number in the 0th bit is 1, sends the number in the 1st bit in reply.

Accordingly, the reply to 0 at the time of retrieval of the 1st bit is made from the first and fourth terminal devices as follows.

| Bit 1 | Response 1 | Response 2 |
|---|---|---|
| 1st terminal device | 0 | 1 |
| 2nd terminal device |  |  |
| 3rd terminal device |  |  |
| 4th terminal device | 0 | 1 |
| Logical product | 0 | 1 |

The controller 16 makes a judgment based on the logical product to find out that only 0 is present in the 1st bit in this case. Therefore, the presence of the terminal device, in which the ID code is 00, is established.

The reply to 1 at the time of retrieval of the 1st bit is made from the second and third terminal devices as follows.

| Bit 1 | Response 1 | Response 2 |
|---|---|---|
| 1st terminal device |  |  |
| 2nd terminal device | 0 | 1 |
| 3rd terminal device | 1 | 0 |
| 4th terminal device |  |  |
| Logical product | 0 | 0 |

The controller 16 makes a judgment based on the logical product to find out that 0 and 1 are present in the 1st bit in this case. Accordingly, it is apparent that, in this case, a terminal device having an ID code of 10 and a terminal device having an ID code of 11 are present.

Upon the establishment of the presence of the ID code 00, the controller 16 sends a retrieval command 0 of the 2nd bit. The reply to 0 at the time of retrieval in the 2nd bit is made from the first and fourth terminal devices as follows.

| Bit 2 | Response 1 | Response 2 |
|---|---|---|
| 1st terminal device | 1 | 0 |
| 2nd terminal device | | |
| 3rd terminal device | | |
| 4th terminal device | 1 | 0 |
| Logical product | 1 | 0 |

The controller 16 makes a judgment based on the logical product to find out that only 1 is present in the 2nd bit in this case. Accordingly, the presence of a terminal device having an ID code of 001 is established.

Next, upon the establishment of the presence of the ID code 001, the controller 16 sends a retrieval command 1 of the 3rd bit. The reply to 1 at the time of the retrieval of the 3rd bit is made from the first and fourth terminal devices.

| Bit 3 | Response 1 | Response 2 |
|---|---|---|
| 1st terminal device | 1 | 0 |
| 2nd terminal device | | |
| 3rd terminal device | | |
| 4th terminal device | 0 | 1 |
| Logical product | 0 | 0 |

The controller 16 makes a judgment based on the logical product to find out that 0 and 1 are present in the 3rd bit in this case. Accordingly, the presence of a terminal device having an ID code of 0011 and a terminal device having an ID code of 0010 are established.

Next, upon the establishment of the presence of the ID codes 0011 and 0010, the controller 16 sends a retrieval command 1 in the 4th bit. The reply to 1 at the time of retrieval of the 4th bit is made from the first and fourth terminal devices.

| Bit 4 | Response 1 | Response 2 |
|---|---|---|
| 1st terminal device | 1 | 0 |
| 2nd terminal device | | |
| 3rd terminal device | | |
| 4th terminal device | 0 | 1 |
| Logical product | 0 | 0 |

The controller 16 makes a judgment based on the logical product to find out that 0 and 1 are present in the 4th bit in this case. Accordingly, the presence of a terminal device having an ID code of 00110 and a terminal device having an ID code of 0010 is established.

Next, upon the establishment of the presence of the ID code 00110, the controller 16 sends a retrieval command 0 of the 5th bit. The reply to 0 at the time of the retrieval of the 5th bit is made from the first terminal device only.

| Bit 5 | Response 1 | Response 2 |
|---|---|---|
| 1st terminal device | 0 | 1 |
| 2nd terminal device | | |
| 3rd terminal device | | |
| 4th terminal device | | |
| Logical product | 0 | 1 |

The controller 16 makes a judgment based on the logical product to find out that only 0 is present in the 5th bit in this case. Accordingly, the presence of a terminal device having an ID code of 001100 is established. Thereafter, the transmission of only the retrieval command 0 is repeated until the 63rd bit. As a result, it is found out that the connection of a terminal device having an ID code of 001100 . . . 0, that is, the connection of the first terminal device having this ID code is established.

Further, since 1 and 0 are present in the 1st bit in reply to 1 at the time of the retrieval of the Tth bit, 0 and 1 are sent in the retrieval of the 2nd bit of this time and narrowing is carried out in the same manner as described above. Finally, when there is no bit in which 0 and 1 are present, for all the terminal devices, the ID code is established.

Based on the ID codes collected in this way, CPU 31 in the controller 16 identifies the status of the connection of the temperature sensors 19, 20 the I/O sensor unit 22, the high-temperature sensor unit 23, and the counter sensor unit 24, and the information on the status of connection of the terminal devices is stored in the memory 32, and, thereafter, each of the ID codes is used for the transmission of data to and the receptive of data from each temperature sensor or the sensor unit.

CPU 31 in the controler 16 then sends, using the collected ID codes, data on the upper limit temperature TH an the lower limit temperature TL to the temperature sensors 19 . . . The reply to 0 at the time of the retrieval of the 5th bit is made from the first terminal device only.

As soon as the changeover device 42 connects the thermostat chip 41 to the temperature sensor 19, the upper limit temperature TH and the lower limit temperature TL within the TH register 66 and the TL register 67 in the temperature sensor 19 are received by the interface logic 47 and are stored in the thermostat register 48. In this connection, it is assumed that, for example, 4° C. as the upper limit temperature TH (the content of the register being 00000100B) and 0° C. as the lower limit temperature TL (the content of the register being 00000000B) have been written in the thermostat register 48 through the interface logic 47.

It is assumed that, in the A/D converter 53, the alteration width of the temperature shift value TC is set to 16° C. by the operation mode register 54 and thermostat operation is set in the operation mode register 54. This permits the thermostat chip 41 to independently start the thermostat operation even after turning on the power supply.

When the resistance value of the volume 43 is changed to bring the temperature shift value TC to 8° C. (the content of the register being 00001000B) which is the center value of the alteration width 16° C., the comparator 49 adds the temperature shift value TC to the upper limit temperature TH (4° C.: 00000100B). This gives 00000100B+00001000B=00001100B, that is, 12° C., as the shifted upper limit temperature.

Further, the comparator 49 adds the temperature shift value TC to the lower limit temperature TL (0° C.: 00000000). This gives 00000000B+00001000B=00001000B, that is, 8° C., as the shifted lower limit temperature.

On the other hand, the interface logic 47 in the thermostat chip 41 polls the temperature sensor 19. In response to this polling, the control unit 61 in the temperature sensor 19 sends data on the temperature (internal temperature TP) written in the memory 62 to the thermostat chip 41 through the interface 63. The interface logic 47 receives the temperature data which are then written in the temperature data register 51.

The comparator 49 makes a comparison among the shifted upper limit temperature 12° C., the shifted lower limit temperature 8° C., and the internal temperature TP sent from the temperature sensor 19 to the temperature data register 51. When the internal temperature TP has reached 12° C. (upper limit temperature), the comparator 49 generates an output for turning ON the switching device 44. On the other hand, when the internal temperature TP has lowered to 8° C. (lower limit temperature), the comparator 49 generates an output for turning OFF the switching device 44.

As soon as the switching device 44 is turned ON, the relay 46 energizes the solenoid valve V which is then opened. On the other hand, when the switching device 44 is turned OFF, the relay 46 deenergizes the solenoid valve V. When the solenoid valve V in any one of the showcases S1, S3, S4 is in an opened state, the condensing units R1, R2 are operated through the control of a low-pressure switch (not shown). On the other hand, when the solenoid valve V in all the showcases S1, S3, S4 is in a closed state, the operation of the condensing units R1, R2 is stopped. This permits, for example, the inside of the open showcase S1 to be controlled at a temperature between 12° C. and 8° C.

Figure 12:
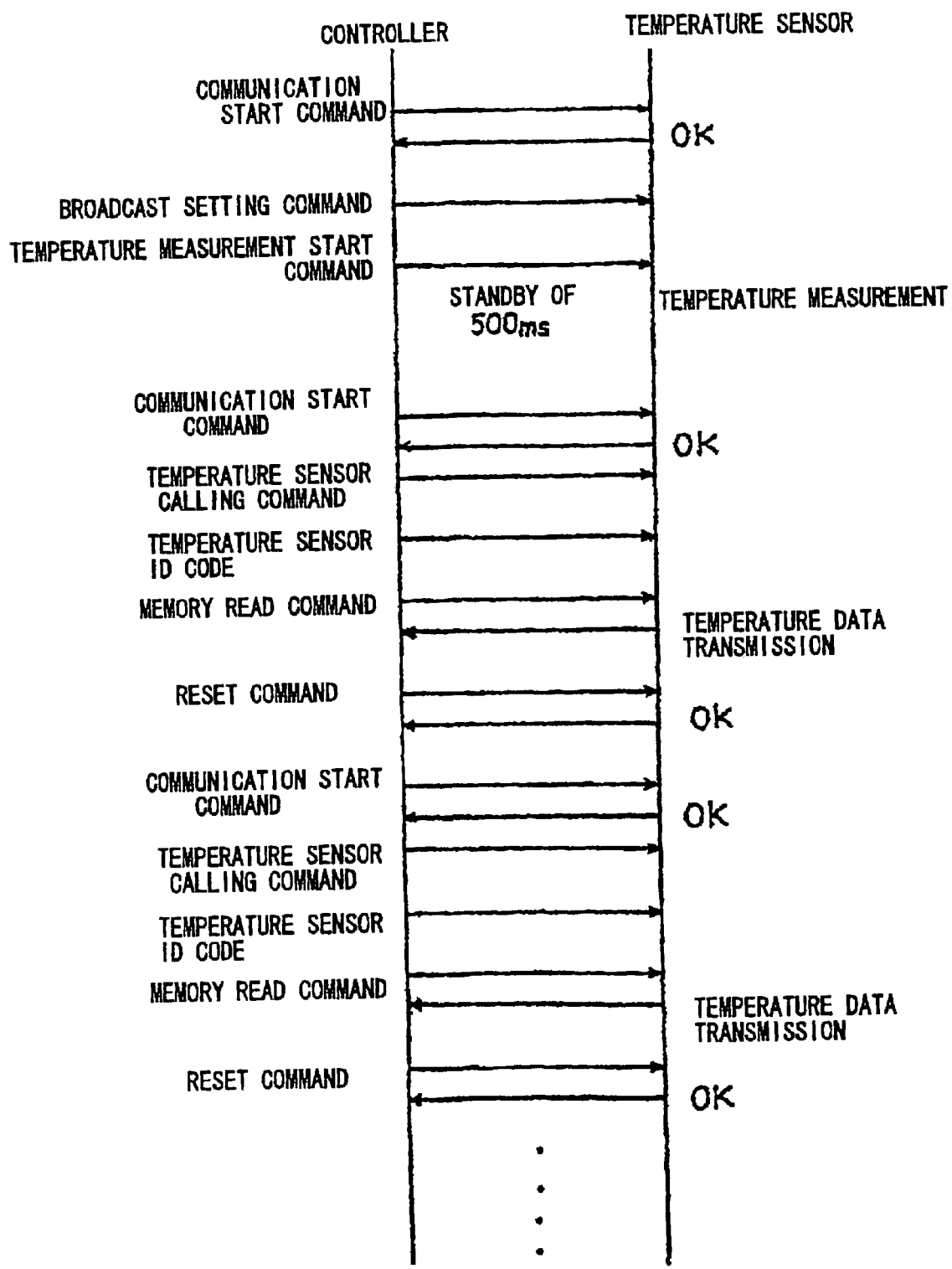
FIG. 12 is a diagram illustrating a procedure for collecting temperature data, sent from temperature sensors, by a controller.

The controller 16 polls the temperature sensors 20 . . . for monitoring. The procedure at that time (communication protocol) will be explained in conjunction with FIG. 12. In this case, it is assumed that the Vcc power supply terminal 77 in all the temperature sensors 20 . . . is not connected to the power supply line. This will be hereinafter referred to as "parasitic mode."

The controller 16 sends a communication start command. The controller 16 allows the port 36 connected to the signal line 17 to be usually in "H." The transmission of the communication start command is executed by bringing the port 36 to 500 to 960 µs (microseconds) "L." The controller 16 waits for 15 to 60 µs. During this period, the signal line 17 is in "H."

Thereafter, an OK command is sent from each temperature sensor 20 . . . in reply. The transmission of this OK command is executed by bringing the input terminal 76 to 60 to 240 µs "L."

The controller 16 sends a multiaddress setting command to the all the temperature sensors 20 . . . Upon the receipt of the multiaddress setting command through the I/O interface 63, the control unit 61 in the temperature sensors 20 . . . recognizes that a command, which is sent next, is an instruction (multiaddressing) to all the temperature sensors 20 . . . .

Next, the controller 16 sends a temperature measurement start command (an instruction for the start of detection operation) to all the temperature sensors 20 . . . After the transmission of the temperature measurement start command, the controller 16 waits for 500 ms (milliseconds). During this period, the signal line 17 is in "H," and power is supplied through the input terminal 76 to each device in all the temperature sensors 20 . . . and, in addition, the capacitor 72 is charged.

Upon the receipt of the temperature measurement start command (multiaddress command) through the I/O interface 63, the control unit 61 in all the temperature sensors 20 . . . allows the sensor parts 64 to simultaneously measure (detect) the temperature and stores the measured temperature data respectively in the memories 62. Upon the elapse of the standby period 500 ms, again, the controller 16 sends a communication start command, and an OK command is sent from all the temperature sensors 20 . . . in reply.

The controller 16 then sends a temperature sensor access command and the ID code of a specific temperature sensor 20 (for example, a temperature sensor 20 having the first ID code), followed by sending of a memory access command (an instruction for reading). The control unit 61 in the temperature sensor 20 having the above ID code sends, in response to the read command specified by its own ID code, the temperature data stored above in the memory 62 to the controller 16 in reply.

The CPU 31 in the controller 16 writes the temperature data sent from the temperature sensor 20 in the memory 32. Finally, the controller 16 sends a reset command, and an OK command is sent from the temperature sensor 20 in reply.

The controller 16 then sends a temperature sensor access command and an ID code of a next temperature sensor 20 (for example, a temperature sensor 20 having an ID code next to the above ID code), followed by sending of a memory access command (an instruction for reading). The control unit 61 in the temperature sensor 20 having this ID code sends, in response to the read command specified by its own ID code, the temperature data stored above in the memory 62 to the controller 16 in reply.

The CPU 31 in the controller 16 writes the temperature data sent from the temperature sensor 20 in the memory 32. Finally, the controller 16 sends a reset command, and an OK command is sent from the temperature sensor 20 in reply. The controller 16 repeatedly performs a series of operations from the transmission of the communication start command, the temperature sensor access command, the temperature sensor ID code to the transmission of the reset command for all the temperature sensors 20 . . . , whereby the temperature data are collected from all the temperature sensors 20 . . . This is true of the collection of temperature data of the temperature sensor 19 by the thermostat chip 41.

The CPU 31 in the controller 16 sends the temperature data, which have been collected in this way and written in the memory 32, to the personal computers P in the head office C and the maintenance commissioned company M. By virtue of this, centralized monitoring of the room temperature of the store, the internal temperature of each showcase, the temperature of the machinery room and the like can be realized in the head office C and the maintenance commissioned company M.

Thus, in the parasitic mode, at the time of the start of communication with the temperature sensors 20 (this being also applicable to the temperature sensor 19) and at the time of the start of temperature measurement, a standby period (500 ms) for maintaining the signal line 17 (17A, 17B) at "H" is provided (time intervals of other commands being, for example, 500 µs). Therefore, at the time of the start of communication with the controller 16 (thermostat chip 41), satisfactory power is supplied through the signal line 17 to the temperature sensor 20 (19). By virtue of this, the start of communication between a plurality of the temperature sensors 20 (19) connected to the signal line 17 and the controller 16 (thermostat chip 41) can be executed smoothly and surely.

During a period wherein all the temperature sensors 20 (19) execute temperature measurement, satisfactory power is supplied through the signal line 17 (17A, 17B). Therefore, reliable measurement operation can be realized. In this case, when satisfactory power is not supplied, data detected by the temperature sensor 20 (19) is "00."

Further, since the command for the start of detection operation is multiaddressed to all the temperature sensors 20 (19) . . . , all the temperature sensors 20 (19) can simultaneously carry out the temperature measurement. Furthermore, since the subsequent read command is sent to the individual temperature sensors 20 (19) using the respectively specified ID codes, the temperature data can be read from each of the temperature sensors 20 (19) without any difficulty.

Here when the temperature sensors 20 (19) carry out the temperature measurement and the reading of the temperature data measured by the temperature sensor 20 (19) is executed for each sensor, the above standby period should be provided for each temperature sensor 20 (19). This requires a very long time for the collection of temperature data. On the other hand, according to the invention, the provision of only one standby period (for example, one standby period of 500 ms) suffices for single data measurement/collection. Therefore, the collection of data from a plurality of the temperature sensors 20 connected to the signal line 17 and the like can be carried out in a short period. Further, shortening of the communication time can effectively prevent or suppress unfavorable introduction of noise during the communication. This generally can realize reliable and rapid detection operation.

CPU 31 in the controller 16 sends, to the individual I/O sensor units 22 . . . , control data together with their ID codes through the signal line 17. The control unit 81 in the I/O sensor unit 22 of each of the air conditioner 12 and the lighting 13, upon the receipt of control data on its own ID code, turns ON/OFF the input-output terminal 96 based on the control data in the above-described manner. The ON/OFF of the input-output terminal 96 turns ON (emission)/OFF (lights-out) of the photodiode 101A. This in turn turns ON/OFF the phototriac 101B and then turns ON/OFF the AC control device 106.

In general, 100% operation of the air conditioner 12 is carried out by the AC control device 106, and the lighting 13 emits light at 100% illuminance.

In the store (convenience store CVS), electric power is consumed by the operation of the showcases S1 to S5, the condensing units R1, R2, and the air conditioner 12 and the illumination of the lighting 13. The watt-hour meter 27 detects the electric power consumed in the store and, as described above, generates pulse output. The counter 116 in the counter sensor unit 24 counts (cumulates) the pulse output.

Figure 13:
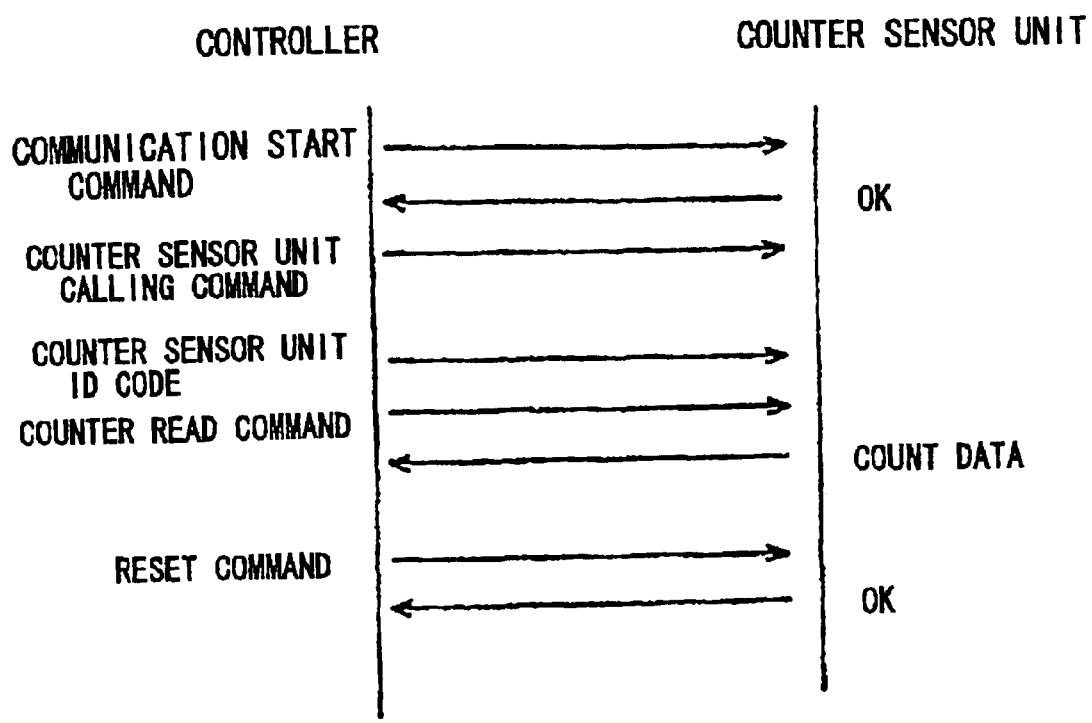
FIG. 13 is a diagram illustrating a procedure for collecting count data, sent from a counter sensor unit, by a controller.

The controller 16 polls the counter sensor unit 24. The procedure (communication protocol) in this case will be explained in conjunction with FIG. 13. The controller 16 sends a communication command, an OK command is sent from the counter sensor unit 24 in reply. The controller 16 sends a command for access to the counter sensor unit 24 and an ID code of the counter sensor unit 24.

The controller 16 sends a counter access command. In response to this polling, as described above, the control unit 111 in the counter sensor unit 24 sends count data counted by the counter 116 in reply. Finally, the controller 16 sends a reset command, and an OK command is sent from the counter sensor unit 24 in reply.

CPU 31 in the controller 16 once writes the received count data in the memory 32 and then computes electric power consumed in the store on that day and a tendency toward increase in the consumption of the electric power. As a result of the computation, when the power consumption is predicted to exceed the acceptable power consumption per day in the store, CPU 31 in the controller 16 sends, to the I/O sensor units 22 of the air conditioner 12 and the lighting 13, control data together with their ID codes through the signal line 17.

The control data in this case are such that the operation factor of the air conditioner 12 is lowered, for example, by 10% and dimming is carried out so as to lower the illuminance of the lighting 13, for example, by 20%. The control unit 81 in the I/O sensor unit 22 of each of the air conditioner 12 and the lighting 13, upon the receipt of control data on its own ID code, turns ON/OFF the input-output terminal 96 based on the control data in the above-described manner. The ON/OFF of the input-output terminal 96 turns ON (emission)/OFF (lights-out) of the photodiode 101A. This in turn turns ON/OFF the phototriac 101B and then turns ON/FF the AC control device 106. As a result, the air conditioner 12 is operated with 90% operation factor, and, further, the illumination of the lighting 13 is dimmed (darkened) to an illuminance of 80%.

Here when monitoring by the temperature sensor 20 has revealed the occurrence of an abnormal phenomenon, the controller 16 can send an instruction through the I/O sensor unit 22 to the transmitter 7 so that the fixed camera 8 is controlled to take a photograph of a site where the abnormal phenomenon has occurred.

The first preferred embodiment has been explained by taking the temperature sensor as an example. The invention, however, is not limited to the temperature sensor only and is applicable to sensors for detecting humidity, pressure or the like. Further, in the first preferred embodiment, the invention has been applied to the convenience store CVS. The invention, however, is not limited to this only and is applicable to supermarkets, restaurants, or other stores. Further, stores include ordinary office buildings. Further, in the invention, the number of sensors connected to the signal line is not limited.

As is apparent from the foregoing detailed description, according to the invention, in the terminal-side control means of the sensor, the send/receive means sends data detected by the detection means to the main control device through the signal line. Therefore, the main control device can receive detected data from the sensor without any difficulty.

In this case, the sensor is operated by electric power supplied through the signal line for sending or receiving data. Further, since the storage means has its own ID code, mere connection of each sensor to the signal line permits the main control device to identify the sensor and completes wiring of the sensor. By virtue of this, the wiring of the sensor can be made by the so-called "plug-in," which can significantly simplify wiring. Further, according to the invention, a common software can be used in the main control device independently of the number of sensors or the like. The adoption of a common software also can significantly reduce the cost.

In particular, in this case, upon the receipt of an instruction for the start of detection operation through the send/receive means from the main control device, the terminal-side control means of the sensor allows the detection means to execute detection operation. On the other hand, when the terminal-side control means has received, from the main control device, an instruction for reading, the terminal-side control means sends, through the send/receive means, data detected by the detection means to the main control device. After the transmission of the instruction for the start of detection operation, the main control device provides a standby period before the transmission of an instruction for reading, and, during this standby period, the signal line is maintained at a high potential. By virtue of this construction, during a period in which the terminal-side control means allows the detection means to execute the detection operation, satisfactory electric power is supplied through the signal line.

Further, in the invention defined in claim 1, the instruction for the start of detection operation is made to all the sensors from which data are to be collected. Therefore, when a plurality of sensors are connected, all the sensors can simultaneously perform detection operation. Further, since a subsequent instruction for reading is made to the sensors using specified respective ID codes, data can be read from each sensor without any difficulty. Therefore, when a plurality of sensors are connected to the signal line, the data can be collected from the sensors in a short period and, further, shortening of the communication time can effectively prevent or suppress unfavorable introduction of noise during the communication. This can generally realize reliable and rapid detection operation.

Figure 14:
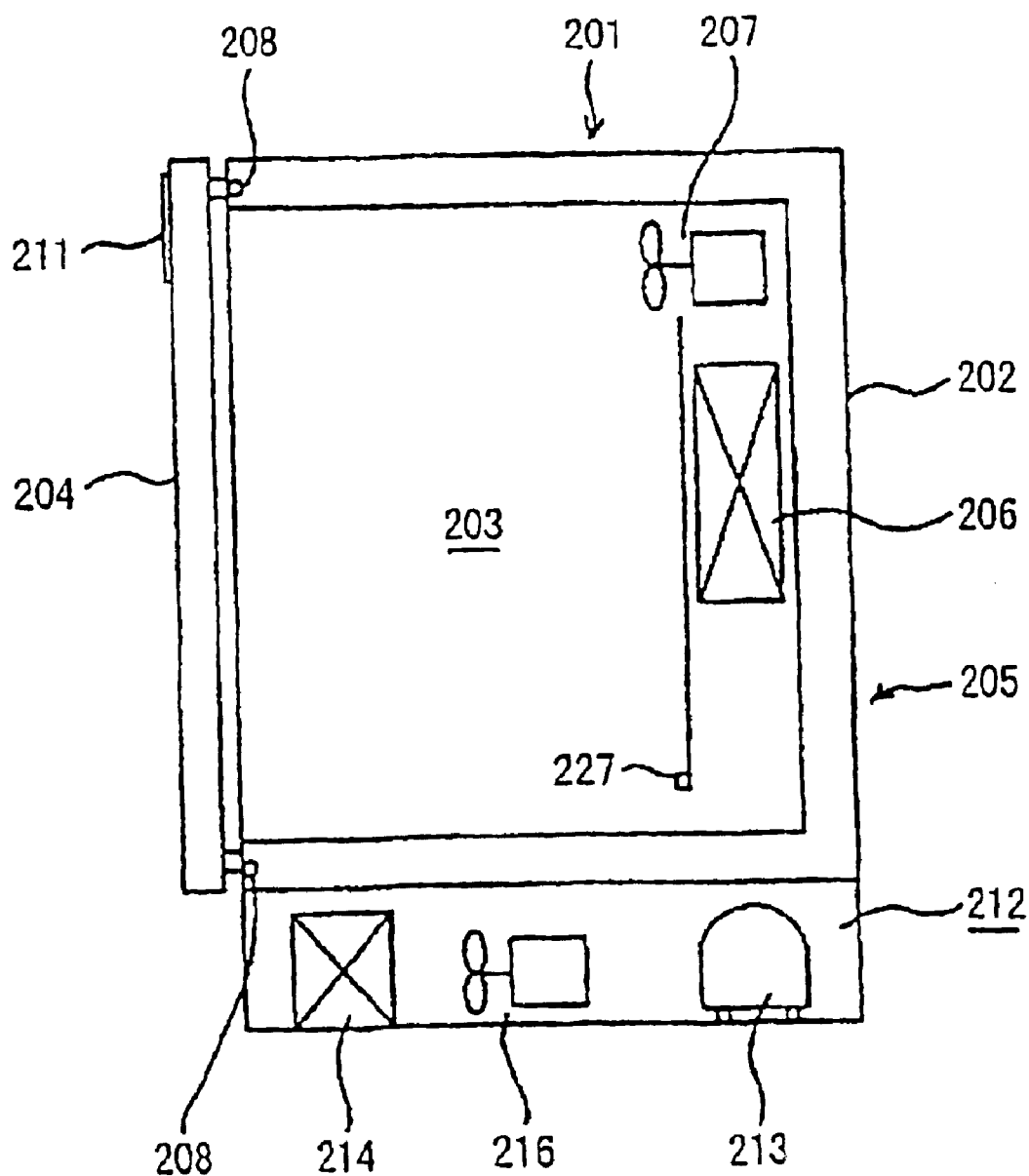
FIG. 14 is a schematic cross-sectional view of a refrigerator for commercial use in a second preferred embodiment of the invention.
Figure 15:
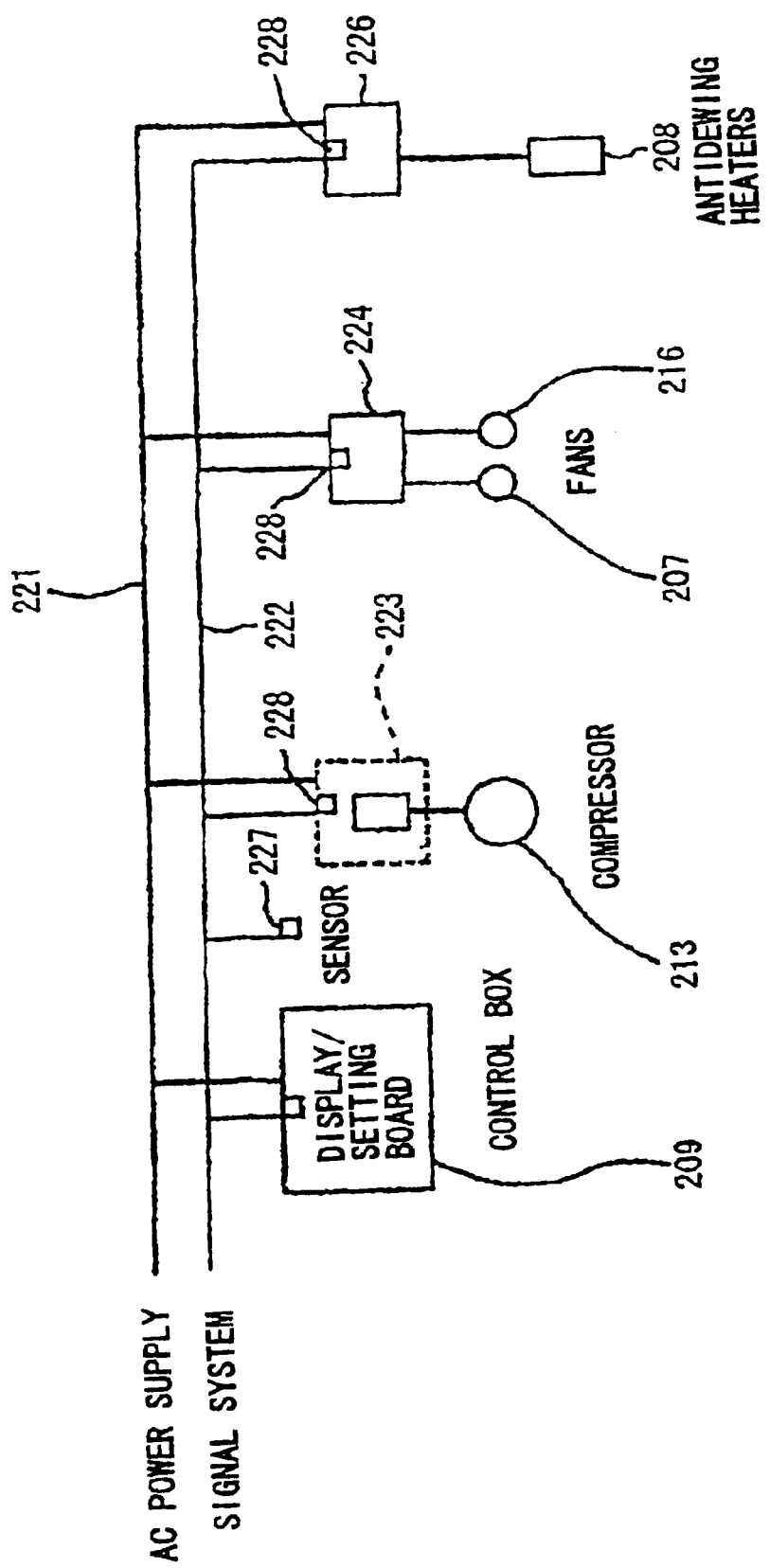
FIG. 15 is a wiring diagram of an electrical system of the refrigerator shown in FIG. 14.

FIG. 14 is a schematic cross-sectional view of a refrigerator 201 for commercial use, which is an example of equipment such as a cooling storeroom, in a second preferred embodiment of the invention, and FIG. 15 is a wiring diagram of an electrical system of the refrigerator 201 shown in FIG. 14. In the refrigerator 201 shown in FIG. 14, a body 205 is constituted by an insulating box 202 having an opening in its front face, and a storeroom 203 is provided within the insulating box 202. The opening provided in the front face of the storeroom 203 is openably closed by a door 204.

Further, a cooler 206 and a motor-driven cooling fan 207, which constitute a refrigerating cycle of the cooling device, are provided within the storeroom 203. An antidewing heater 208 for preventing dew formation is provided at the edge of the opening of the insulating box 202, and an operation panel 211 for a control box 209 as main control means is mounted on the front face of the door 204.

On the other hand, a machinery room 212 is provided on the underside of the insulating box 202, and, for example, a compressor 213, a condenser 214, and a fan 216 for a condenser, which, together with the cooler 206, constitute the refrigerating cycle of the cooling device, are provided within this machinery room 212.

Upon the start of the operation of the compressor 213, the heat of a high-temperature, high-pressure coolant delivered from the compressor 213 is dissipated in the condenser 214 to condense the coolant, and the condensed coolant is depressurized in a pressure reducing device (not shown) and is then fed to the cooler 206. In the cooler 206, the evaporation of this coolant provides cooling action. Thereafter, the low-temperature gas coolant is again returned to the compressor 213. Upon the start of the operation of the cooling fan 207, cold air cooled in the cooler 206 is circulated into the storeroom 203 to cool the inside of the storeroom 203. Upon the start of the operation of the fan 216 for a condenser, the open air is supplied to the condenser 214 and the compressor 213 to air cool them. Further, upon the energization of the antidewing heater 208, the edge of the opening in the insulating box 202 is heated to prevent dew formation.

In FIG. 15, numeral 221 designates an AC power supply line distributed to the inside of the body 205 in the cooling storeroom 201, and numeral 222 a signal line for sending or receiving data. The control box 209 is connected to the AC power supply line 221 and the signal line 222. A drive substrate 223 in the compressor 213, a power supply substrate 224 in the fans 207, 216, and a power supply substrate 226 in the antidewing heater 208 are connected to the AC power supply line 221.

A chip-shaped temperature sensor 227 and chip-shaped switching devices 228 mounted on the drive substrate 223 and the power supply substrates 224, 226 each are connected through a connector to the signal line 222. Here only one switching device 228 is shown in the power supply substrate 224. In fact, however, the switching device is provided in each of the fans 207, 216.

In the preferred embodiment, the drive substrate 223 and the power supply substrates 224, 226 are constructed separately from the compressor 213, the fans 207, 216 and the antidewing heater 208. Alternatively, a construction may be adopted wherein the drive substrate 223 and the power supply substrates 224, 226, together with the respective switching devices 228, may be built in the compressor 213, the fans 207, 216, and the antidewing heater 208. When the equipment is of the type wherein the temperature of the compressor 213 or the like should be detected, the temperature sensor 227 is also built in the compressor 213.

According to this construction, mere connection of each of the switching devices 228 and the temperature sensor 227 built in the compressor 213, the fans 207, 216, or the antidewing heater 208 to the connector of the signal line 222 completes wiring of these components. Therefore, working efficiency of assembly/wiring can be significantly improved.

Figure 16:
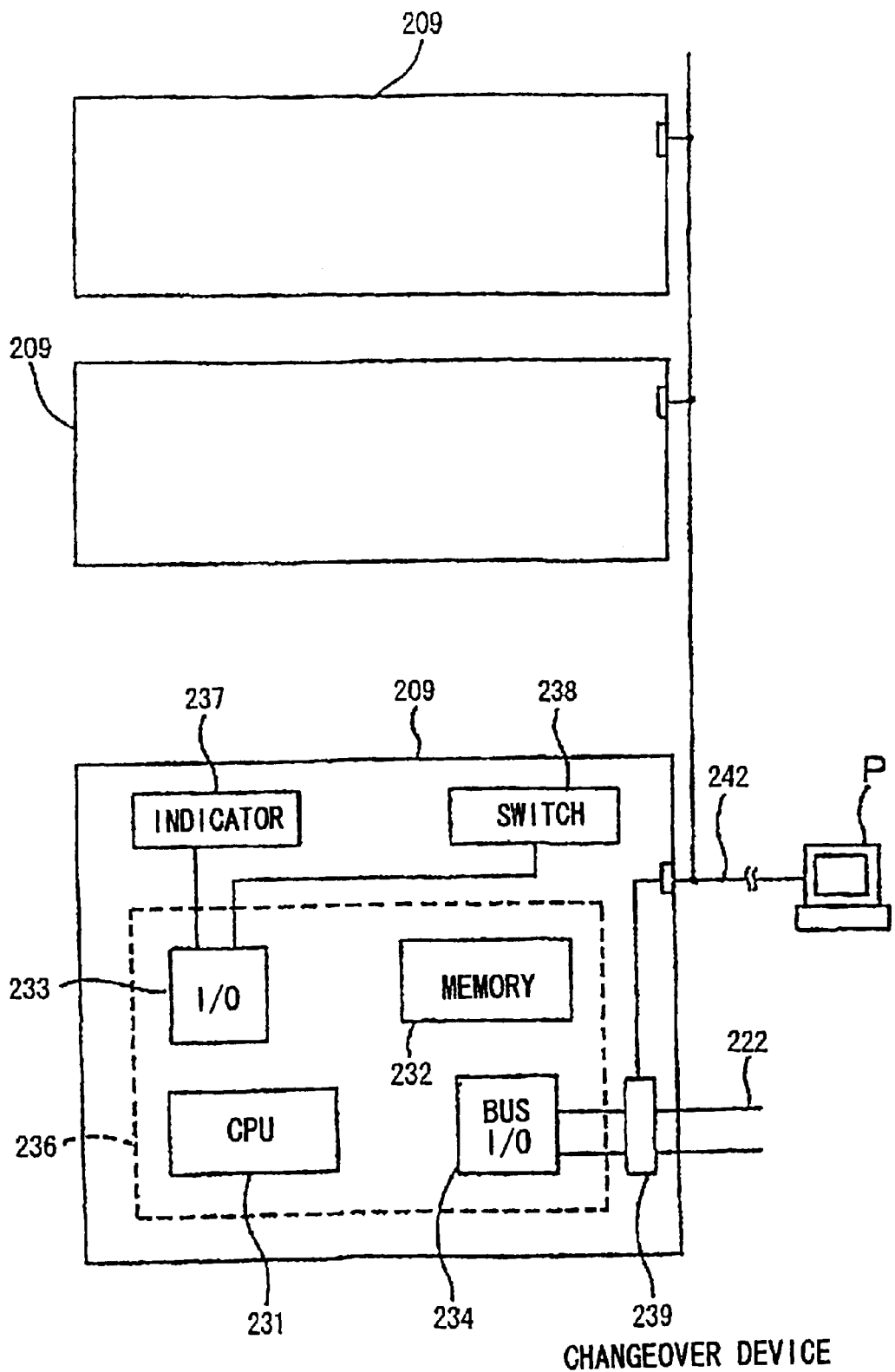
FIG. 16 is a block diagram of an electrical circuit in a control box.

FIG. 16 shows the construction of the control box 209. A controller (substrate) 236 is provided in the control box 209. This controller 236 comprises, for example, CPU (microcomputer) 231, a memory 232 as storage means, an I/O interface 233, and a bus I/O interface 234 as send/receive means. An indicator 237 comprising LED and the like, a switch 238 as input means, a changeover device 239 and the like are provided in the control box 209. The indicator 237 and the switch 238 are connected to the I/O interface 233 and are provided within the operation panel 211.

Figure 23:
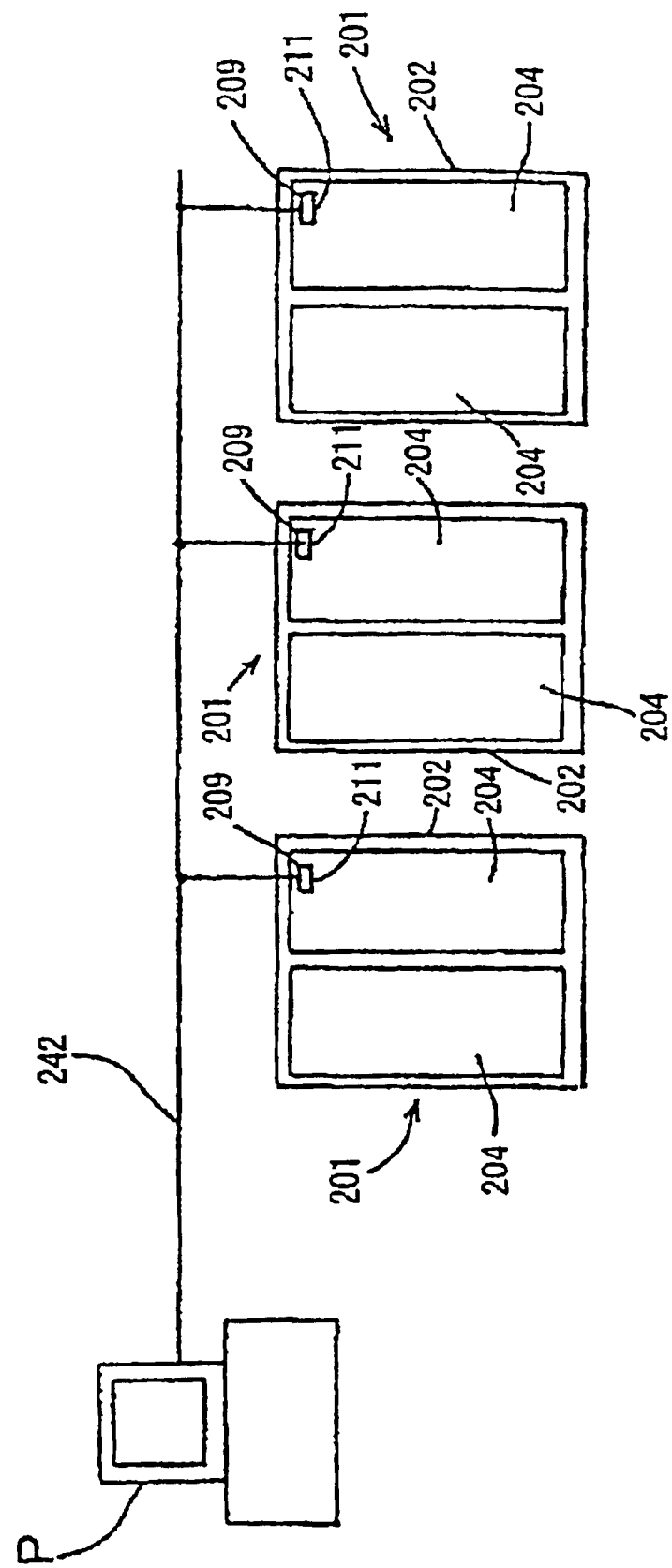
FIG. 23 is a diagram illustrating the connection of control boxes of a plurality of installed refrigerators to a personal computer through a communication line.

The bus I/O interface 234 is connected through the changeover device 239 to the signal line 222 and sends data to or receives data from the temperature sensor 227 and the switching devices 228 through the signal line 222. Here, as shown in FIG. 23, a plurality of refrigerators 201 are provided, and the changeover device 239 in the control box 209 of each of the refrigerators 201 is connected through a communication line 242, such as a telephone line, to an external control device such as an externally provided personal computer P. Upon the receipt of an instruction from the controller 236 or the personal computer P, the signal system connected to the signal line 222 is changed to the bus I/O interface 234 or the communication line 242, and the connection between the bus I/O interface 234 and the communication line 242 is controlled.

In this connection, it is assumed that a predetermined communication protocol for data communication with the temperature sensor 227, the switching device 228, the personal computer P, etc. and a software for identifying the temperature sensor 227 and the switching device 228 are set in the controller 236.

The construction of the temperature sensor 227 is shown in FIGS. 17 to 19 and 22. As shown in detail in FIG. 17(a), the temperature sensor 227 comprises: a control unit 240 as terminal-side control means; a memory 241 as storage means; an I/O interface 243 as send/receive means and storage means; a sensor part 244 as detection means; a TH register 245A; a TL register 245B; a setting register 245C for determining the status; a CRC generator 246 for matching of communication; a power supply detection part 247 for detecting Vcc power source which will be described later; a capacitor 248 and diodes 249A, 249B which constitute accumulation means; and the like.

In this case, the capacitor 248 is connected to the output side of the diodes 279A, 249B, and an input terminal 276 is connected to the diode 279A and the I/O interface 243 and is connected to a signal line 222 (not shown). The capacitor 248 is also connected to the I/O interface 243.

Upon the connection of the temperature sensor 227 to the signal line 222 (not shown), during a high potential period of the pulse signals, constituting the data, made up of high potential (+5 V) and low potential (0 V), power is supplied to each device and, in addition, the capacitor 248 is also charged. On the other hand, during a low potential period of the pulse signals, electricity is discharged from the capacitor 248 to supply each device with electric power.

The temperature sensor 227 is also provided with a Vcc (DC +5 V) power supply terminal 277 connected to a diode 249B and is constructed so that, upon the connection of the Vcc power supply terminal 277 to the power supply line, each device can also be operated by the supply of power from the power supply line (power source supply mode). That is, in this power source supply mode, each device is operated without charge of the capacitor 248. Therefore, this can improve convenience in the case where rapid operation of the temperature sensor 227 is desired, for example, at the time of inspection.

In the control unit 261, upon the receipt of an instruction for temperature detection input from the input terminal 276 through the signal line 222 (not shown) into the I/O interface 243, the sensor part 264 detects the internal temperature, and the temperature data are taken in and are once written in the memory 241. The temperature data written in the memory 241 are sent through the I/O interface 243 to the bus I/O interface 234 connected to the signal line 222.

Here an ID code of the temperature sensor 227 per se and an identification data for identifying that the temperature sensor 227 is a sensor are written in the I/O interface 243. The upper limit temperature TH of the showcase is written in the TH register 245A, and the lower limit temperature TL is written in the TL register 245B. The data on these upper limit temperature TH and lower limit temperature TL are sent from the I/O interface 243 through the signal line 222. For example, a communication protocol for data communication with the bus I/O interface 234 is stored in the memory 241. Upon a failure of the temperature sensor 227, data on the failure is also written in the memory 241 and is sent to the bus I/O interface 234. Further, the temperature sensor 227 has a self-holding function such that, when communication with the bus I/O interface 234 has been broken, the current state is held.

FIG. 17(b) shows a map of the memory 241. This memory 241 is an 8-bit scratch pad, and data are stored respectively in 0th to 8th bytes (byte 0 to byte 8). In the drawing, lower-temperature data is stored in byte 0, higher-temperature data is stored in byte 1, upper limit temperature TH and memory used by the user are stored in byte 2, lower limit temperature TL and memory used by the user are stored in byte 3, and configuration data is stored in byte 4. Byte 5 to byte 7 are unused, and CRC data is stored in byte 8.

Figure 18:
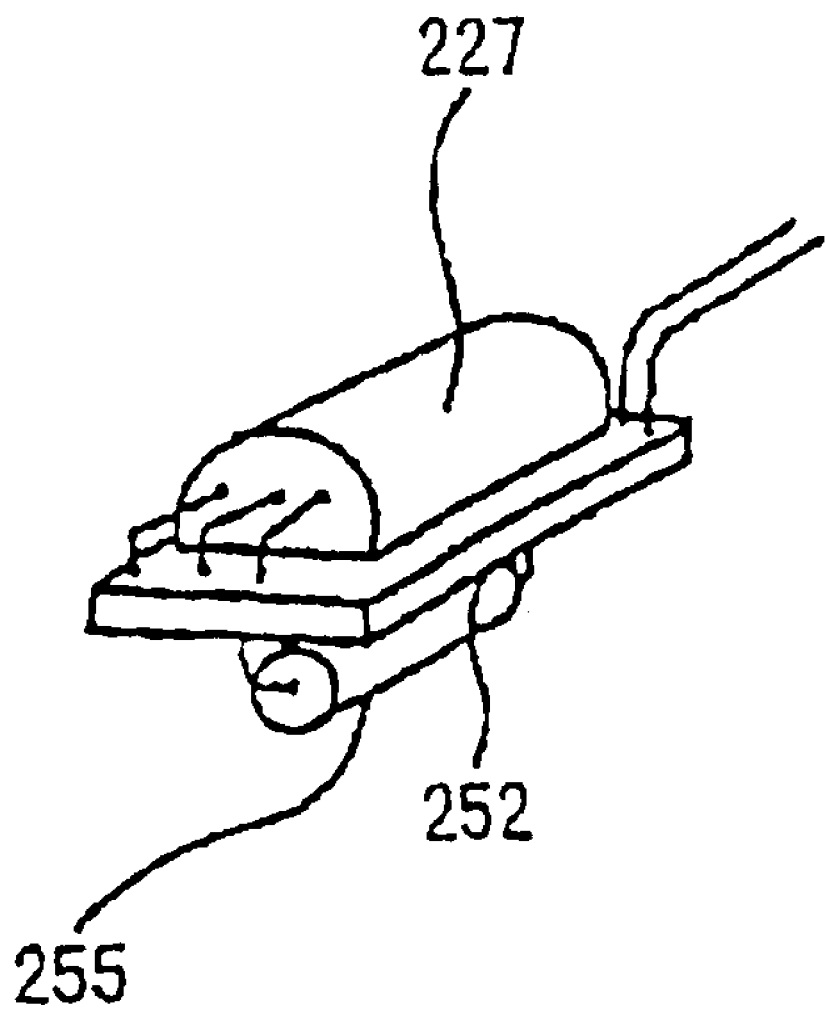
FIG. 18 is a perspective view of a temperature sensor.

As shown in FIG. 18, the temperature sensor 227 is mounted on one surface of a substrate 252 having a width of about 5 mm.

Figure 19:
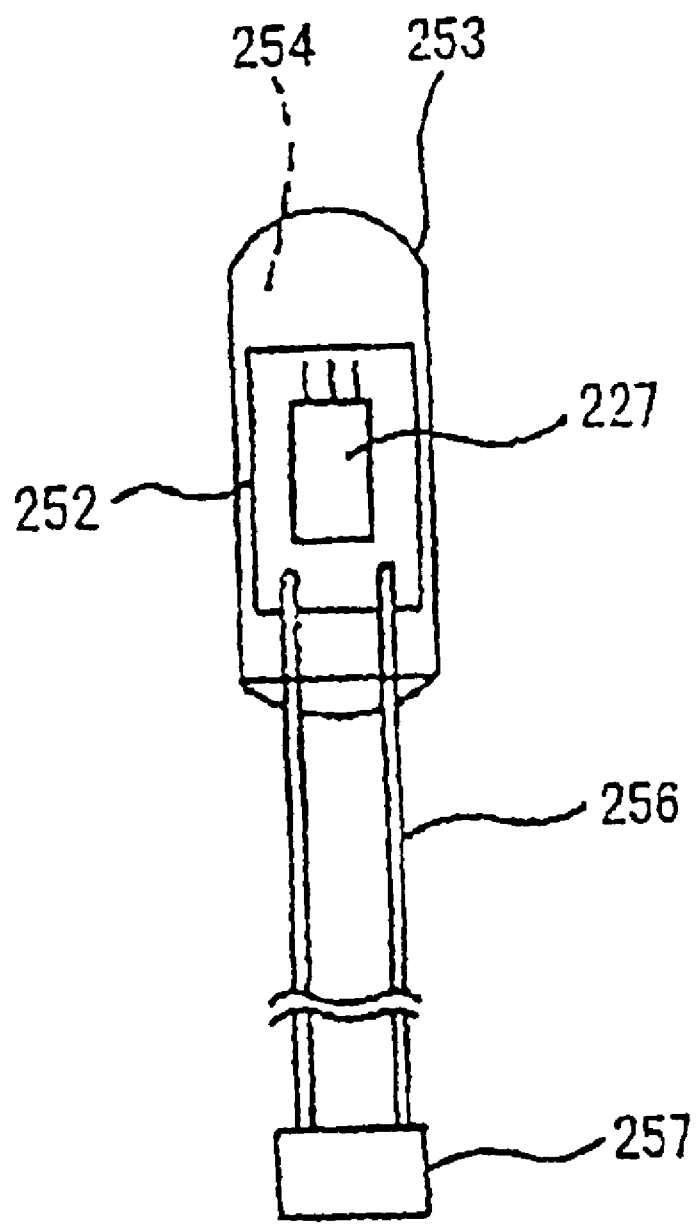
FIG. 19 is a plan view of a resin molded temperature sensor.

FIG. 19 shows a resin molded temperature sensor. The substrate 252, on which the temperature sensor 227 has been mounted, is further housed in a case 253 and is then molded with a resin 254. At that time, the surface of the substrate 252 has been subjected to primer treatment and thus has improved adhesion to the resin 254 and waterproofness.

Numeral 256 designates a lead wire drawn from the substrate 252, and the surface of the lead wire has also been subjected to primer treatment. Numeral 257 designates a connector for connection to the signal line 222. Thus, the provision of the chip of the temperature sensor 227 and the diode 255 on the substrate 252 followed by resin molding can significantly improve the strength and waterproofness of the temperature sensor 227 and can render the temperature sensor usable even under a severe environment.

Figure 20:
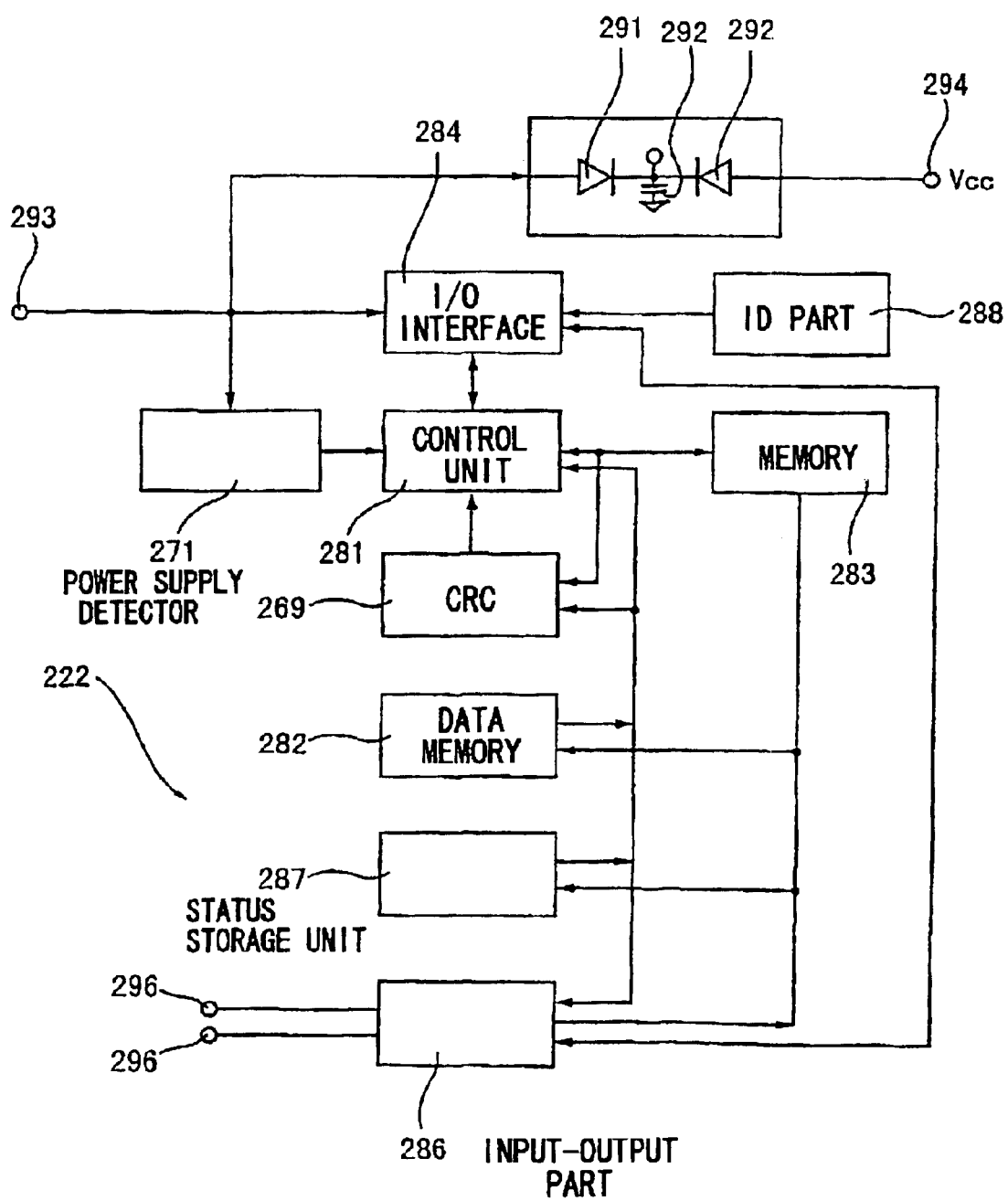
FIG. 20 is a block diagram of an electrical circuit in a switching device.

On the other hand, the construction of the switching device 228 is shown in FIG. 20. The switching device 228 comprises: a control unit 281 as terminal-side control means; memories 282, 283; an I/O interface 284; an input-output part 286; a status storage unit 287 for storing information on whether the input-output part 286 is in an input state or in an output state; an ID part 288 for storing its own ID code; a capacitor 289; diodes 291, 292; and the like.

In this case, when the capacitor 289 is connected to the output side of the diodes 291, 292 and when the input terminal 293 of the switching device 228, to which each device is connected, is connected through the signal line 222 to the terminal of the capacitor 289, as described above, during a high potential period of the pulse signals, constituting the data, made up of high potential and low potential, power is supplied to each device and, in addition, the capacitor 289 is also charged. On the other hand, during a low potential period of the pulse signals, electricity is discharged from the capacitor 289 to supply each device with electric power.

The switching device 228 is also provided with a Vcc (DC +5 V) power supply terminal 294 connected to the input side of the diode 292, and, upon the connection of the Vcc power supply terminal 294 to the power supply line, each device in the switching device 228 can also be operated by the supply of power from the power supply line. That is, in this case, each device is operated without charge of the capacitor 289. Therefore, this can improve convenience in the case where rapid operation of the switching device 228 is desired, for example, at the time of inspection.

Upon the transmission of ON/OFF data from the bus I/O interface 234 through the signal line 222 and the I/O interface 284 to the control unit 281, the control unit 281 performs control in such a manner that, based on the ON/OFF data, the input-output part 286 performs ON/OFF of two input-output terminals 296, 296 (output mode).

Here, as described above, an ID code of the switching device 228 per se and an identification data for identifying that the switching device 228 is an I/O sensor unit are stored in the ID part 288. For example, various data and a communication protocol for data communication with the bus I/O interface 234 are stored in the memory 282. Upon a failure of the switching device 228, data on the failure is also written in the memory 282 and is sent to the bus I/O interface 234. The switching device 228 also has a self-holding function such that, when communication with the bus I/O interface 234 has been broken, the current state is held.

Figure 21:
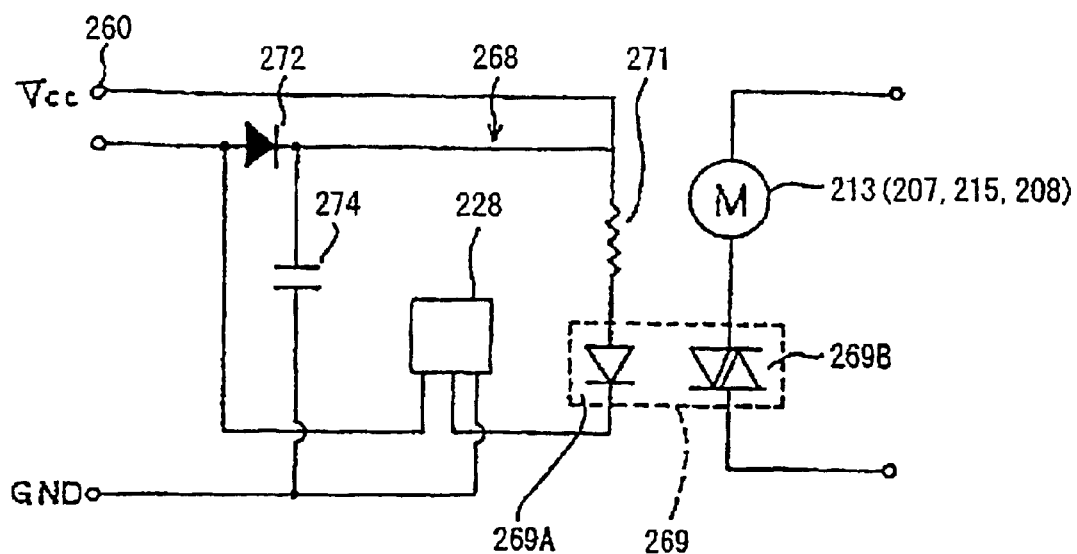
FIG. 21 is an electrical circuit diagram of a switching unit using a switching device.
Figure 22:
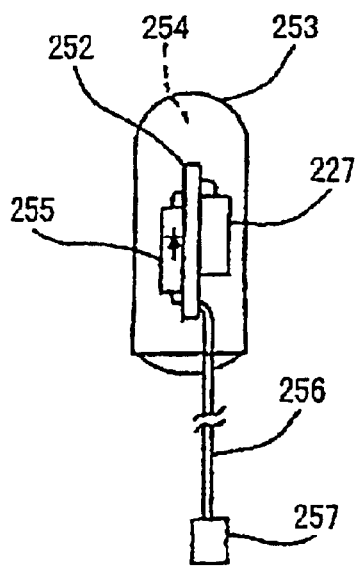
FIG. 22 is a side view of a resin molded temperature sensor.

Wiring of the switching device 228 is carried out on each of the drive substrate 223 and the power supply substrates 224, 226 as shown in FIG. 21 to constitute a switching unit 268. Specifically, numeral 269 designates a photocoupler comprising a photodiode 269A and a phototriac 269B, numeral 271 a resistor, numeral 272 a diode as a rectification device, and numeral 274 a capacitor as accumulation device.

In this case, the capacitor 274 is connected to the output side of the diode 272. The connection of the diode 272 with the capacitor 274, the resistor 271, and the photodiode 269A are connected in series to one end of the-switching device 228. The other end of the switching device 228 is connected to a portion before the diode 272. The phototriac 269B is provided between the AC power supply line 221 and the compressor 213, between the AC power supply line 221 and the fan 207, 215, and between the AC power supply line 221 and the antidewing heater 208.

Upon the connection of the diode 272 to the signal line 222, during a high potential period of the pulse signals, constituting the data, made up of high potential and low potential, power is supplied to the photodiode 269A through the resistor 271 and, in addition, the capacitor 274 is also charged. On the other hand, during a low potential period of the pulse signals, electricity is discharged from the capacitor 274 to supply the photodiode 269A with power source.

Likewise, when a Vcc power supply terminal 260 is connected to the connection between the diode 272 and the capacitor 274 and is connected to the power supply line, the photodiode 269A can also be operated by supplying power through the power supply line. That is, in this case, each device is operated without charging the capacitor 274. Therefore, this can improve convenience in the case where rapid operation is desired, for example, at the time of inspection.

The operation of the above construction will be explained. In this case, it will be assumed that the changeover device 239 connects the bus I/O interface 234 to the signal line 222. At the outset, the operation at the time of the completion of the assembly of the refrigerator 201 will be explained. When the temperature sensors 227 and the switching devices 228 . . . are connected to the signal line 222, CPU 231 in the controller 236 first scans the status of the connection of each device (temperature sensor 227 and switching device 228) to the signal line 222.

Upon polling by the controller 236, the control unit 240 in the temperature sensor 227 and the control unit 281 in the switching device 228 respectively send their own ID codes stored in the memory 241 and the ID part 288 in reply. Based on the ID codes sent back from the control units 240, 281, CPU 231 in the controller 236 identifies the status of the connection of the temperature sensor 227 and the switching devices 228 . . . , stores the data in the memory 232, and, thereafter, sends data using the ID code to each device.

Next, actual control operation will be explained. CPU 231 in the controller 236 polls the temperature sensor 227 at predetermined periods. This polling is carried out based on the above ID code. In reply to this polling, as described above, the control unit 240 in the temperature sensor 227 sends temperature data to the controller 236. CPU 231 in the controller 236 once writes the received temperature data in the memory 232, compares the temperature data with the set temperature, and sends ON/OFF data together with the ID code of the switching device 228 on the drive substrate 223 to the signal line 222.

The control unit 281 in the switching device 228 on the drive substrate 223, upon the receipt of ON/OFF data on its own ID code, turns ON/OFF the input-output terminals 296, 296 based on the ON/OFF data in the above-described manner. The ON/OFF of the input-output terminals 296, 296 turns ON (emission)/OFF (lights-out) of the photodiode 269A. This in turn turns ON/OFF the phototriac 269B and then starts/stops the compressor 213.

In this case, since the fans 207, 215 and the antidewing heater 208 are continuously energized, ON/OFF data to that effect is sent based on ID codes of the switching devices 228 on the respective power supply substrates 224, 226. Based on the ON/OFF data, the switching devices 228 operate or energize the fans 207, 215 or the antidewing heater 208.

Upon a failure of the temperature sensor 227 or the switching devices 228 . . . , data on the failure is sent from the control unit in each device to the controller 236. Upon the receipt of the data on failure, CPU 231 in the controller 236 displays on the indicator 237 to the effect that there is a failure in the temperature sensor 227 or the switching devices 228 . . . Further, the bus I/O interface 234 is connected through the changeover device 239 to the communication line 242 to inform the personal computer P of the failure.

Further, in such a state that the refrigerators 201 are independently controlled in the above-described manner, upon the occurrence of a failure of CPU 231 in the controller 236, the changeover device 239 connects the signal line 222 to the communication line 242 either automatically or according to an instruction from the personal computer P. By virtue of this, after that, the transmission of data to and the receipt of data from the temperature sensors 227 and the switching devices 228 . . . and the control of the temperature sensors 227 and the switching devices 228 are carried out by the personal computer P, and each equipment is controlled by an instruction from the personal computer P.

Next, when the refrigerators 201 are controlled in a centralized manner by the personal computer P, according to an instruction from the controller 236 or the personal computer P, the changeover device 239 connects the signal line 222 to the communication line 242. By virtue of this, after that, the transmission of data to and the receipt of data from the temperature sensors 227 and the switching devices 228 . . . and the control of the temperature sensors 227 and the switching devices 228 . . . are carried out by the personal computer P, and, the compressor 213 and the like in the refrigerators 201 can be controlled by the personal computer P in a centralized manner.

For example, when the compressors 213 respectively in the refrigerators 201 . . . are started, they are started at varied timings. This can realize control such that, for example, the maximum power consumption is reduced to level the electric power.

In the preferred embodiment, the invention has been explained by taking a refrigerator for commercial use as an example. The invention, however, is not limited to this only and is also applicable, for example, to various electrical apparatuses, such as household refrigerators and low-temperature showcases, prefabricated refrigerators, air conditioners, and vending machines, and, further, automobiles, home automation/security system in houses or buildings.

Further, the preferred embodiment has been explained by taking the temperature sensor as an example. Alternatively, a device for detecting humidity, pressure or the like may be used as the sensor part to use it as a humidity sensor or a pressure sensor.

As is apparent from the foregoing detailed description, according to the invention, the sensor-side control means in the sensor, for example, for temperature detection writes data detected by a detection device, such as a temperature detection device, in storage means and sends the data from the send/receive means through the signal line to the main control means. Therefore, the main control means in a cooling storehouse or other apparatuses can receive data without any difficulty.

In this case, since the sensor has its own ID code in its storage means, upon the connection of the sensor to the signal line, the main control means can identify the sensor. This completes wiring of the sensor. By virtue of this, the wiring of the sensor can be made by the so-called "plug-in," which can significantly simplify wiring. Further, according to the invention, a common software can be used in the main control means independently of the number of sensors or the like. The common use of the main control means also can significantly reduce the cost.

Further, switching device-side control means in the switching device for controlling the operation of mounted components such as compressors and fans controls the switching means based on data from the main control means received by the send/receive means through the signal line. Therefore, the main control means in the cooling storehouse or other apparatuses can execute the control of mounted components in the apparatuses without any difficulty.

In this case, since the switching device has its own ID code in its storage means, upon the connection of the switching device to the signal line, the main control means can identify the switching device. This completes wiring of the switching device. By virtue of this, as with the above case, the wiring of the switching device can be made by the so-called "plug-in," which can significantly simplify wiring. Further, according to the invention, a common software can be used in the main control means independently of the number of switching devices or the like. The common use of the main control means also can significantly reduce the cost.

Further, since the sensor and/or the switching device are provided with an accumulation device which is charged during a high potential period of the signal line and is discharged, during a low potential period of the signal line, to supply each means with electric power, the sensor or the switching device can be operated by electric power from the signal line for sending or receiving data. Accordingly, wiring can be completed simply by connecting the sensor or the switching device to the signal line without the need to connect the sensor or the switching device to the power supply line. This can further simplify wiring by plug-in.

In addition, since the sensor or the switching device is built in components to be mounted on apparatuses such as cooling storehouses, mere mounting of the component to the apparatus followed by the connection of the sensor or the switching device to the signal line can complete the wiring of the mounting component. This can improve assembly efficiency at the time of production of the apparatus or can make it very easy to additionally provide components after the production of the apparatus.

Figure 24:
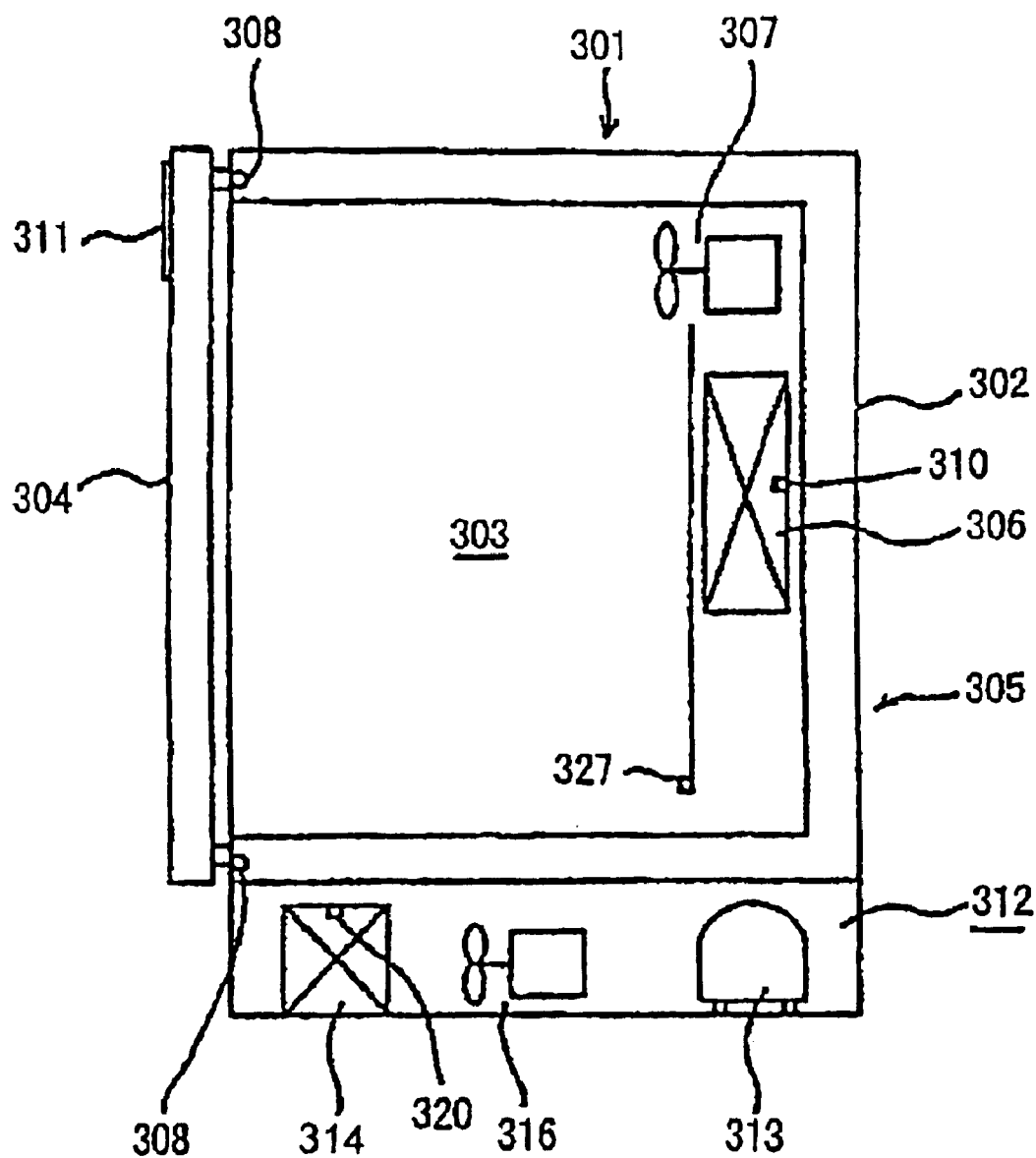
FIG. 24 is a schematic cross-sectional view of a refrigerator for commercial use in a third preferred embodiment of the invention.
Figure 25:
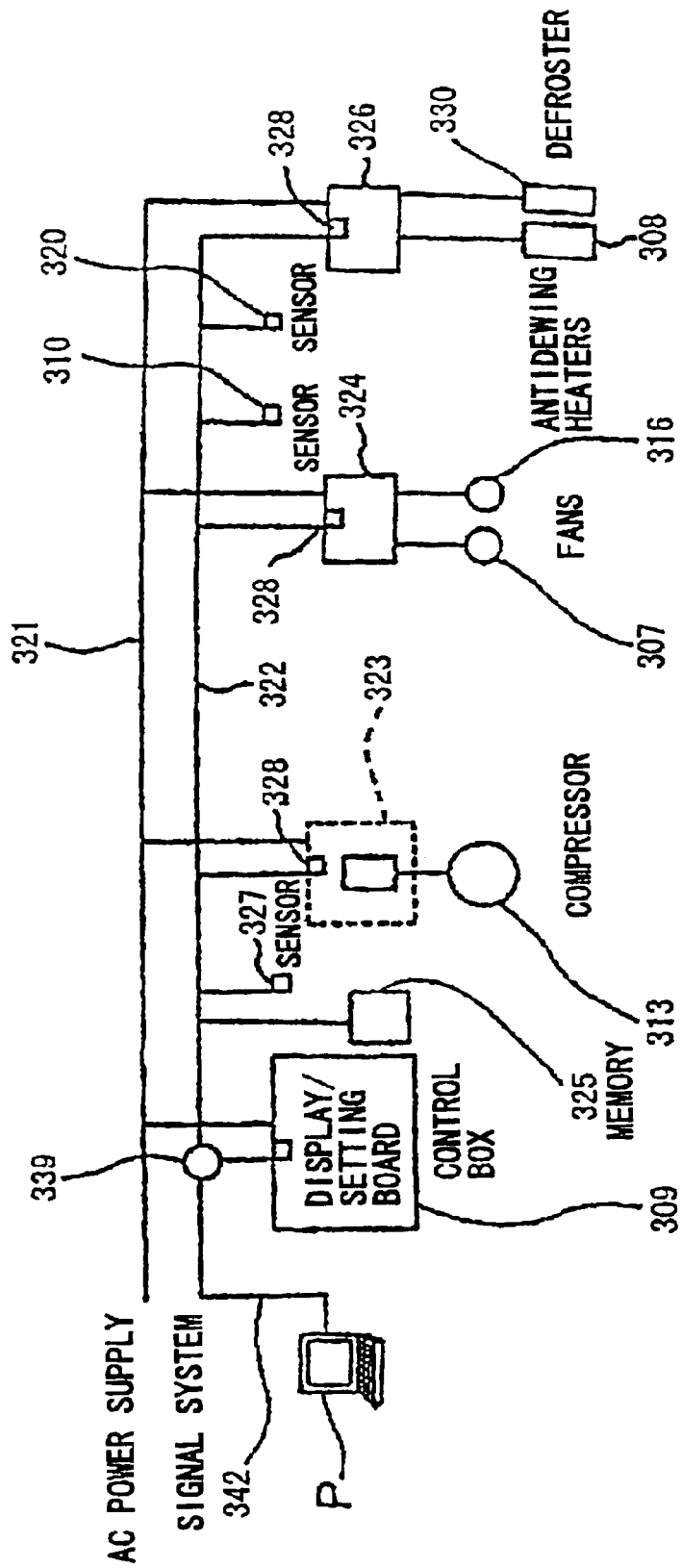
FIG. 25 is a wiring diagram of an electrical system in the refrigerator shown in FIG. 24.

FIG. 24 is a schematic cross-sectional view of a refrigerator 301 for commercial use in a third preferred embodiment of the invention, and FIG. 25 a wiring diagram of an electrical system in the refrigerator 301 shown in FIG. 24. In the refrigerator 301 shown in FIG. 24, a body 305 is constituted by an insulating box 302 having an opening in its front face, and a storeroom 303 is provided within the insulating box 302. The opening provided in the front face of the storeroom 303 is openably closed by a door 304. Further, a cooler 306 and a motor-driven internal fan 307, which constitute a refrigerating cycle of the cooling device, are provided within the storeroom 303.

A defroster (an electric heater) 330 (FIG. 25) for defrosting is provided in the cooler 306. Further, an antidewing heater 308 for preventing dew formation is provided at the edge of the opening of the insulating box 302, and an operation panel 311 for a control box 309 as main control means is mounted on the front face of the door 304.

On the other hand, a machinery room 312 is provided on the underside of the insulating box 302, and, for example, a compressor 313, a condenser 314, and a fan 316 for a condenser, which, together with the cooler 306, constitute the refrigerating cycle of the cooling device, are provided within this machinery room 312.

Upon the start of the operation of the compressor 313, the heat of a high-temperature, high-pressure coolant delivered from the compressor 313 is dissipated in the condenser 314 to condense the coolant, and the condensed coolant is depressurized in a pressure reducing device (not shown) and is then fed to the cooler 306. In the cooler 306, the evaporation of this coolant provides cooling action. Thereafter, the low-temperature gas coolant is again returned to the compressor 313. Upon the start of the operation of the internal fan 307, cold air cooled in the cooler 306 is circulated into the storeroom 303 to cool the inside of the storeroom 303.

Upon the start of the operation of the fan 316 for a condenser, the open air is supplied to the condenser 314 and the compressor 313 to air cool them. The defroster 330 is energized at predetermined time intervals or at a predetermined time. Upon the energization of the defroster 330 at a predetermined time, heat is generated to heat the cooler 306 and consequently to remove frost. Further, upon the energization of the antidewing heater 308, the edge of the opening in the insulating box 302 is heated to prevent dew formation.

In FIG. 25, numeral 321 designates an AC power supply line distributed to the inside of the body 305 in the refrigerator 301, and numeral 322 a signal line for sending or receiving data. The control box 309 is connected to the AC power supply line 321 and the signal line 322. Further, a drive substrate 323 in the compressor 313, a power supply substrate 324 in the fans 307, 316, the defroster 330, and a power supply substrate 326 in the antidewing heater 308 are connected to the AC power supply line 321.

A chip-shaped storage unit 325, a chip-shaped internal temperature sensor 327 as a sensor for detecting the temperature within the storeroom 303, a chip-shaped defrost sensor 310 as a sensor for detecting the temperature of the cooler 306, a chip-shaped high-temperature sensor 320 as a sensor for detecting the temperature of the condenser 314, and chip-shaped switching devices 328 . . . mounted on the drive substrate 323 and the power supply substrates 324, 326 each are connected through a connector to the signal line 322.

Here only one switching device 328 is shown in the power supply substrates 324, 326. In fact, however, the switching device is provided in each of the fans 307, 316, the defroster 330, and the antidewing heater 308.

In the preferred embodiment, the drive substrate 323 and the power supply substrates 324, 326 are constructed separately from the compressor 313, the fans 307, 316, the defroster 330, and the antidewing heater 308. Alternatively, a construction may be adopted wherein the drive substrate 323 and the power supply substrates 324, 326, together with the respective switching devices 328, may be built in the compressor 313, the fans 307, 316, the defroster 330, and the antidewing heater 308.

According to this construction, mere connection of each of the switching devices 328 built in the compressor 313, the fans 307, 316, the defroster 330, or the antidewing heater 308 to the connector of the signal line 322 completes wiring of these components. Therefore, working efficiency of assembly/wiring can be further improved.

Figure 26:
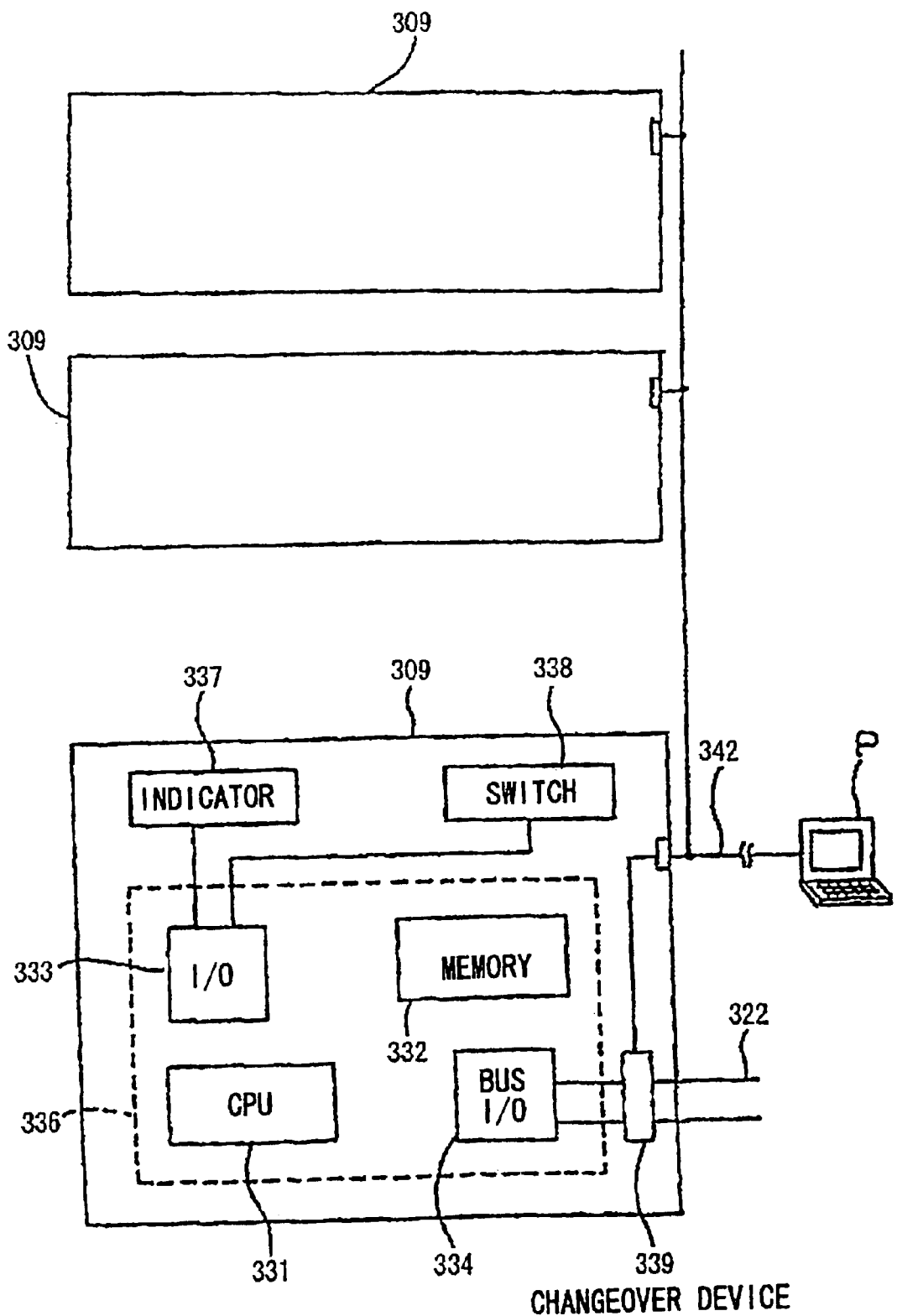
FIG. 26 is a block diagram of an electrical circuit in a control box.

FIG. 26 shows the construction of the control box 309. A controller (substrate) 336 is provided in the control box 309. This controller 336 comprises, for example, CPU (microcomputer) 331, a memory 332 as storage means, an I/O interface 333, and a bus I/O interface 334 as send/receive means. An indicator 337 comprising a liquid crystal display panel, a switch 338 as input means (a keyboard, a mouse, etc.), a changeover device 339 as switching means and the like are provided in the control box 309. The indicator 337 and the switch 338 are connected to the I/O interface 333 and are provided within the operation panel 311.

The bus I/O interface 334 is connected through the changeover device 339 to the signal line 322 and sends data to or receives data from the storage unit 325, the temperature sensor 327 and the switching devices 328 . . . through the signal line 322. For example, an external laptop personal computer P (an external control device provided with a display, a keyboard, a mouse, etc.) can be connected through a communication line 342 to the changeover device 339. The changeover device 339 usually connects the bus I/O interface 334 to the signal line 322. Upon the connection of the personal computer P, however, the changeover device 339 disconnect the bus I/O interface 334 (that is, the control box 309) from the signal line 322 and connects the personal computer P to the signal line 322.

In this case, for example, a predetermined communication protocol for data communication with the internal temperature sensor 327, the defrost sensor 310, the high-temperature sensor 320, the switching device 328, the storage unit 325, and the personal computer P, and a software for searching out and identifying the sensors 327, 310, 320 and the switching device 328, which will be described later, and the storage unit 325, and, further, image data to be displayed on the indicator 337 are set in the controller 336.

It is assumed that, for example, a predetermined communication protocol for data communication with the sensors 327, 310, 320, the switching device 328, the storage unit 325, and the controller 336, and a software for searching out and identifying the sensors 327, 310, 320 and the switching device 328, which will be described later, and the storage unit 325 are also set in the personal computer P.

FIG. 27 shows the construction of the internal temperature sensor 27, the defrost sensor 10, and the high-temperature sensor 20. Since the sensors 27, 10, 20 are identical to one another in construction, only the internal temperature sensor 27 will be described. As shown in detail in FIG. 27(a), the temperature sensor 327 comprises: a control unit 340 as terminal-side control means; a memory 341 as storage means; an I/O interface 343 as send/receive means and storage means; a sensor part 344 as detection means; a TH register 345A; a TL register 345B; a setting register 345C for determining the status; a CRC generator 346 for matching of communication; a power supply detection part 347 for detecting Vcc power source which will be described later; a capacitor 348 and diodes 349A, 349B which constitute accumulation means; and the like.

In this case, the capacitor 348 is connected to the output side of the diodes 379A, 349B, and an input terminal 376 is connected to the diode 379A and the I/O interface 343 and is connected to a signal line 322 (not shown). The capacitor 348 is also connected to the I/O interface 343.

Upon the connection of the temperature sensor 327 to the signal line 322 (not shown), during a high potential period of the pulse signals, constituting the data, made up of high potential (+5 V) and low potential (0 V), power is supplied to each device and, in addition, the capacitor 348 is also charged. On the other hand, during a low potential period of the pulse signals, electricity is discharged from the capacitor 348 to supply each device with electric power.

The temperature sensor 327 is also provided with a Vcc (DC +5 V) power supply terminal 377 connected to a diode 349B and is constructed so that, upon the connection of the Vcc power supply terminal 377 to the power supply line, each device can also be operated by the supply of power from the power supply line (power source supply mode). That is, in this power source supply mode, each device is operated without charge of the capacitor 348. Therefore, this can improve convenience in the case where rapid operation of the temperature sensor 327 is desired, for example, at the time of inspection.

In the control unit 361, upon the receipt of an instruction for temperature detection input from the input terminal 376 through the signal line 322 (not shown) into the I/O interface 343, the sensor part 364 detects the internal temperature, and the temperature data are taken in and are once written in the memory 341. The temperature data written in the memory 341 are sent through the I/O interface 343 to the bus I/O interface 334 connected to the signal line 322.

Here an ID code of the temperature sensor 327 per se and an identification data for identifying that the temperature sensor 327 is a sensor are written in the I/O interface 343. The upper limit temperature TH of the showcase is written in the TH register 345A, and the lower limit temperature TL is written in the TL register 345B. The data on these upper limit temperature TH and lower limit temperature TL are sent from the I/O interface 343 through the signal line 322. For example, a communication protocol for data communication with the bus I/O interface 334 is stored in the memory 341. Upon a failure of the temperature sensor 327, data on the failure is also written in the memory 341 and is sent to the bus I/O interface 334. Further, the temperature sensor 327 has a self-holding function such that, when communication with the bus I/O interface 334 has been broken, the current state is held.

FIG. 27(b) shows a map of the memory 341. This memory 341 is an 8-bit scratch pad, and data are stored respectively in 0th to 8th bytes (byte 0 to byte 8). In the drawing, lower-temperature data is stored in byte 0, higher-temperature data is stored in byte 1, upper limit temperature TH and memory used by the user are stored in byte 2, lower limit temperature TL and memory used by the user are stored in byte 3, and configuration data is stored in byte 4. Byte 5 to byte 7 are unused, and CRC data is stored in byte 8.

Figure 28:
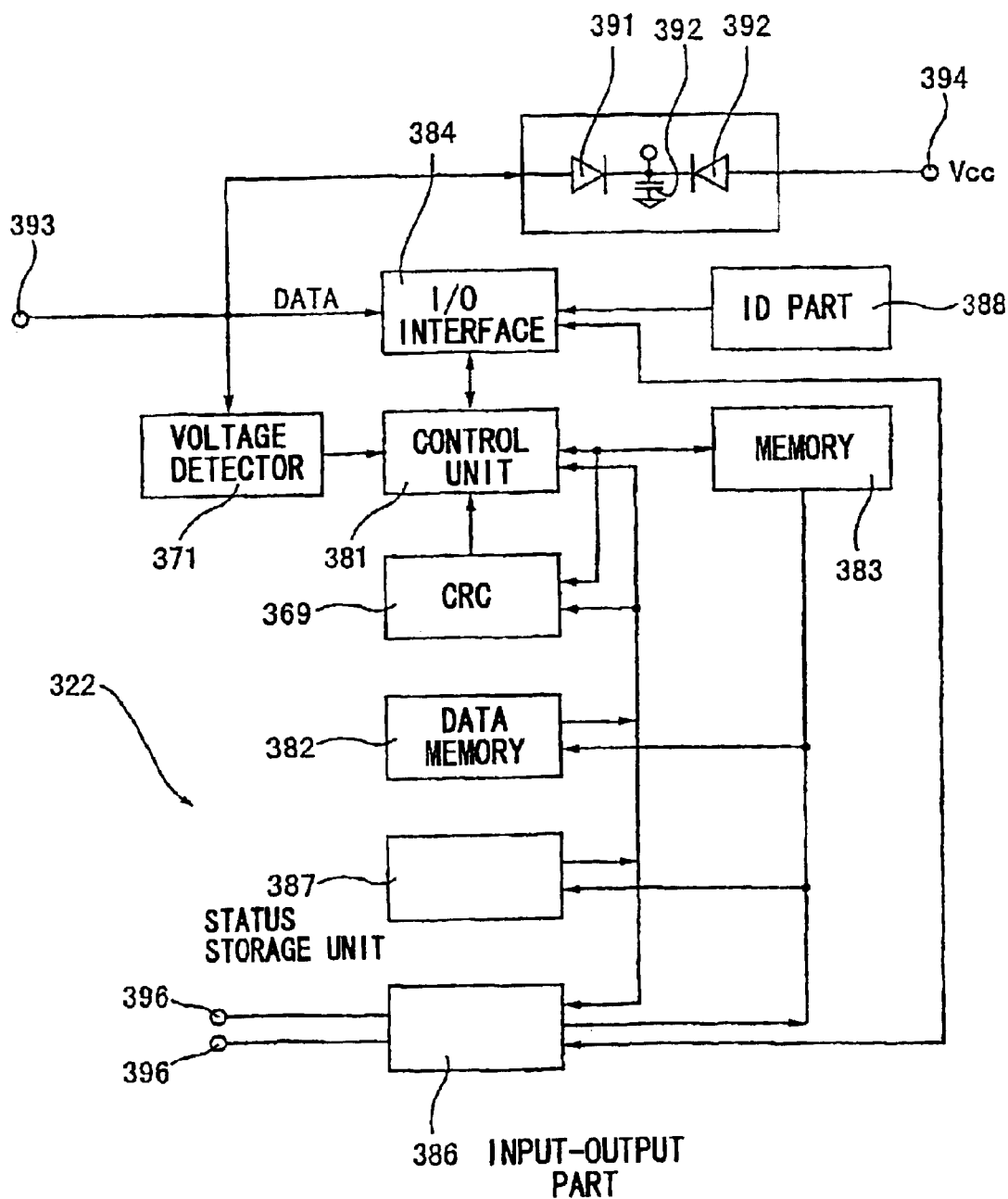
FIG. 28 is a block diagram of an electrical circuit in a switching device.

The construction of the switching device 328 is shown in FIG. 28. The switching device 328 comprises: a control unit 381 as terminal-side control means; memories 382, 383; an I/O interface 384; an input-output part 386; a status storage unit 387 for storing information on whether the input-output part 386 is in an input state or in an output state; an ID part 388 for storing its own ID code; a capacitor 389; diodes 391, 392; and the like.

In this case, when the capacitor 389 is connected to the output side of the diodes 391, 392 and when the input terminal 393 of the switching device 328, to which each device is connected, is connected through the signal line 322 to the terminal of the capacitor 389, as described above, during a high potential period of the pulse signals, constituting the data, made up of high potential and low potential, power is supplied to each device and, in addition, the capacitor 389 is also charged. On the other hand, during a low potential period of the pulse signals, electricity is discharged from the capacitor 389 to supply each device with electric power.

The switching device 328 is also provided with a Vcc (DC +5 V) power supply terminal 394 connected to the input side of the diode 392, and, upon the connection of the Vcc power supply terminal 394 to the power supply line, each device in the switching device 328 can also be operated by the supply of power from the power supply line. That is, in this case, each device is operated without charge of the capacitor 389. Therefore, this can improve convenience in the case where rapid operation of the switching device 328 is desired, for example, at the time of inspection.

Upon the transmission of ON/OFF data from the bus I/O interface 334 through the signal line 322 to the control unit 381 by the I/O interface 384, the control unit 381 performs control in such a manner that, based on the ON/OFF data, the input-output part 386 performs ON/OFF of two input-output terminals 396, 396 (output mode).

Here, as described above, an ID code of the switching device 328 per se and an identification data for identifying that the switching device 328 is an I/O sensor unit are stored in the ID part 388. For example, various data and a communication protocol for data communication with the bus I/O interface 334 are stored in the memory 382. Upon a failure of the switching device 328, data on the failure is also written in the memory 382 and is sent to the bus I/O interface 334. The switching device 328 also has a self-holding function such that, when communication with the bus I/O interface 334 has been broken, the current state is held.

Figure 29:
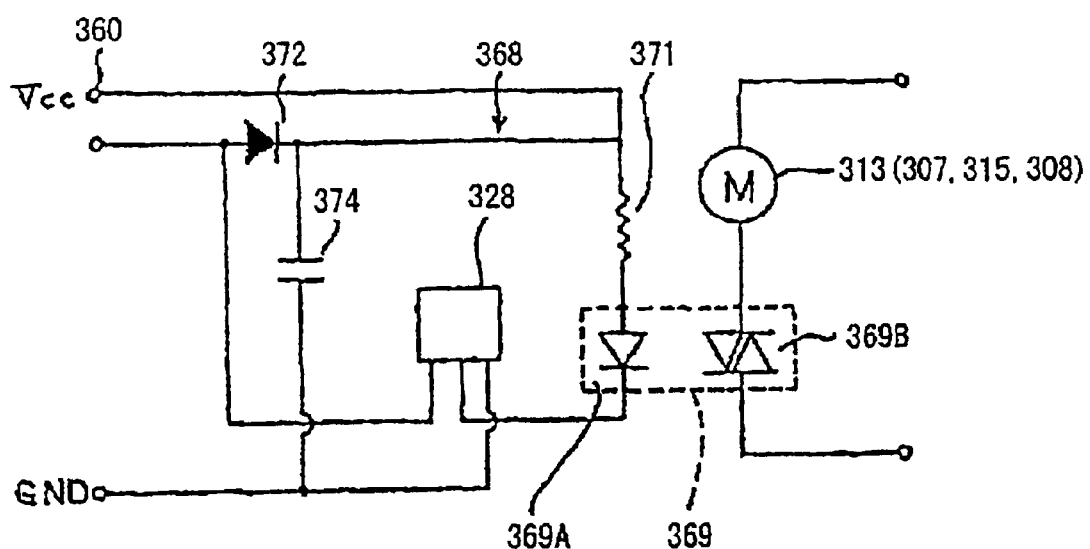
FIG. 29 is an electrical circuit diagram of a switching unit using a switching device.

Wiring of the switching device 328 is carried out on each of the drive substrates 323 and the power supply substrates 324, 326 as shown in FIG. 29 to constitute a switching unit 368. Specifically, numeral 369 designates a photocoupler comprising a photodiode 369A and a phototriac 369B, numeral 371 a resistor, numeral 372 a diode as a rectification device, and numeral 374 a capacitor as an accumulation device.

In this case, the capacitor 374 is connected to the output side of the diode 372. The connection of the diode 372 with the capacitor 374, the resistor 371, and the photodiode 369A are connected in series to one end of the switching device 328. The other end of the switching device 328 is connected to a portion before the diode 372. The phototriac 369B is provided between the AC power supply line 321 and the compressor 313, between the AC power supply line 321 and the fan 307, 315, and between the AC power supply line 321 and the antidewing heater 308.

Upon the connection of the diode 372 to the signal line 322, during a high potential period of the pulse signals, constituting the data, made up of high potential and low potential, power is supplied to the photodiode 369A through the resistor 371 and, in addition, the capacitor 374 is also charged. On the other hand, during a low potential period of the pulse signals, electricity is discharged from the capacitor 374 to supply the photodiode 369A with electric power.

Likewise, when a Vcc power supply terminal 360 is connected to the connection between the diode 372 and the capacitor 374 and is connected to the power supply line, the photodiode 369A can also be operated by supplying power through the power supply line. That is, in this case, each device is operated without charging the capacitor 374. Therefore, this can improve convenience in the case where rapid operation is desired, for example, at the time of inspection.

Figure 31:
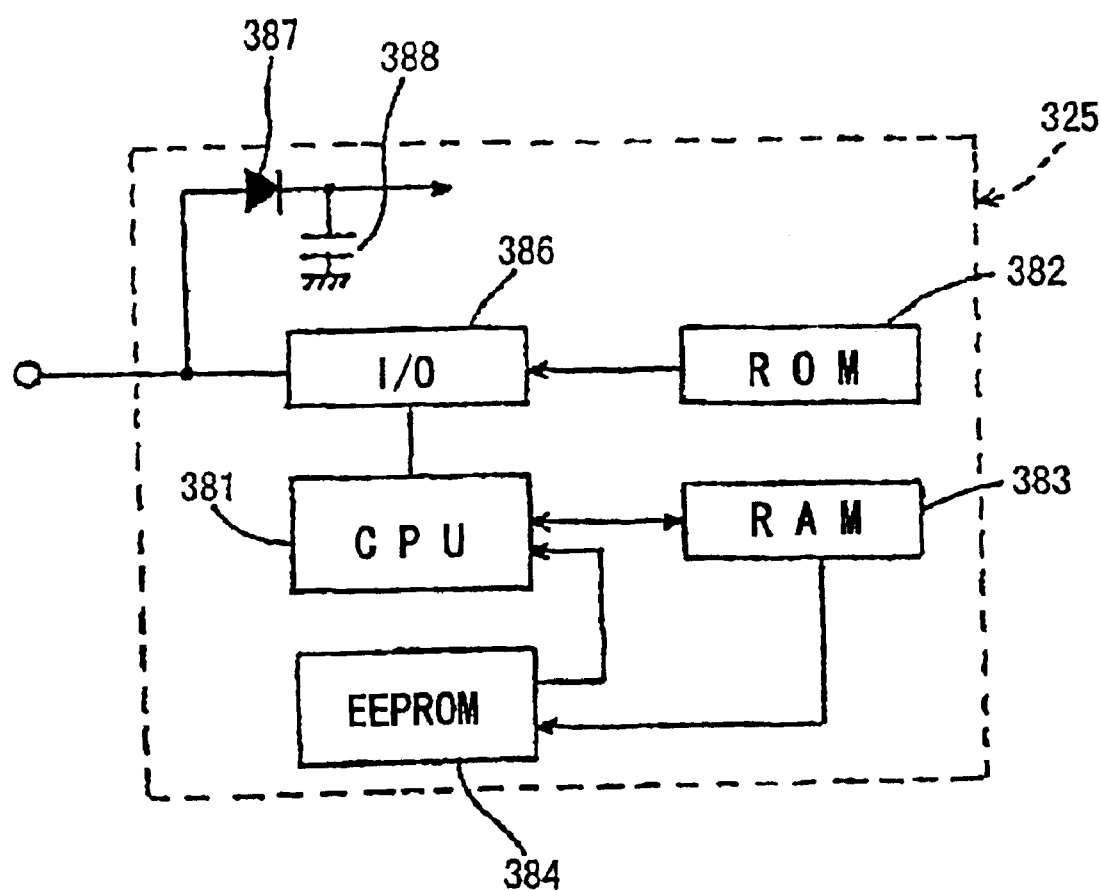
FIG. 31 is a block diagram of an electrical circuit in a storage unit.

FIG. 31 shows the construction of the storage unit 325. The storage unit 325 comprises: CPU 381 as storage unit-side control means; ROM 382, RAM 383, and EEPROM 384 as storage means; an I/O interface 386 as send/receive means; a capacitor 387 as an accumulation device; a diode 388 as a rectification device; and the like.

In this case, the capacitor 388 is connected to the output side of the diode 387, and each device is connected to the connection between the diode 387 and the capacitor 388. Upon the connection of the storage unit 325 to the signal line 322, as described above, during a high potential period of the pulse signals, constituting the data, made up of and low potential, power is supplied to each device and, in addition, the capacitor 388 is also charged. On the other hand, during a low potential period of the pulse signals, electricity is discharged from the capacitor 388 to supply each device with electric power.

Further, upon the transmission of data from the controller 336 or the personal computer P through the signal line 322 and the I/O interface 386, based on the data, CPU 381 writes the data using RAM 383 in EEPROM 384 and sends the data written in EEPROM 384 through the I/O interface 386 to the controller 336 or the personal computer P.

For example, an ID code of the storage unit 325 per se, an identification data for identifying that the storage unit 325 is a storage unit are stored in ROM 382, and a protocol for data communication with the controller 336 or the personal computer P.

The operation of the above construction will be explained. At the outset, assuming that the personal computer P is not connected to the changeover device 339, the operation at the time of the production of the refrigerator 301 will be explained. When the sensors 327, 310, 320 and the switching devices 328 . . . are connected to the signal line 322, CPU 331 in the controller 336 first performs a search for the status of the connection of each device (the sensors 327, 310, 320, the switching devices 328 . . . , and the storage unit 325) to the signal line 322.

In this case, the controller 336 makes a request to all of the sensors 327, 310, 320, the switching devices 328 . . . , and the storage unit 325 for ID. In reply to this, all of the sensors 327, 310, 320, the switching devices 328 . . . , and the storage unit 325 send information on their own ID codes and the like to the controller 336. Based on the received ID codes and the like, the controller 336 recognizes that the storage unit 325 and the sensors, i.e., the internal temperature sensor 327, the defrost sensor 310, and the high-temperature sensor 320, and the switching devices, i.e., the switching device 328 for the compressor 313, the switching device 328 for the defroster 330, the switching device 328 for the internal fan 307, and the switching device 328 for the antidewing heater 308 (in an actual case, further, a fan for a condenser), are connected to the signal line 322.

The controller 336 stores the recognized status of the connection of the temperature sensors 327, 310, 320, the switching devices 328 . . . , and the storage unit 325 in the memory 332 and, thereafter, sends data using the ID codes to each device.

Next, work at the time of shipment of the refrigerator 301 will be explained. Specifically, in a checkup at the time of the shipment, the personal computer P is connected to the changeover device 339. At that time, as described above, the controller 336 is disconnected from the signal line 322. In this state, parameters (data) such as the type (freezing/refrigerating and the like), the control method, and the function (temperature zone) of the refrigerator 301 are sent from the personal computer P through the signal line 322 to the storage unit 325.

The storage unit 325 writes data on parameters sent from the personal computer P in EEPROM 384 in its predetermined region.

Thereafter, the personal computer P is disconnected from the changeover device 339, and the controller 336 is again connected to the signal line 322. Upon the connection of the controller 336 to the signal line 322, the controller 336 then accesses the storage unit 325, reads the parameter written above in EEPROM 384 from the storage unit 325, and stores the data in its memory 332. This completes setting of the parameters, sent from the personal computer P, in the controller 336.

Next, the controller 336 sends ON/OFF data together with the ID code of the switching device 328 in the drive substrate 323 and the ID code of the switching device 328 in the power supply substrate 324 to the signal line 322 to place the compressor 313 and the internal fan 307 into operation for the start of cooling operation. CPU 331 in the controller 336 polls the sensors 327, 310, 320 at predetermined periods. This polling is carried out based on the above ID codes. In reply to this polling, CPU 340 in the sensors 327, 310, 320 sends temperature data to the controller 336. CPU 331 in the controller 336 once writes the received temperature data in the memory 332 and then performs the allocation of function of each sensor based on the change of the temperature data after the start of the cooling operation.

Specifically, at the time when a given time has elapsed after the start of the cooling operation, when the temperature data shows a rise in temperature, the controller 336 performs function allocation, such that the sensor having the ID is the high-temperature sensor 310, and stores this in the memory 332. When the temperature data shows a lowering in temperature and the temperature is relatively high, the controller 336 performs function allocation, such that the sensor having the ID is the internal temperature sensor 327, and stores this in the memory 332. When the temperature data shows a lowering in temperature and the temperature is relatively low, the controller 336 performs function allocation such that the sensor having the ID is the defrost sensor 320, and stores this in the memory 332. This permits the function of each sensor to be allocated to the controller 336 without presetting.

Next, the actual control operation after the installation of the refrigerator 301 will be explained. As described above, CPU 331 in the controller 336 polls the sensors 327, 310, 320 at predetermined periods. This polling is carried out based on the above ID codes. In reply to this polling, as described above, CPU 343 in the sensors 327, 310, 320 sends temperature data to the controller 336. CPU 331 in the controller 336 once writes the received temperature data in the memory 332, compares the temperature data sent from the internal temperature sensor 327 with the above set temperature in the parameters, and sends ON/OFF data together with the ID code of the switching device 328 on the drive substrate 323 to the signal line 322.

The control unit 281 in the switching device 328 on the drive substrate 323, upon the receipt of ON/OFF data on its own ID code, turns ON/OFF the input-output terminals 296, 296 based on the ON/OFF data in the above-described manner. The ON/OFF of the input-output terminals 296, 296 turns ON (emission)/OFF (lights-out) of the photodiode 369A. This in turn turns ON/OFF the phototriac 369B and then starts/stops the compressor 313.

CPU 331 in the controller 336 sends ON/OFF data together with the ID code of the switching device 328 on the power supply substrate 326 to the signal line 322 to energize the defroster 330 at predetermined time intervals or at a predetermined time, for defrosting of the cooler 306. Based on the temperature data received from the defrost sensor 310, the defrosting of the cooler 306 is controlled so that the defrosting is terminated when the temperature has reached a predetermined temperature.

Since the fans 307, 315 and the antidewing heater 308 are continuously energized, ON/OFF data to that effect is sent based on ID codes of the switching devices 328 on the respective power supply substrates 324, 326. Based on the ON/OFF data, the switching devices 328 operate or energize the fans 307, 315 or the antidewing heater 308.

Based on the temperature data sent from the sensors 327, 310, 320, when there is no change in temperature data sent from any one of the sensors even after the start of the operation, the controller 336 judges that there is a failure in the sensor. When there is no change in temperature data sent from all the sensors, the controller 336 judges that the cooling device per se, such as the compressor 313 per se, has had some trouble. When the controller 336 cannot receive temperature data from any one of the sensors, the controller 336 judges that the line between the controller 336 and the sensor has been broken.

Also when data from any one of the switching devices 328 . . . cannot be received, the controller 336 judges that a failure of the switching device 328 or breaking of the line between the controller 336 and the switching device 328 has occurred. When this failure has occurred, CPU 331 in the controller 336 allows the indicator 337 to display information to the effect that there is a failure in the sensors 327, 310, 320 or the switching devices 328 . . . .

When maintenance/inspection of the refrigerator 301 is carried out either based on the display of information on the failure or periodically, the personal computer P is connected to the changeover device 339. Upon this connection, as described above, the controller 336 is disconnected from the signal line 322, and the personal computer P is connected to the signal line 322. As soon as predetermined keying operation has been carried out in the personal computer P, the personal computer P accesses the storage unit 325 to read maintenance history data from the storage unit 325.

A maintenance history data file as shown in FIG. 32 is provided in EEPROM 384 in the storage unit 325. The names of parts which have been replaced in the past maintenance, together with the replacement dates, is written in the maintenance history data file. Upon a request from the personal computer P for data, the storage unit 325 sends the maintenance history data in the maintenance history data file to the personal computer P.

The personal computer P receives the maintenance history data and displays, on its display, the names of replaced parts and the replacement dates in the past maintenance of the refrigerator 301.

A maintenance service person can see the maintenance history (parts replacement list) to grasp the failures caused in the refrigerator 301 and to analyze the data. For example, when an identical sensor is frequently replaced in the past, the sensor per se can be regarded as defective. By virtue of this, measures can be rapidly taken.

When repair/replacement or the like has been completed, the name of a person in charge of this maintenance (the name of the service person) is input by keying into the personal computer P. The personal computer P writes the input name of the person in charge of the maintenance, together with the date of the maintenance, in the maintenance history data file within the storage unit 325.

As soon as the personal computer P is disconnected from the changeover device 339, in the same manner as described above, the controller 336 makes a request for ID to all of the sensors 327, 310, 320, the switching devices 328 . . . , and the storage unit 325. In reply to this request, all of the sensors 327, 310, 320, the switching devices 328 . . . , and the storage unit 325 send their own ID codes and the like to the controller 336. Based on the ID codes and the like received from the devices, in the same manner as described above, the controller 336 recognizes that each of the devices is connected to the signal line 322.

The controller 336 stores the recognized status of the connection of the temperature sensors 327, 310, 320, the switching devices 328 . . . , and the storage unit 325 in the memory 332 and, thereafter, in the same manner as described above, sends data using the ID code to each device. Here when, for example, the temperature sensor 327 has been replaced in the above maintenance, the controller 336 recognizes the connection of the temperature sensor 327 to the signal line 322 based on the received ID code of the new temperature sensor 327.

Accordingly, after that, the controller 336 sends data to or receives data from the new temperature sensor 327. Further, when the controller 336 has found the new temperature sensor 327, the controller 336 writes this information, together with the ID code of the new temperature sensor 327, in the maintenance history data file within EEPROM 384 in the storage unit 325. In this case, a check against the date of that date is made, and the ID code of the exchanged new temperature sensor 327 together with the name of the person in charge of the maintenance on that day is written in the file.

On the other hand, when malfunction of CPU 331 per se in the controller 336 has occurred, the personal computer P is connected to the signal line 322 by connecting the personal computer P to the changeover device 339. After that, the transmission of data to and receipt of data from the sensors 327, 310, 320 and the switching devices 328 . . . and the control of these sensors and switching devices are carried out by the personal computer P, and each equipment can be controlled by the personal computer P.

Figure 30:
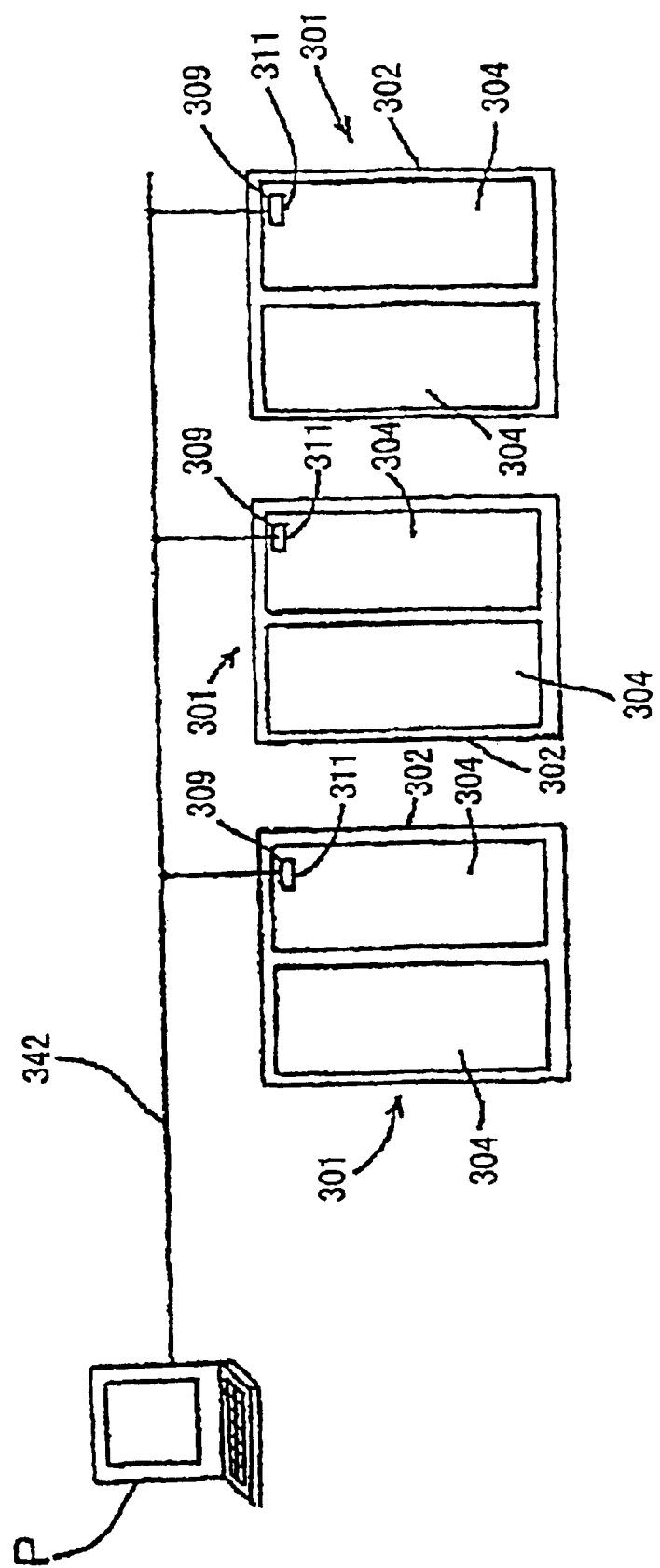
FIG. 30 is a diagram illustrating the connection of control boxes of a plurality of installed refrigerators to a personal computer through a communication line.

In this case, as shown in FIGS. 26 and 30, control boxes 309 of the plurality of refrigerators 301 . . . can be connected through the communication line 342 to the personal computer P. Accordingly, when each equipment has become controlled by the personal computer P instead of the controller, for example, due to the failure of CPU in the controller or according to the user's demand, the operation of the refrigerators 301 . . . can be controlled in a centralized manner by the personal computer P. In this case, for example, the power consumption can be leveled by starting the compressors 313 in the respective refrigerators 301 . . . at varied timings.

The above preferred embodiment has been explained by taking the temperature detection sensor as an example. Alternatively, a device for detecting humidity, pressure or the like may be used as the sensor part to use it as a humidity sensor or a pressure sensor.

In the preferred embodiment, the invention has been explained by taking a refrigerator for commercial use as an example. The invention, however, is not limited to this only and is also applicable, for example, to various electrical apparatuses, such as household refrigerators and low-temperature showcases, prefabricated refrigerators, and vending machines, and, further, automobiles, home automation/security system in houses or buildings.

As is apparent from the foregoing detailed description, according to the invention, provided are a signal line connected to equipment, main control means provided in the equipment, and a sensor or a switching device which is connected to the signal line and sends data to or receives data from the main control means. According to this construction, the sensor or the switching device sends data to or receives data from the main control means through the signal line, and the operation of the equipment is controlled by the main control means.

In particular, when a storage unit connected to the signal line and changeover means, which permits the connection of the external control device to the signal line, are provided, the storage unit has a maintenance history data file, in which the maintenance history of the equipment has been written, and, in addition, in such a state that the external control device is connected to the signal line, the external control device can read data from and write data in the stored maintenance history data file. Therefore, at the time of maintenance/inspection of the equipment, the changeover means can connect the external control device to the signal line, and the external control device can read data from the maintenance history data file in the storage unit. At the same time, after the inspection, data on the details of the malfunction can be written in the storage unit.

By virtue of this, the maintenance history in the past caused in the equipment can be easily grasped, and, as a result, the analysis can be properly carried out and measures can be properly taken. Further, unlike the conventional technique wherein the details are written in a label, since the maintenance history is not grasped by the user, there is no possibility that an idle fear is given to the user.

In addition to the above advantage, when the sensor or the switching device has been replaced, the main control means searches the new sensor or switching device and writes the fact of replacement of the sensor or switching device in the maintenance history data file in the storage unit. This can eliminate the need to write the data on the replaced sensor or switching device from the external control device into the storage unit and thus can improve the efficiency of the maintenance work.

Further, the storage unit-side control means in the storage unit controls data read/write of the storage means based on data from the main control means and the external control device received by the send/receive means through the signal line. Therefore, the main control means and the external control device can execute writing of data in or reading of data from the storage unit without any difficulty. In this case, since the storage unit is operated by electric power from the signal line for sending and receiving data, the storage unit can be operated simply by connecting the storage unit to the signal line without other power supply.

This can realize wiring of the storage unit by the so-called "plug-in" and can significantly simplify wiring work.

Furthermore, since the sensor-side control means in the sensor writes data detected by the detection device in storage means and the send/receive means sends data through the signal line to the main control means, the main control means in the equipment can receive data without any difficulty. In this case, since the sensor has its own ID code in the storage means, mere connection of the sensor to the signal line permits the main control means to identify the sensor and can complete wiring of the sensor.

Furthermore, since the switching device-side control means in the switching device controls the switching means based on data which have been received from the main control means by the send/receive means through the signal line, the main control means in the equipment can perform control of the equipment without any difficulty. Also in this case, since the switching device has its own ID code in the storage means, mere connection of the switching device to the signal line permits the main control means to identify the switching device and can complete wiring of the switching device.

Thus, wiring of the storage unit, the sensors, and the switching devices by the so-called "plug-in" can be realized, and this can significantly simplify wiring work. At the same time, the search of the sensor or the switching device can be rapidly and properly made by the main control means using the ID code. Further, a common software can be used in the main control means or the external control device independently of the storage unit, the number of sensors or switching devices and the like. Therefore, the adoption of a common software also can significantly reduce the cost.

Figure 33:
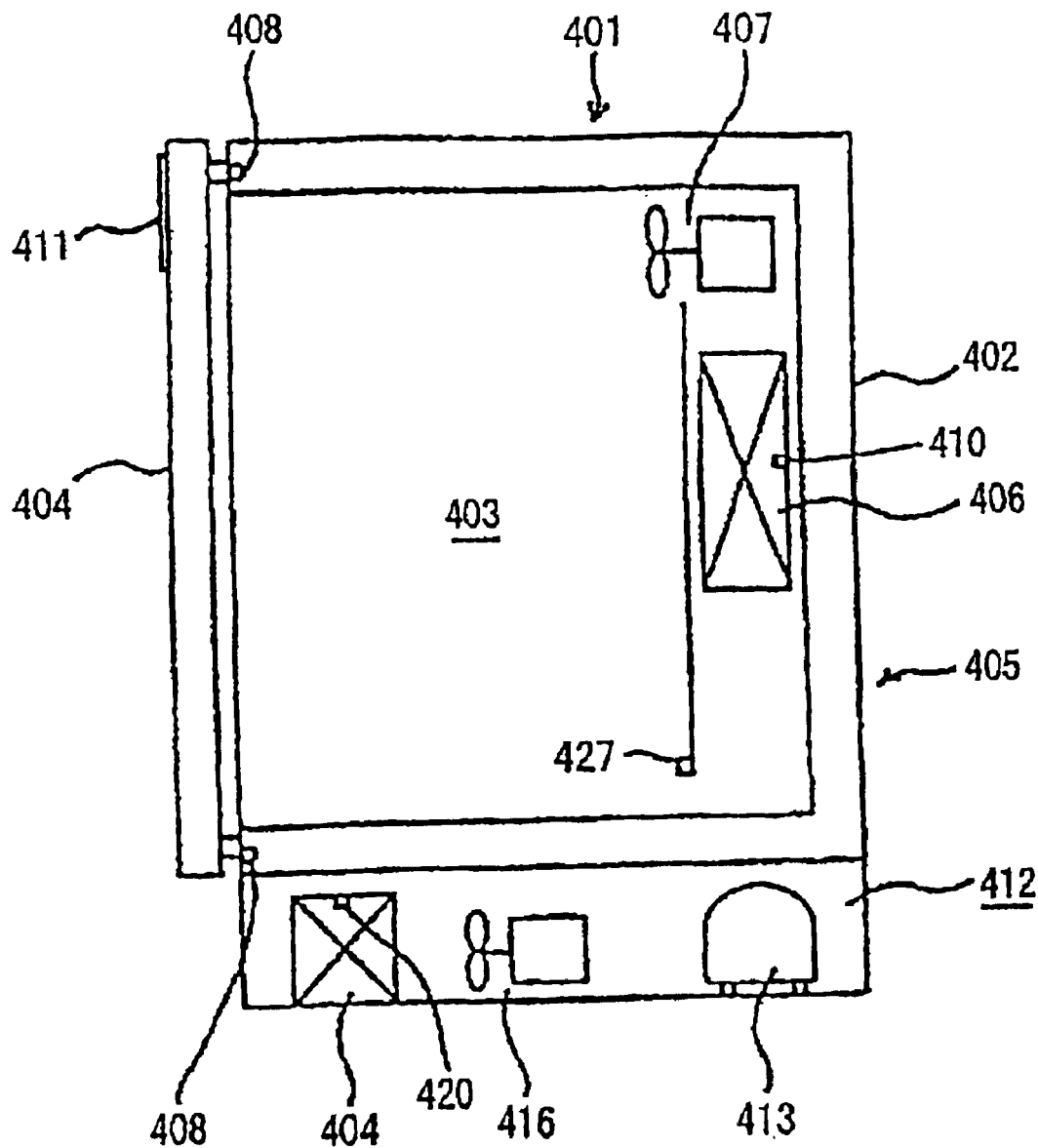
FIG. 33 is a schematic cross-sectional view of a refrigerator for commercial use in a fourth preferred embodiment of the invention.
Figure 34:
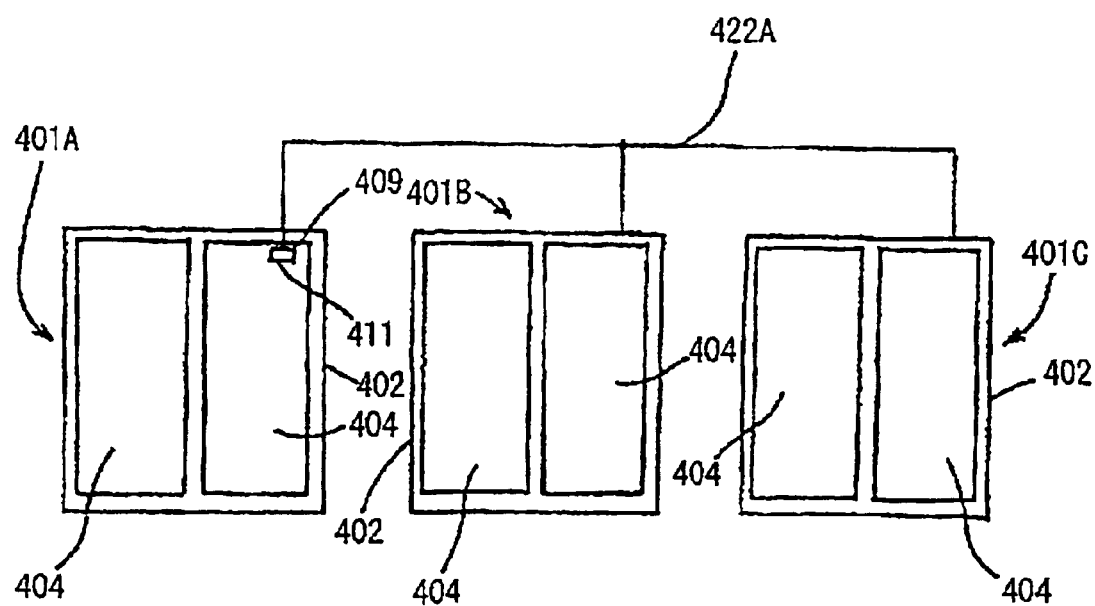
FIG. 34 is a diagram illustrating the installation of a plurality of refrigerators.
Figure 35:
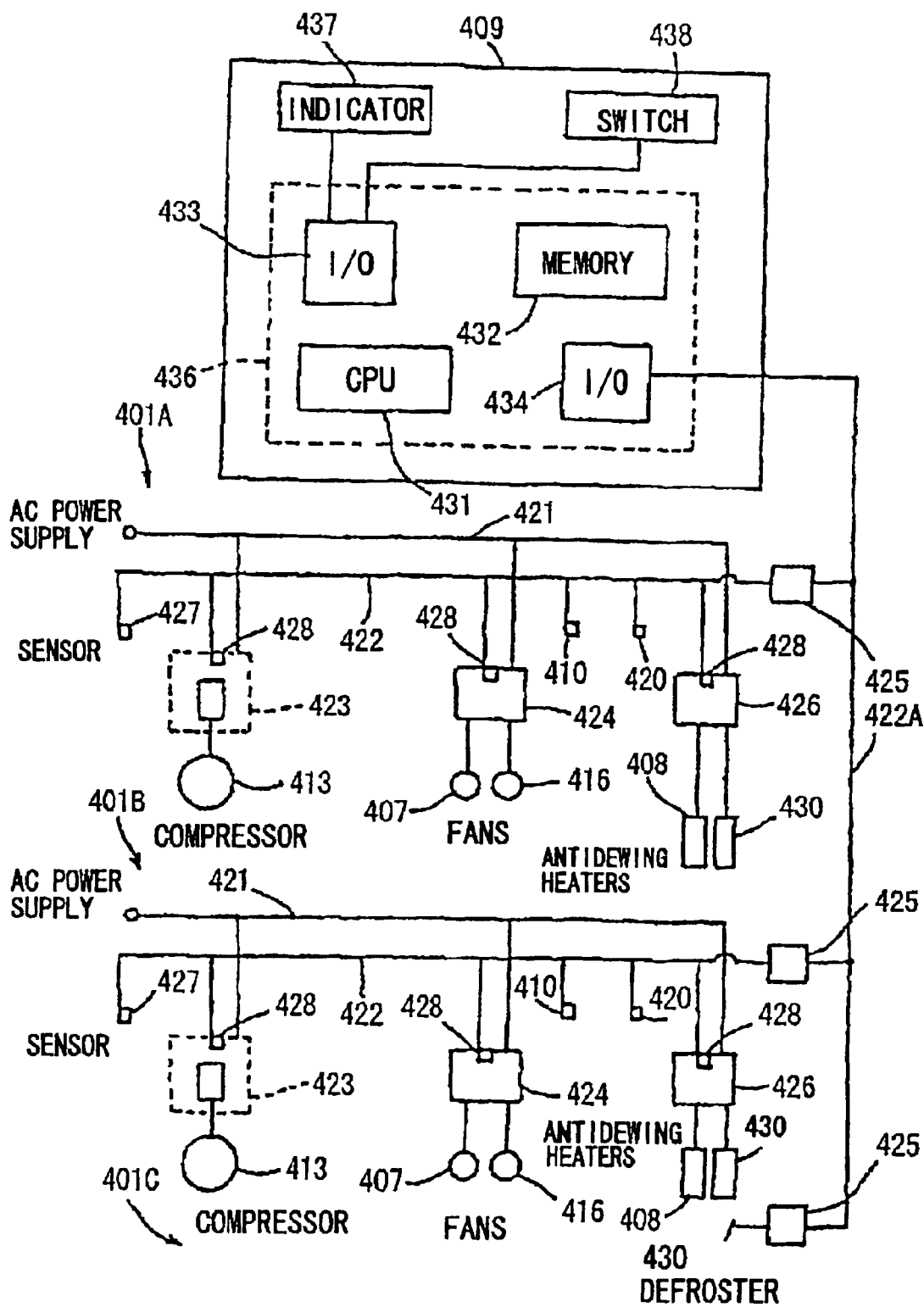
FIG. 35 is a wiring diagram of a signal system in each refrigerator.

FIG. 33 shows a schematic cross-sectional view of a refrigerator 401 for commercial use as equipment in a fourth preferred embodiment of the invention, FIG. 34 a diagram showing a plurality of refrigerators 401A, 401B, 401C juxtaposed to one another, and FIG. 35 a wiring diagram of a signal system in each of the refrigerators 401A, 401B, 401C. In the refrigerator 401 (drawn as a representative of the refrigerators 401A, 401B, 401C having an identical structure shown in FIG. 34) shown in each drawing, a body 405 is constituted by an insulating box 402 having an opening in its front face, and a storeroom 403 is provided within the insulating box 402. The opening provided in the front face of the storeroom 403 is openably closed by a door 404. Further, a cooler 406 and a motor-driven internal fan 407, which constitute a refrigerating cycle of the cooling device, are provided within the storeroom 403.

A defroster (an electric heater) 430 (FIG. 35) for removing frost is mounted on the cooler 406. Further, an antidewing heater 408 for preventing dew formation is provided at the edge of the opening of the insulating box 402, and, in particular, an operation panel 411 for a control box 409 as main control means is mounted on the front face of the door 404 in the refrigerator 401A.

On the other hand, a machinery room 412 is provided on the underside of the insulating box 402, and, for example, a compressor 413, a condenser 414, and a fan 416 for a condenser, which, together with the cooler 406, constitute the refrigerating cycle of the cooling device, are provided within this machinery room 412.

Upon the start of the operation of the compressor 413, the heat of a high-temperature, high-pressure coolant delivered from the compressor 413 is dissipated in the condenser 414 to condense the coolant, and the condensed coolant is depressurized in a pressure reducing device (not shown) and is then fed to the cooler 406. In the cooler 406, the evaporation of this coolant provides cooling action. Thereafter, the low-temperature gas coolant is again returned to the compressor 413. Upon the start of the operation of the internal fan 407, cold air cooled in the cooler 406 is circulated into the storeroom 403 to cool the inside of the storeroom 403.

Upon the start of the operation of the fan 416 for a condenser, the open air is supplied to the condenser 414 and the compressor 413 to air cool them. The defroster 430 is energized at predetermined time intervals or at a predetermined time. Upon the energization of the defroster 430 at a predetermined time, heat is generated to heat the cooler 406 and consequently to remove frost. Further, upon the energization of the antidewing heater 408, the edge of the opening in the insulating box 402 is heated to prevent dew formation.

In FIG. 35, numeral 421 designates an AC power supply line distributed to the inside of the body 405 in the refrigerators 401A, 401B, 401C, and numeral 422 a signal line for sending or receiving data. The signal line 422 is distributed to the inside of the body 405 in each of the refrigerators 401A, 401B, 401C. Further, connection wiring (signal line) 422A is provided among the refrigerators 401A, 401B, 401C. Signal lines 422 . . . in the respective refrigerators 401A, 401B, 401C are branched from the connection wiring 422A. As described later, each device connected to the signal line 422 in each of the refrigerators 401A, 401B, 401C constitutes a system, and, as shown in FIG. 35, a changeover device 425 is connected to the signal line 422 located at the point of branch to each system.

In this case, the refrigerators 401A, 401B, 401C are controlled in a centralized manner, and the refrigerator 401A is a parent refrigerator for control. The control box 409 is connected to the AC power supply line 421 and the connection wiring 422A in the refrigerator 401A. A drive substrate 423 in the compressor 413, a power supply substrate 424 in the fans 407, 416, and a power supply substrate 426 in the defroster 430 and the antidewing heater 408 are connected to the AC power supply line 421 and the signal line 422 in the refrigerators 401A, 401B, 401C.

A chip-shaped internal temperature sensor 427 as a sensor for detecting the temperature within the storeroom 403, a chip-shaped defrost sensor 410 as a sensor for detecting the temperature of the cooler 406, a chip-shaped high-temperature sensor 420 as a sensor for detecting the temperature of the condenser 414, and chip-shaped switching devices 428 mounted respectively on the drive substrate 423 and the power supply substrates 424, 426 are connected through a connector to the signal line 422 in the refrigerators 401A, 401B, 401C.

Here only one switching device 428 is shown in the power supply substrates 424, 426. In fact, however, the switching device 428 is provided in each of the fans 407, 416, the defroster 430, and the antidewing heater 408.

In the preferred embodiment, the drive substrate 423 and the power supply substrates 424, 426 are constructed separately from the compressor 413, the fans 407, 416, the defroster 430, and the antidewing heater 408. Alternatively, a construction may be adopted wherein the drive substrate 423 and the power supply substrates 424, 426, together with the respective switching devices 428, may be built in the compressor 413, the fans 407, 416, the defroster 430, and the antidewing heater 408.

According to this construction, mere connection of each of the switching devices 428 built in the compressor 413, the fans 407, 416, the defroster 430, and the antidewing heater 408 to the connector of the signal line 422 completes wiring of these components. Therefore, working efficiency of assembly/wiring can be significantly improved.

FIG. 35 shows the construction of the control box 409 provided in the refrigerator 401A. A controller (substrate) 436 is provided in the control box 409. This controller 436 comprises, for example, CPU (microcomputer) 431, a memory 432 as storage means, an I/O interface 433, and a bus I/O interface 434 as send/receive means. An indicator 437 comprising a liquid crystal display panel, a switch 438 as input means (such as a keyboard and a mouse) and the like are provided in the control box 409. The indicator 437 and the switch 438 are connected to the I/O interface 433 and are provided within the operation panel 411.

The bus I/O interface 434 is connected to the connection wiring 422A and sends data to or receives data from the temperature sensor 427 and the switching devices 428 in the refrigerator 401A and the refrigerators 401B, 401C juxtaposed to the refrigerator 401A through the connection wiring 422A and the signal line 422. As described below in detail, the changeover device 425 controls the connection (closing of the signal system) or disconnection (opening of the signal system) of the signal line 422 in the refrigerators 401A, 401B, 401C to the connection wiring 422A, whereby the signal, system between the controller 436 and each system (refrigerators 401A, 401B, 401C) is opened or closed.

For example, a predetermined communication protocol for data communication with the internal temperature sensor 427, the defrost sensor 410, the high-temperature sensor 420 or the switching device 428, and the changeover device 425, and, in addition, a software for searching out and identifying the sensors 427, 410, 420 or the switching device 428 and the changeover device 425, which will be described later, and, further, image data to be displayed on the indicator 437 are set in the controller 436.

The construction of the internal temperature sensor 427, the defrost sensor 410, and the high-temperature sensor 420 is shown in FIG. 36. Since the sensors 427, 410, 420 have an identical construction, only the internal temperature sensor 427 will be explained. As shown in detail in FIG. 36(a), the temperature sensor 427 comprises: a control unit 440 as terminal-side control means; a memory 441 as storage means; an I/O interface 443 as send/receive means and storage means; a sensor part 444 as detection means; a TH register 445A; a TL register 445B; a setting register 445C for determining the status; a CRC generator 446 for matching of communication; a power supply detection part 447 for detecting Vcc power supply which will be described later; a capacitor 448 and diodes 449A, 449B which constitute accumulation means; and the like.

In this case, the capacitor 448 is connected to the output side of the diodes 449A, 449B, and an input terminal 476 is connected to the diode 449A and the I/O interface 443 and is connected to a signal line 422 (not shown). The capacitor 448 is also connected to the I/O interface 443.

Upon the connection of the temperature sensor 427 to the signal line 422 (not shown), during a high potential period of the pulse signals, constituting the data, made up of high potential (+5 V) and low potential (0 V), power is supplied to each device and, in addition, the capacitor 448 is also charged. On the other hand, during a low potential period of the pulse signals, electricity is discharged from the capacitor 448 to supply each device with electric power.

The temperature sensor 427 is also provided with a Vcc (DC +5 V) power supply terminal 477 connected to a diode 449B and is constructed so that, upon the connection of the Vcc power supply terminal 477 to the power supply line, each device can also be operated by the supply of power from the power supply line (power source supply mode). That is, in this power source supply mode, each device is operated without charge of the capacitor 448. Therefore, this can improve convenience in the case where rapid operation of the temperature sensor 427 is desired, for example, at the time of inspection.

In the control unit 461, upon the receipt of an instruction for temperature detection input from the input terminal 476 through the signal line 422 (not shown) into the I/O interface 443, the sensor part 464 detects the internal temperature, and the temperature data are taken in and are once written in the memory 441. The temperature data written in the memory 441 are sent through the I/O interface 443 to the bus I/O interface 434 connected to the signal line 422.

Here an ID code of the temperature sensor 427 per se and an identification data for identifying that the temperature sensor 427 is a sensor are written in the I/O interface 443. The upper limit temperature TH of the showcase is written in the TH register 445A, and the lower limit temperature TL is written in the TL register 445B. The data on these upper limit temperature TH and lower limit temperature TL are sent from the I/O interface 443 through the signal line 422. Further, for example, a communication protocol for data communication with the bus I/O interface 434 is stored in the memory 441. Upon a failure of the temperature sensor 427, data on the failure is also written in the memory 441 and is sent to the bus I/O interface 434. Further, the temperature sensor 427 has a self-holding function such that, when communication with the bus I/O interface 434 has been broken, the current state is held.

FIG. 36(b) shows a map of the memory 441. This memory 441 is an 8-bit scratch pad, and data are stored respectively in 0th to 8th bytes (byte 0 to byte 8). In the drawing, lower-temperature data is stored in byte 0, higher-temperature data is stored in byte 1, upper limit temperature TH and memory used by the user are stored in byte 2, lower limit temperature TL and memory used by the user are stored in byte 3, and configuration data is stored in byte 4. Byte 5 to byte 7 are unused, and CRC data is stored in byte 8.

Figure 37:
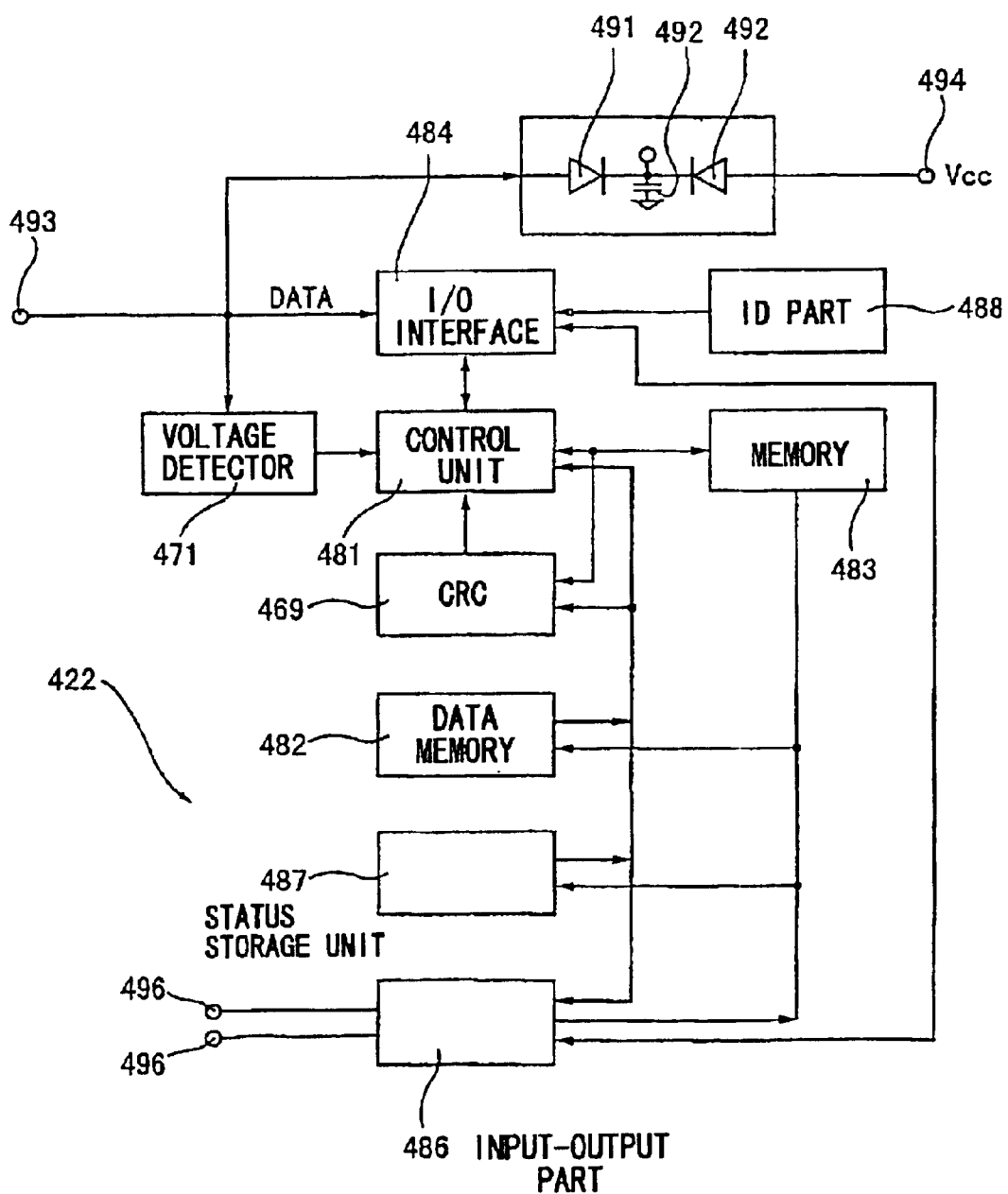
FIG. 37 is a block diagram of an electrical circuit in a switching device.

The construction of the switching device 428 is shown in FIG. 37. The switching device 428 comprises: a control unit 481 as terminal-side control means; memories 482, 483; an I/O interface 484; an input-output part 486; a status storage unit 487 for storing information on whether the input-output part 486 is in an input state or in an output state; an ID part 488 for storing its own ID code; a capacitor 489; diodes 491, 492; and the like.

In this case, when the capacitor 489 is connected to the output side of the diodes 491, 492 and when the input terminal 493 of the switching device 428, to which each device is connected, is connected through the signal line 422 to the terminal of the capacitor 489, as described above, during a high potential period of the pulse signals, constituting the data, made up of high potential and low potential, power is supplied to each device and, in addition, the capacitor 489 is also charged. On the other hand, during a low potential period of the pulse signals, electricity is discharged from the capacitor 489 to supply each device with electric power.

The switching device 428 is also provided with a Vcc (DC +5 V) power supply terminal 494 connected to the input side of the diode 492, and, upon the connection of the Vcc power supply terminal 494 to the power supply line, each device in the switching device 428 can also be operated by the supply of power from the power supply line. That is, in this case, each device is operated without charge of the capacitor 489. Therefore, this can improve convenience in the case where rapid operation of the switching device 428 is desired, for example, at the time of inspection.

Upon the transmission of ON/OFF data from the bus I/O interface 434 through the signal line 422 and the I/O interface 484 to the control unit 481, the control unit 481 performs control in such a manner that, based on the ON/OFF data, the input-output part 486 performs ON/OFF of two input-output terminals 496, 496 (output mode).

Here, as described above, an ID code of the switching device 428 per se and an identification data for identifying that the switching device 428 is an I/O sensor unit are stored in the ID part 488. For example, various data and a communication protocol for data communication with the bus I/O interface 434 are stored in the memory 482. Upon a failure of the switching device 428, data on the failure is also written in the memory 482 and is sent to the bus I/O interface 434. The switching device 428 also has a self-holding function such that, when communication with the bus I/O interface 434 has been broken, the current state is held.

Figure 38:
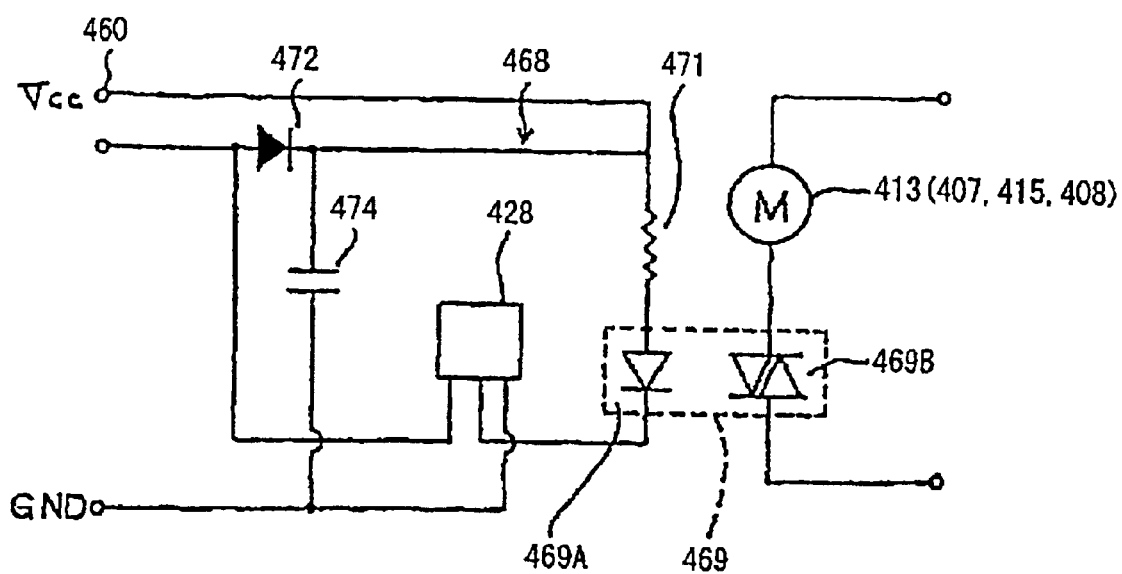
FIG. 38 is an electrical circuit diagram of a switching unit using a switching device.

Wiring of the switching device 428 is made on the drive substrates 423 and the power supply substrates 424, 426 as shown in FIG. 38 to constitute a switching unit 468. That is, numeral 469 designates a photocoupler comprising a photodiode 469A and a phototriac 469B, numeral 471 a resistor, numeral 472 a diode as a rectification device, and numeral 474 a capacitor as an accumulation device.

In this case, the capacitor 474 is connected to the output side of the diode 472. The point of connection of the diode 472 with the capacitor 474, the resistor 471, and the photodiode 469A are connected in series to one end of the switching device 428. The other end of the switching device 428 is connected to a portion before the diode 472. The phototriac 469B is provided between the AC power supply line 421 and the compressor 413, between the AC power supply line 421 and the fan 407, 415, and between the AC power supply line 421 and the antidewing heater 408.

Upon the connection of the diode 472 to the signal line 422, during a high potential period of the pulse signals, constituting the data, made up of high potential and low potential, power is supplied to the photodiode 469A through the resistor 471 and, in addition, the capacitor 474 is also charged. On the other hand, during a low potential period of the pulse signals, electricity is discharged from the capacitor 474 to supply the photodiode 469A with electric power.

Likewise, when a Vcc power supply terminal 460 is connected to the point of connection between the diode 472 and the capacitor 474 and is connected to the power supply line, the photodiode 469A can also be operated by supplying power through the power supply line. That is, in this case, each device is operated without charging the capacitor 474. Therefore, this can improve convenience in the case where rapid operation is desired, for example, at the time of inspection.

Figure 39:
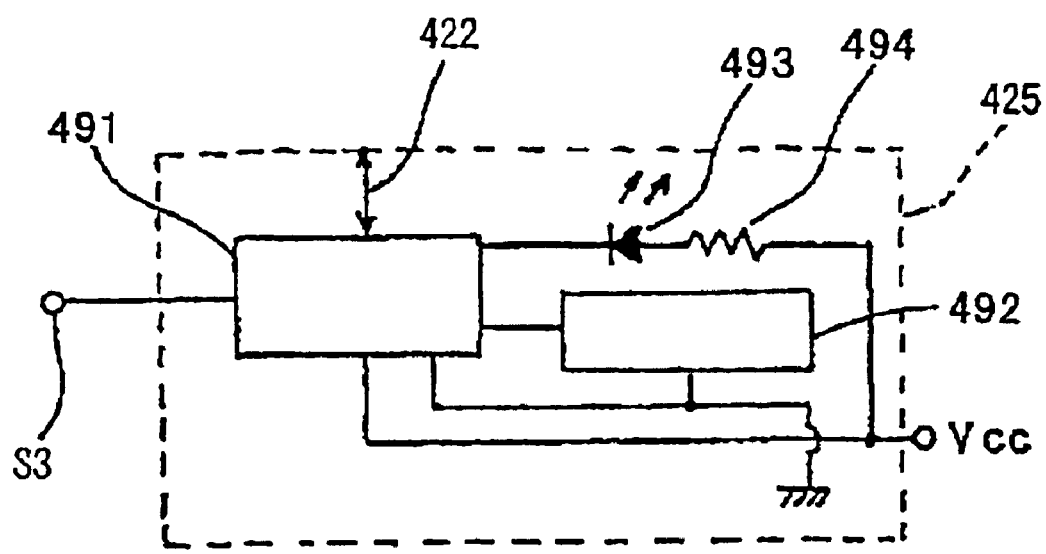
FIG. 39 is a block diagram of an electrical circuit in a changeover device.

The construction of the changeover device 425 is shown in FIG. 39. The changeover device 425 comprises: a controller 491 provided with changeover device-side control means, opening/closing means, and send/receive means; a memory 492 as storage means; a light emitting diode 493; a resistor 494; and the like. A terminal S3 of the controller 491 shown in FIG. 39 is connected to the connection wiring 422A, and the other terminal of the controller 491 is connected to the signal line 422.

Upon the transmission of data from the controller 436 through the connection wiring 422A, based on the data, the controller 491 in its send/receive means connects the signal line 422 to the connection wiring 422A or disconnects the signal line 422 from the connection wiring 422A. In such a state that the signal line 422 is connected to the connection wiring 422A, the light emitting diode 493 is energized and is turned on. On the other hand, in such a state that the signal line 422 is disconnected from the connection wiring 422A, the light emitting diode 493 is deenergized and is turned off.

Further, for example, an ID code of the changeover device 425 per se, an identification data for identifying that the changeover device 425 is a changeover device, and a protocol for data communication with the controller 436 are stored in the memory 492.

The operation of the above construction will be explained. It is assumed that the refrigerators 401A, 401B, 401C are installed, the connection wiring 422A is connected to the changeover devices 425 . . . , and the sensors 427, 410, 420 in the respective refrigerators 401A, 401B, 401C and the switching devices 428 . . . are connected to the signal line 422. CPU 431 in the controller 436 first performs a search for the status of the connection of each device (the sensors 427, 410, 420, the switching devices 428 . . . , and the changeover device 425) to the signal line 422 through the connection wiring 422A.

It is assumed that the changeover devices 425 . . . originally connects the signal lines 422 . . . to the connection wiring 422A.

In this case, the controller 436 successively makes a request to the sensors 427, 410, 420, the switching devices 428 . . . , and all the changeover devices 425 . . . in all the refrigerators 401A, 401B, 401C for ID. In reply to this, the sensors 427, 410, 420, the switching devices 428 . . . , and the changeover devices 425 . . . in all the refrigerators 401A, 401B, 401C send information on their own ID codes and the like to the controller 436. Based on the received ID codes and the like, the controller 436 recognizes that the changeover devices 425 . . . in the refrigerators 401A, 401B, 401C and the individual sensors, i.e., the internal temperature sensor 427, the defrost sensor 410, and the high-temperature sensor 420, and, in addition, the switching devices, i.e., the switching device 428 for the compressor 413, the switching device 428 for the defroster 430, the switching device 428 for the internal fan 407, and the switching device 428 for the antidewing heater 408 (in an actual case, further, a fan for a condenser), are connected to the connection wiring 422A and the signal line 422 . . .

The controller 436 stores the recognized status of the connection of the temperature sensors 427, 410, 420, the switching devices 428 . . . , and the changeover device 425 . . . in the memory 432 and, thereafter, sends data using the ID codes to each device.

Next, the controller 436 sends data to the changeover devices 425 to close the signal system in only the changeover device 425 of the refrigerator 401A, that is, to connect the signal line 422 to the connection wiring 422A, while, for the changeover device 425 in the other refrigerators 401B, 401C, the signal system is opened, that is, the signal line 422 is disconnected from the connection wiring 422A. The transmission of data to the changeover devices 425 . . . is carried out based on the above ID codes.

Thus, only each of the devices in the refrigerator 401A is connected through the connection wiring 422A and the signal line 422 to the controller 436. In this state, the controller 436 sends ON/OFF data together with the ID code of the switching device 428 on the drive substrate 423 and the ID code of the switching device 428 on the power supply substrate 424 to the connection wiring 422A in the refrigerator 401A to place the compressor 413 and the internal fan 407 into operation for the start of cooling operation.

CPU 431 in the controller 436 polls the sensors 427, 410, 420 in the refrigerator 401A at predetermined periods. This polling is carried out based on the above ID codes. In reply to this polling, CPU 443 in the sensors 427, 410, 420 sends temperature data to the controller 436. CPU 431 in the controller 436 once writes the received temperature data in the memory 432 and then performs the allocation of function of each sensor based on the change of the temperature data after the start of the cooling operation.

Specifically, at the time when a given time has elapsed after the start of the cooling operation of the refrigerator 401A, when the temperature data shows a rise in temperature, the controller 436 performs function allocation, such that the sensor having the ID is the high-temperature sensor 410, and stores this in the memory 432. When the temperature data shows a lowering in temperature and the temperature is relatively high, the controller 436 performs function allocation, such that the sensor having the ID is the internal temperature sensor 427, and stores this in the memory 432. When the temperature data shows a lowering in temperature and the temperature is relatively low, the controller 436 performs function allocation such that the sensor having the ID is the defrost sensor 420, and stores this in the memory 432. This permits the function of each sensor in the refrigerator 401A to be allocated to the controller 436 without presetting.

Next, in such a state that the signal system in only the changeover device 425 in the refrigerator 401B is closed while the signal system in the other changeover devices 425 is opened, the controller 436 performs the allocation of function of each sensor in the refrigerator 401B in the same manner as described above. Thereafter, the same operation of allocation of function is carried out for the refrigerator 401C, and all the results are stored in the memory 432.

Next, actual operation of the control of the refrigerators 401A, 401B, 401C will be explained. Here it is assumed that the signal system in all the changeover device 425 . . . is closed. In this state, as described above, at predetermined periods, CPU 431 in the controller 436 successively polls the sensors 427, 410, 420 respectively in all the refrigerators 401A, 401B, 401C. This polling is carried out based on the above ID codes. In reply to the polling, as described above, CPU 443 in the sensors 427, 410, 420 of the refrigerators 401A, 401B, 401C sends temperature data to the controller 436.

CPU 431 in the controller 436 once writes the received temperature data in the memory 432, compares the temperature data from the internal temperature sensor 427, among the received temperature data, with the preset temperature, and successively sends ON/OFF data together with the ID code of the switching device 428 on the drive substrate 423 in each of the refrigerators 401A, 401B, 401C to the connection wiring 422A and the signal line 422.

The control unit 481 in the switching device 428 on the drive substrate 423 in the refrigerators 401A, 401B, 401C, upon the receipt of ON/OFF data on its own ID code, turns ON/OFF the input-output terminals 496, 496 based on the ON/OFF data in the above-described manner. The ON/OFF of the input-output terminals 496, 496 turns ON (emission)/OFF (lights-out) of the photodiode 469A. This in turn turns ON/OFF the phototriac 469B and then starts/stops the compressor 413.

Further, CPU 431 in the controller 436 successively sends ON/OFF data together with the ID code of the switching device 428 on the power supply substrate 426 in the refrigerators 401A, 401B, 401C to the connection wiring 422A and the signal line 422, and the defroster 430 is energized at predetermined time intervals or at a predetermined time to remove frost in the cooler 406. Based on the temperature data received from the defrost sensor 410, the defrosting of the cooler 406 is controlled so that the defrosting is terminated when the temperature has reached a predetermined temperature.

Since the fans 407, 415 and the antidewing heater 408 in the refrigerators 401A, 401B, 401C are continuously energized, ON/OFF data to that effect is sent based on ID codes of the switching devices 428 on the respective power supply substrates 424, 426. Based on the ON/OFF data, the switching devices 428 operate or energize the fans 407, 415 or the antidewing heater 408.

Thus, the controller 436 repeatedly performs the operation of successive polling of the sensors 427, 410, 420 and the switching devices 428 . . . in all the refrigerators 401A, 401B, 401C to perform the control of all the refrigerators 401A, 401B, 401C.

Next, for example, when a change in the setting of the temperature of the refrigerator 401B is desired to vary the operation or when only the refrigerator 401B should be monitored, as soon as the user performs predetermined operation of input into the controller 436, the controller 436 sends data to the changeover devices 425 to close the signal system in only the changeover device 425 in the refrigerator 401B while opening the signal system in the changeover device 425 in the other refrigerators 401A, 401C. The transmission of data to the changeover devices 425 . . . is carried out based on the above ID codes.

This permits only each of the devices in the refrigerator 401B to be connected through the connection wiring 422A and the signal line 422 to the controller 436. In this state, the controller 436 polls the sensors 427, 410, 420 and the switching device 428 . . . in the refrigerator 401B and sends data to and receives data from them.

Thus, according to the invention, for example, when a change in the operation of a specific refrigerator 401B is desired, only the refrigerator 401B can be connected by the changeover devices 425 to the controller 436 through the signal line 422 and the connection wiring 422A. Therefore, as compared with the case where, as described above, transmission of data to and receipt of data from each device in all the refrigerators 401A, 401B, 401C are carried out, the rate of data communication between the controller 436 and each device in the refrigerator 401B is much higher.

The preferred embodiment has been explained by taking the temperature detection sensor as an example. Alternatively, a device for detecting moisture, pressure or the like may be used as the sensor part to use it as a moisture sensor or a pressure sensor.

Further, in the above preferred embodiment, the invention has been explained by taking a refrigerator for commercial use as an example. The invention, however, is not limited to this only and is also applicable, for example, to various electrical apparatuses, such as household refrigerators and low-temperature showcases, prefabricated refrigerators, and vending machines, and, further, automobiles, home automation/security system in houses or buildings.

As is apparent from the foregoing detailed description, according to the invention, the control device for equipment comprises: main control means provided on the equipment; and a sensor or a switching device for sending data to and receiving data from the main control means through a signal line, wherein the senor or the switching device is divided into a plurality of systems, a changeover device is provided in a signal line between each of the systems and the main control means, and the changeover. device opens/closes the signal system upon the receipt of data from the main control means through the signal line. By virtue of this construction, when the transmission or receipt of data is required of only the sensor or switching device in a specific system, only the signal system of the changeover device in said system can be opened.

Therefore, even when the number of sensors or switching devices connected to the signal line is large, for example, setting or operation of the sensor or switching device in the specific system can be rapidly changed. This can improve control properties.

In this case, the changeover device may comprise: opening/closing means for opening/closing the signal system; storage means having its own ID code; send/receive means for sending data to and receiving data from the main control means through the signal line; and changeover device-side control means for controlling the opening/closing means based on the data sent from the send/receive means. According to this construction, the main control means can control opening/closing of the signal system without any difficulty. In this case, since the changeover device has its own ID code in the storage means, mere connection of the changeover device to the signal line permits the main control means to identify the changeover device and completes wiring of the changeover device.

Furthermore, since the sensor-side control means in the sensor writes data detected by the detection device in storage means and the send/receive means sends data through the signal line to the main control means, the main control means in the equipment can receive data without any difficulty. In this case, since the sensor has its own ID code in the storage means, mere connection of the sensor to the signal line permits the main control means to identify the sensor and can complete wiring of the sensor.

Furthermore, since the switching device-side control means in the switching device controls the switching means based on data which have been received from the main control means by the send/receive means through the signal line, the main control means in the equipment can perform control of the equipment without any difficulty. Also in this case, since the switching device has its own ID code in the storage means, mere connection of the switching device to the signal line permits the main control means to identify the switching device and can complete wiring of the switching device.

Thus, wiring of the changeover device, the sensors, and the switching devices by the so-called "plug-in" can be realized, and this can significantly simplify wiring work. Further, according to the invention, a common software can be used in the main control means independently of the number of changeover devices, sensors, and switching devices and the like. The adoption of a common software also can significantly reduce the cost.

What is claimed is:

1. A detection system comprising a main control device, sensors, and a signal line, the main control device and the sensors being connected to the signal line, characterized in that each of the sensors comprises: detection means; storage means having its own ID code; send/receive means for sending data to and receiving data from the main control device through the signal line; and terminal-side control means which, upon the receipt of an instruction from the main control device through the send/receive means for the start of detection operation, allows the detection means to perform detection operation, and, upon the receipt of an instruction from the main control device for reading, sends data detected by the detection means to the main control device through the send/receive means, and that the main control device gives an instruction for the start of operation of the detection to all the sensors from which data are to be collected, then provides a predetermined standby period, and, after the elapse of the standby period, gives an instruction for reading to the sensors while specifying the ID codes.

2. A detection system comprising a main control device, a plurality of sensors, and a signal line, the main control device and the sensors being connected to the signal line, characterized in that each of the sensors comprises: detection means; storage means having its own ID code; send/receive means for sending data to and receiving data from the main control device through the signal line; and terminal-side control means which, upon the receipt of an instruction from the main control device through the send/receive means for the start of detection operation, allows the detection means to perform detection operation, and, upon the receipt of an instruction from the main control device for reading, sends data detected by the detection means to the main control device through the send/receive means, and that the main control device gives an instruction for the start of operation of the detection to the plurality of sensors connected to the signal line, then provides a predetermined standby period, and, after the elapse of the standby period, gives an instruction for reading to the individual sensors while specifying the ID codes.

3. A control device for equipment, comprising a signal line distributed to said equipment, main control means connected to the signal line, and a switching device which is connected to the signal line and functions to control the operation of mounted parts, characterized in that the switching device comprises switching means, storage means having its own ID code, send/receive means for sending data to and receiving data from the main control means through the signal line; and sensor-side control means for controlling the switching means based on the data from the send/receive means.

4. The control device for equipment according to claim 3, characterized in that the sensor and/or the switching device comprise an accumulation device which is charged during a high potential period of the signal line while, during a low potential period of the signal line, electricity is discharged from the accumulation device to supply each means with electric power.

5. The control device for equipment according to claim 4, characterized in that the sensor or the switching device is built in a part mounted on equipment such as a cooling storeroom.

6. The control device for equipment according to claim 3, characterized in that the sensor or the switching device is built in a part mounted on equipment such as a cooling storeroom.

7. A control device for equipment, comprising a signal line distributed to said equipment, main control means connected to the signal line, a sensor connected to the signal line, and a switching device which is connected to the signal line and functions to control the operation of mounted parts, characterized in that the sensor comprises: a detection device; storage means having its own ID code; send/receiver means for sending data to and receiving data from the main control means through the signal line; and sensor-side control means which receives data detected by the detection device, writes the received data in the storage means, and sends data stored in the storage means to the main control means through the send/receive means, and that the switching device comprises switching means, storage means having its own ID code, send/receive means for sending data to and receiving data from the main control means through the signal line, and switching device-side control means for controlling the switching means based on the data from the send/receive means.

8. The control device for equipment according to claim 7, characterized in that the sensor and/or the switching device comprise an accumulation device which is charged during a high potential period of the signal line while, during a low potential period of the signal line, electricity is discharged from the accumulation device to supply each means with electric power.

9. The control device for equipment according to claim 7, characterized in that the sensor or the switching device is built in a part mounted on equipment such as a cooling storeroom.

10. A control device for equipment, comprising a signal line distributed to a cooling storeroom, main control means connected to the signal line, and a switching device which is connected to the signal line and functions to control the operation of mounted parts including a compressor and a fan, characterized in
that the switching device comprises switching means, storage means having its own ID code, send/receive means for sending data to and receiving data from the main control means through the signal line, and switching device-side control means for controlling the switching means based on the data from the send/receive means.

11. The control device for equipment according to claim 10, characterized in that the sensor and/or the switching device comprise an accumulation device which is charged during a high potential period of the signal line while, during a low potential period of the signal line, electricity is discharged from the accumulation device to supply each means with electric power.

12. The control device for equipment according to claim 10, characterized in that the sensor or the switching device is built in a part mounted on equipment such as a cooling storeroom.

13. A control device for equipment, comprising a signal line distributed to a cooling storeroom, main control means connected to the signal line, a temperature detection sensor connected to the signal line, and a switching device which is connected to the signal line and functions to control the operation of mounted parts including a compressor and a fan, characterized in
that the sensor comprises: a temperature detection device; storage means having its own ID code; send/receive means for sending data to and receiving data from the main control means through the signal line; and sensor-side control means which receives temperature data detected by the temperature detection device, writes the received data in the storage means, and sends data stored in the storage means to the main control means through the send/receive means, and
that the switching device comprises switching means, storage means having its own ID code, send/receive means for sending data to and receiving data from the main control means through the signal line, and switching device-side control means for controlling the switching means based on the data from the send/receive means.

14. The control device for equipment according to claim 13, characterized in that the sensor and/or the switching device comprise an accumulation device which is charged during a high potential period of the signal line while, during a low potential period of the signal line, electricity is discharged from the accumulation device to supply each means with electric power.

15. The control device for equipment according to claim 13, characterized in that the sensor or the switching device is built in a part mounted on equipment such as a cooling storeroom.

16. A control device for equipment, comprising: a signal line distributed to said equipment; main control means provided on the equipment; a sensor or a switching device connected to the signal line, for sending data to and receiving data from the main control means; storage device connected to the signal line; and changeover means for enabling an external control device to be connected to the signal line, characterized in
that the storage unit stores a maintenance history data file containing maintenance history of the equipment and, in the state of the connection of the external control device to the signal line, permits data contained in the maintenance history data file to be read by the external control device and data to be written in the maintenance history data file.

17. The control device for equipment according to claim 16, characterized in that, when the sensor or the switching device has been replaced, the main control means searches out the new sensor or switching device and writes this data in the maintenance history data file within the storage unit.

18. The control device for equipment according to claim 16, characterized in that the storage unit comprises: storage means containing data; send/receive means for sending data to and receiving data from the main control means and the external control device through the signal line; storage unit-side control means for controlling, based on the data from the send/receive means, writing of data in or reading of data from the storage means; and an accumulation device which is charged during a high potential period of the signal line while, during a low potential period of the signal line, electricity is discharged from the accumulation device to supply each means with electric power.

19. The control device for equipment according to claim 16, characterized in that the sensor comprises: a detection device; storage means having its own ID code; send/receive means for sending data to and receiving data from the main control means through the signal line; and sensor-side control means which receives data detected by the detection device, writes the received data in the storage means, and sends data stored in the storage means to the main control means through the send/receive means.

20. The control device for equipment according to claim 16, characterized in that the switching device comprises switching means, storage means having its own ID code, send/receive means for sending data to and receiving data from the main control means through the signal line, and switching device-side control means for controlling the switching means based on the data from the send/receive means.

21. A control device for equipment, comprising: main control means provided on the equipment; and a sensor or a switching device for sending data to and receiving data from the main control means through a signal line, characterized in that the sensor or the switching device is divided into a plurality of systems, a changeover device is provided in a signal line between each of the systems and the main control means, and the changeover device opens/closes the signal system upon the receipt of data from the main control means through the signal line.

22. The control device for equipment according to claim 21, characterized in that the changeover device comprises:

opening/closing means for opening/closing the signal system; storage means having its own ID code; send/receive means for sending data to and receiving data from the main control means through the signal line; and changeover device-side control means for controlling the opening/closing means based on the data sent from the send/receive means.

23. The control device for equipment according to claim 21, characterized in that the sensor comprises: a detection device; storage means having its own ID code; send/receive means for sending data to and receiving data from the main control means through the signal line; and sensor-side control means which receives data detected by the detection device, writes the received data in the storage means, and sends data stored in the storage means to the main control means through the send/receive means.

24. The control device for equipment according to claim 21, characterized in that the switching device comprises switching means, storage means having its own ID code, send/receive means for sending data to and receiving data from the main control means through the signal line, and switching device-side control means for controlling the switching means based on the data sent from the send/receive means.

* * * * *